United States Patent
Watanabe et al.

(10) Patent No.: US 6,397,912 B1
(45) Date of Patent: Jun. 4, 2002

(54) PNEUMATIC TIRE WITH COLORED THERMOPLASTIC ELASTOMER LAYER ADJACENT A BLACK-CONCEALING LAYER

(75) Inventors: Jiro Watanabe; Noriaki Kuroda; Gou Kawaguchi; Tetsuji Kawazura; Hidekazu Takeyama; Yoshihiro Soeda; Kazuo Suga; Yoshiaki Hashimura; Osamu Ozawa, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/479,078

(22) Filed: Jan. 7, 2000

Related U.S. Application Data

(62) Division of application No. 09/000,369, filed as application No. PCT/JP97/01514 on May 2, 1997, now Pat. No. 6,062,283.

(30) Foreign Application Priority Data

| | | | |
|---|---|---|---|
| May 29, 1996 | (JP) | ............... | 8-135059 |
| May 29, 1996 | (JP) | ............... | 8-135210 |
| Jun. 27, 1996 | (JP) | ............... | 8-167301 |
| Jul. 12, 1996 | (JP) | ............... | 8-183683 |
| Jul. 22, 1996 | (JP) | ............... | 8-192140 |
| Jul. 23, 1996 | (JP) | ............... | 8-193545 |
| Jul. 23, 1996 | (JP) | ............... | 8-210492 |

(51) Int. Cl.$^7$ .............................. B60C 13/00
(52) U.S. Cl. ............... 152/510; 152/524; 152/525; 152/DIG. 12; 156/116
(58) Field of Search ............... 152/510, 524, 152/525, DIG. 12, DIG. 16, 154.2, 209.5; 156/116

(56) References Cited

U.S. PATENT DOCUMENTS

| | | | | | |
|---|---|---|---|---|---|
| 3,114,650 | A | * | 12/1963 | Oppenheim et al. | ......... 152/524 |
| 3,729,041 | A | * | 4/1973 | Kubota | ............ 152/524 |
| 3,830,274 | A | * | 8/1974 | Waser, Jr. | ............ 152/524 |
| 4,767,481 | A | * | 8/1988 | Bryant et al. | ............ 156/116 |
| 4,928,741 | A | | 5/1990 | Rye et al. | |
| 5,851,323 | A | | 12/1998 | Kaido et al. | ............ 152/510 |
| 6,079,789 | A | * | 6/2000 | Cunningham | ............ 301/95 |

FOREIGN PATENT DOCUMENTS

| | | |
|---|---|---|
| EP | 0722850 A1 | 7/1996 |
| JP | 64-43550 | 2/1989 |
| JP | 1-135846 | 5/1989 |
| JP | 1-314164 | 12/1989 |
| JP | 4-503964 | 7/1992 |
| JP | 7-70372 | 3/1995 |
| JP | 7-278360 | 10/1995 |

* cited by examiner

Primary Examiner—Michael W. Ball
Assistant Examiner—Barbara J Musser
(74) Attorney, Agent, or Firm—Arent Fox Kintner Plotkin & Kahn

(57) ABSTRACT

A pneumatic tire having an air permeation preventive layer comprising a low permeability thermoplastic elastomer composition comprising a thermoplastic elastomer having a thermoplastic resin composition as a continuous phase and a rubber composition as a dispersed phase, in which a barrier resin composition is contained, which low permeability thermoplastic elastomer composition has a phase structure in which the barrier resin composition is dispersed in the form of a flat state in the thermoplastic elastomer, is abundant in flexibility, is superior in gas permeation preventive property, and enables the tire to be reduced in weight.

7 Claims, 9 Drawing Sheets

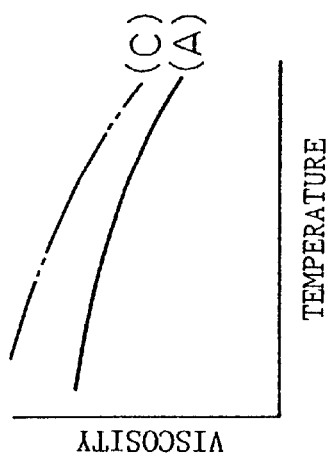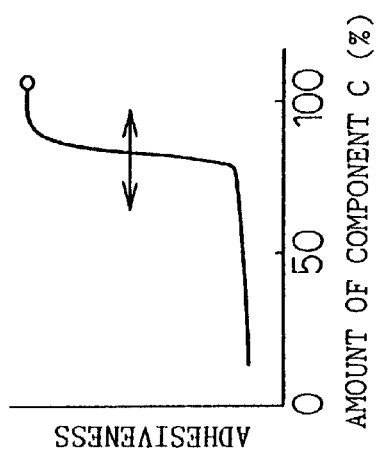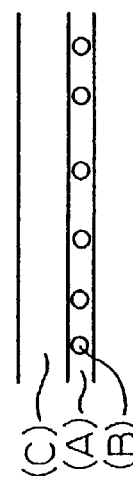
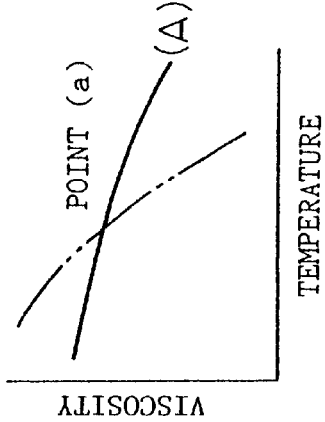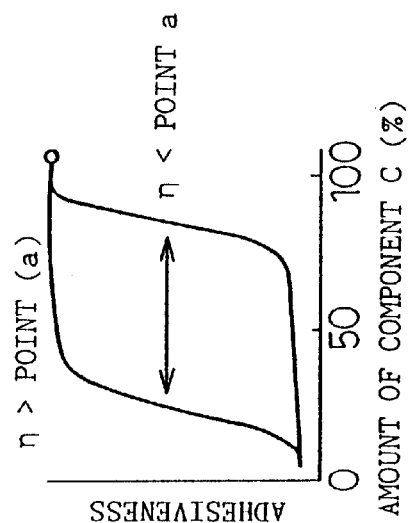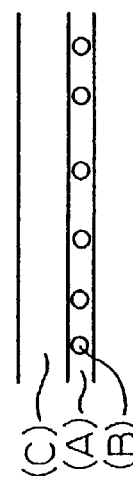
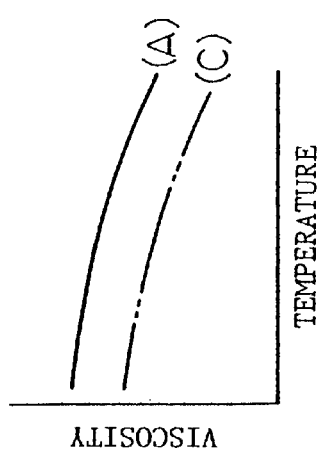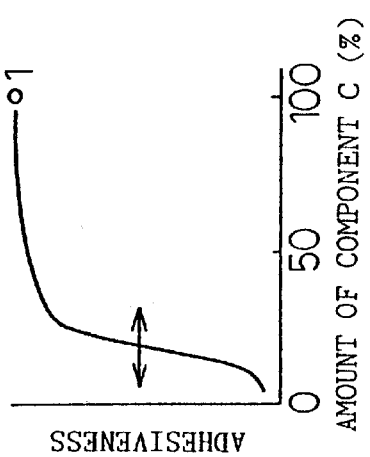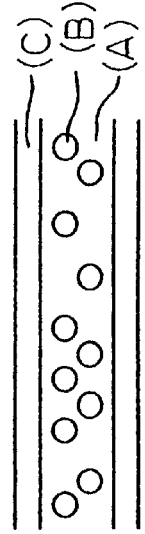
Fig.3(a) Fig.3(b) Fig.3(c)

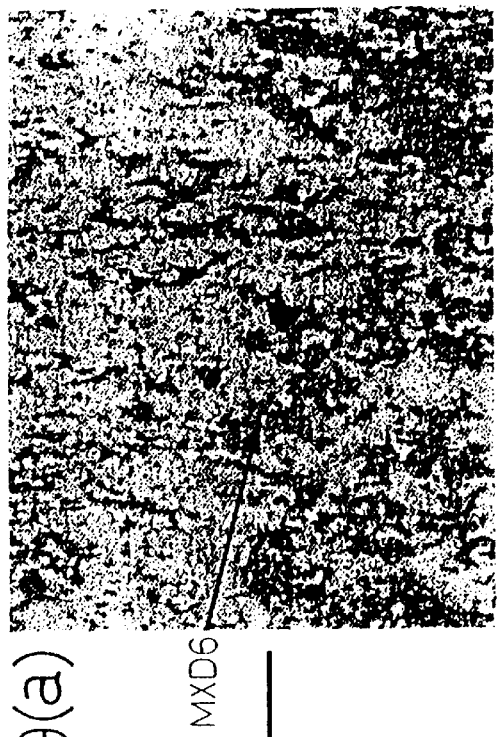
Fig.9(a)
Fig.9(c)
Fig.9(b)
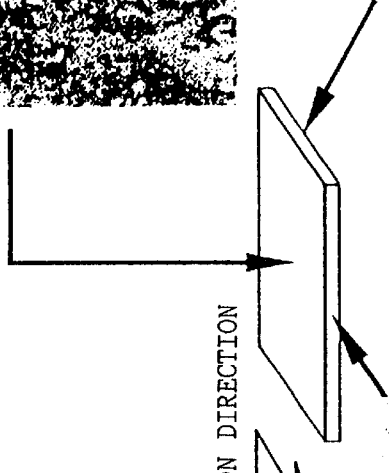
EXTRUSION DIRECTION

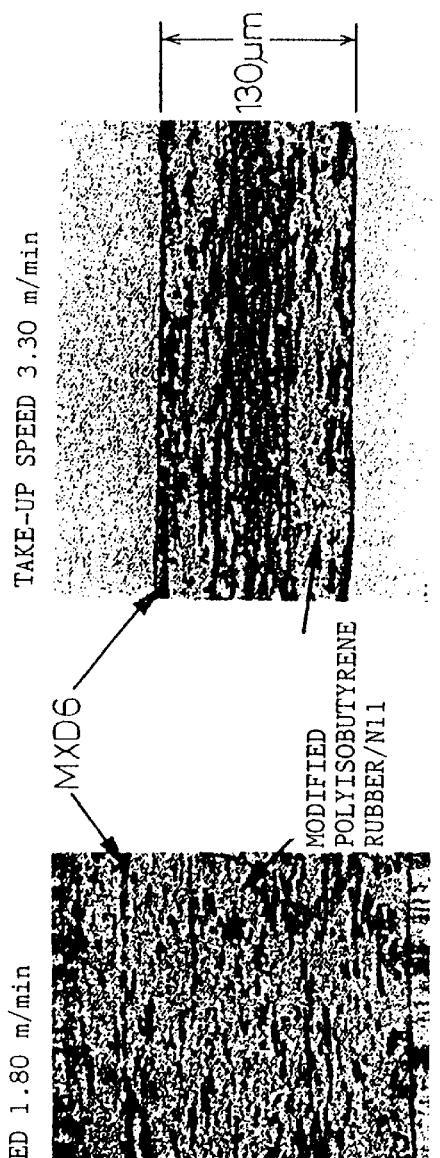
Fig.10(b) TAKE-UP SPEED 3.30 m/min
130μm
MAGNIFICATION × 200
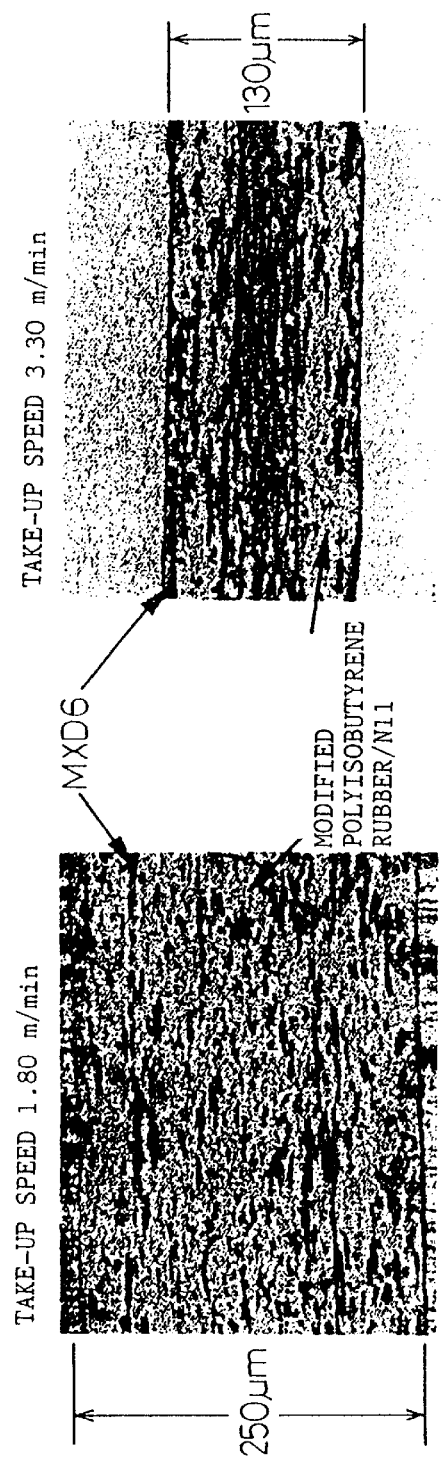
Fig.10(a) TAKE-UP SPEED 1.80 m/min
250μm
MAGNIFICATION × 200
MXD6
MODIFIED POLYISOBUTYRENE RUBBER/N11
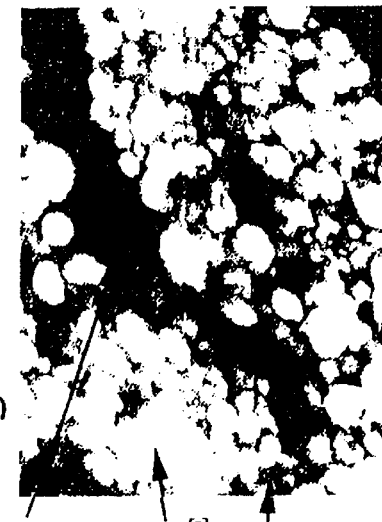
Fig.10(d)
MXD6
MODIFIED POLYISOBUTYRENE RUBBER N11
MAGNIFICATION × 6000
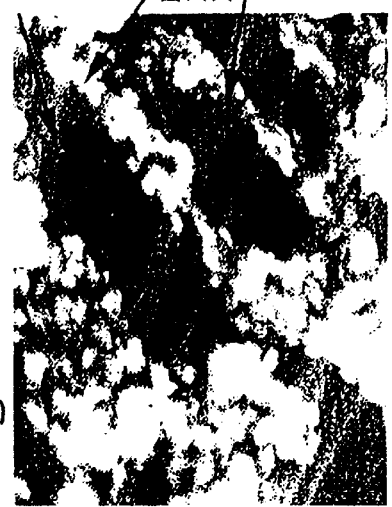
Fig.10(c)
MXD6
MODIFIED POLYISOBUTYRENE RUBBER N11
MAGNIFICATION × 6000
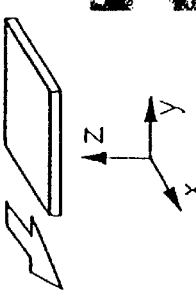
FILM EXTRUSION DIRECTION

EFFECT OF T-DIE SHAPING OF TPR FILM

○ EXXPRO+H−NBR/N6.66 (CM6001) =50/50
△ EXXPRO/N11/N6.66 (CM6001) =60/29/11
□ EXXPRO/N11/N6.66 (CM6041) =60/29/11
▽ EXXPRO/N11/PET=59/29/12
◇ EXXPRO/N11/MXD6=59/29/12

PNEUMATIC TIRE WITH COLORED THERMOPLASTIC ELASTOMER LAYER ADJACENT A BLACK-CONCEALING LAYER

This application is a divisional application filed under 37 CFR §1.53(b) of parent application Ser. No. 09/000,369, filed Jan. 28, 1998, now U.S. Pat. No. 6,062,283 which is a 371 of PCT/JP97/01514, filed May 2, 1997 the disclosure of which is incorporated by reference.

TECHNICAL FIELD

The present invention relates to a pneumatic tire which uses a thermoplastic elastomer composition excellent in flexibility and superior in gas permeation preventive property due to enabling an elastomer component to be used as a discontinuous phase and a thermoplastic resin component to be used as a continuous phase and enabling achievement of a high ratio of the elastomer component and which enables a gas permeation preventive layer such as the inner liner of a pneumatic tire to be made thinner to lighten the weight without impairing the air retention in the tire and to a low permeability thermoplastic elastomer composition used for the same.

The present invention further relates to a pneumatic tire having a gas permeation preventive layer comprising a thermoplastic elastomer resin composition comprising a rubber/matrix resin/gas barrier resin which, in addition to flexibility, vastly enhances the gas barrier property by controlling the morphology of the low permeability thermoplastic resin composition (gas barrier resin) layer, whereby the air (gas) permeation preventive layer of the pneumatic tire can be made thinner and can contribute to a reduction of the weight.

The present invention further relates to a pneumatic tire using an adhesive thermoplastic elastomer composition comprising a thermoplastic resin component as its continuous phase and an elastomer component as its dispersed face wherein an at least partially cross-linkable thermoplastic composition imparts the inherent rubber elasticity function and further the adhesiveness.

The present invention further relates to a rubber-thermoplastic elastomer laminate which enables an inner liner of a pneumatic tire or other gas (air) permeation preventive layer to be made thinner and thereby lighten the weight of a tire, more particularly relates to a rubber and thermoplastic elastomer laminate which enhances the adhesion strength at the interface of the thermoplastic elastomer and the rubber composition in the rubber and thermoplastic elastomer laminate structure, is excellent in resistance to heat degradation at the time of forming the laminate, and is superior in durability against flexing due to long term vibration after forming and to a pneumatic tire using the same.

The present invention further relates to a pneumatic tire wherein a resin film layer colored white or another color is arranged at an innermost surface or outermost surface of the tire and that coloring is used to indicate various information.

BACKGROUND ART

Reduction of the rate of fuel consumption is one of the biggest technical themes in automobiles. As part of this, there have been increasingly strong demands made for the reduction of the weight of the pneumatic tires.

The inner surface of a pneumatic tire is, however, provided with an inner liner layer comprising a low gas permeation rubber such as a butyl rubber or a halogenated butyl rubber so as to maintain a constant tire air pressure. A halogenated butyl rubber, however, has a large hysteresis loss, so when rippling occurs in the inner surface rubber of the carcass layer and the inner liner layer at the intervals between carcass cords after vulcanization of the tire, the inner liner rubber layer will deform along with the deformation of the carcass layer, and therefore, there will be the problem of an increase of the rolling resistance. Accordingly, in general, a rubber sheet called a tie rubber with a small hysteresis loss is interposed between the inner liner layer (halogenated butyl rubber) and inner surface rubber of the carcass layer to adhere the two. Therefore, in addition to the thickness of the inner liner layer of the halogenated butyl rubber, the thickness of the tie rubber is added and the thickness of the layers as a whole exceeds 1 mm (1000 $\mu$m) which in the end becomes a reason increasing the weight of the product.

Techniques have been proposed for using various materials instead of a low gas permeation rubber such as a butyl rubber as the inner liner layer of the pneumatic tire. For example, Japanese Examined Patent Publication (Kokoku) No. 47-31761 discloses coating the inner surface of a vulcanized tire with a solution or dispersion of synthetic resins such as polyvinylidene chloride, saturated polyester resin, polyamide resin having an air permeation coefficient (cm$^3$ (standard state)/cm·sec·mmHg) of not more than $10 \times 10^{-13}$ at 30° C. and not more than $50 \times 10^{-13}$ at 70° C., at a thickness of 0.1 mm or less.

The technique disclosed in Japanese Examined Patent Publication (Kokoku) No. 47-31761, however, describes to provide on the inner circumferential surface of the carcass or the inner circumferential surface of the inner liner of the vulcanized tire a covering layer of a synthetic resin having a specific air permeation coefficient and to keep the thickness of the synthetic resin covering layer to 0.1 mm or less, but the pneumatic tire described in this publication has problems in the adhesiveness of the rubber and synthetic resin. Further, there is the defect that the inner liner layer is inferior in moisture resistance (or water resistance).

Japanese Unexamined Patent Publication (Kokai) No. 5-330307 discloses to halogenate the inner surface of the tire (using the conventionally known chlorination solution, bromine solution, or iodine solution) and then form over that a polymer film (thickness of 10 to 200 $\mu$m) of methoxymethylated nylon, copolymerized nylon, a blend of polyurethane and polyvinylidene chloride, or a blend of polyurethane and polyvinylidene fluoride.

Further, Japanese Unexamined Patent Publication (Kokai) No. 5-318618 discloses a pneumatic tire having a thin film of methoxymethylated nylon as an inner liner. According to this technique, the inner surface of the green tire is sprayed or coated with a solution or emulsion of methoxymethylated nylon and the tire then vulcanized or the inner surface of the tire after vulcanization is sprayed or coated with a solution or emulsion of methoxymethylated nylon to produce a pneumatic tire. In the arts disclosed in these publications as well, however, in addition to the defect of the poor water resistance of the thin films, there is the defect of a difficulty in maintaining uniformity of the film thickness.

Further, Japanese Unexamined Patent Publication (Kokai) No. 6-40207 has an example of use of a multilayer film having a low air permeation layer comprising a polyvinylidene chloride film or an ethylene-vinyl alcohol copolymer film and an adhesive layer composed of a polyolefin film, an aliphatic polyamide film, or a polyurethane film as the air permeation preventive layer of the tire. In this system, however, the low air permeation layer lacks flexibility and the film cannot track expansion or contraction of the material when the tire is being run on so splits.

Further, Japanese Unexamined Patent Publication (Kokai) No. 5-508435 proposes the use, as a tire inner liner composition, of a composition comprised of a halogen-containing copolymer of $C_4$ to $C_7$ isomonoolefin and p-alkylstyrene containing carbon black, a plasticizer oil, and a vulcanization agent for the tire inner liner, but the inner liner has an insufficient air permeation coefficient and is not suitable for reducing the weight of the tire further.

That is, the material for forming the gas barrier layer used for the inner liner of a pneumatic tire etc. is required to have flexibility and a gas barrier property, but no material has yet been presented which has both of these properties.

A thermoplastic elastomer composition which is composed of a thermoplastic resin component as a continuous phase and an elastomer component as a dispersed phase and in which at least part of the elastomer component is cross-linked (vulcanized) has the rubber elasticity performance derived from the elastomer component which has generally been cross-linked in the past, and, due to the thermoplastic resin component forming the continuous phase, can be thermoplastically molded at a high temperature where it melts and becomes fluid, it is known.

That is, a thermoplastic elastomer composition having this dispersed structure has the characteristic of enabling formation by processing techniques similar to those of plastics while maintaining the properties of a vulcanized rubber.

Therefore, the above elastomer composition has the following basic advantages compared with vulcanized rubber:

(1) a vulcanization process is not required.
(2) recycling of the products and the scrap produced during the processing are possible.
(3) lightening of the weight is possible.

Among these, in particular, a thermoplastic elastomer composition where part or all of the elastomer component forming the dispersed phase is cross-linked (vulcanized) with the thermoplastic resin forming the continuous phase during the mixing, that is, is dynamically cross-linked (vulcanized), can in particular give a product superior in the mechanical physical properties of a rubber elastomer, resistance to compression set, and resistance to oil and can be used, instead of conventional rubber, for auto parts, building materials, medical equipments, general industrial materials, etc.

Relating to this thermoplastic elastomer composition, the present inventors previously proposed and filed an application (Japanese Patent Application No. 7-8394) for a polymer composition for a tire having an air permeation coefficient of not more than $25 \times 10^{-12}$ cc·cm/cm²·sec·cmHg and a Young's modulus of 1 to 500 MPa which is superior in the balance of the air permeation preventive property and the flexibility as a polymer composition for a tire, which can be used to reduce the weight of the tire, and which is comprised of a blend of a specific amount of a thermoplastic resin having an air permeation coefficient of not more than $25 \times 10^{-12}$ cc·cm/cm²·sec·cmHg and a Young's modulus of more than 500 MPa and a specific amount of an elastomer component having an air permeation coefficient of more than $25 \times 10^{-12}$ cc·cm/cm²·sec·cmHg and a Young's modulus of not more than 500 MPa.

This proposed composition, however, had a superior function as a polymer composition for a tire, but when used as the inner liner layer or other air permeation preventive layer of a pneumatic tire had the problem that the adhesiveness with the rubber layer was not sufficient with the thermoplastic elastomer composition alone.

Further, the present applicant engaged in research to make the air permeation preventive property in the above polymer composition for a tire even more effective and proposed and filed an application (Japanese Patent Application No. 7-55929) for a thermoplastic resin composition for a tire forming an integral air permeation preventive layer by extruding a blend of at least two types of incompatible thermoplastic resins in the process of which one thermoplastic resin component among the thermoplastic resin components is not finally dispersed but is dispersed oriented in a flat form due to the shear stress at the time of extrusion as it is incompatible.

When this thermoplastic resin composition, however, is used as the air permeation preventive layer of a pneumatic tire, since it is a thermoplastic resin composition, a sufficient air permeation preventive property can be obtained, but this was not sufficient to sufficiently control the flexibility and durability with respect to flexural fatigue and also there was the problem of an insufficient adhesiveness with the rubber layer with the thermoplastic resin composition alone.

That is, as explained above, there is known a thermoplastic elastomer composition, having a thermoplastic resin component as a continuous phase and an elastomer component as a dispersed phase, which has rubber elasticity, is flexible, can be processed thermoplastically, and enables control of the air barrier property or gas barrier property. Further, there is known a thermoplastic resin composition which enables a layer having a gas permeation preventive property to be formed integrally inside the layers. A thermoplastic elastomer composition which has rubbery elasticity and can be thermoplastically processed and which enables the formation of a layer having bondability and other necessary functions integrally at the outside of the layers is not yet known.

DISCLOSURE OF INVENTION

An object of the present invention is to provide a pneumatic tire forming an air permeation preventive layer using a polymer composition for a tire which has a high elastomer ratio and enables the thermoplastic resin component to be made the matrix phase and consequent is abundant in flexibility, is superior in gas permeation preventive property, enables the tire to be made lighter in weight without impairing the air pressure retention of the pneumatic tire, is superior in balance of air permeation preventive property and flexibility, is superior in adhesiveness with an elastomer layer, and is optimal as the air permeation preventive layer of a pneumatic tire.

Another object of the present invention is to provide a rubber and thermoplastic elastomer laminate for a pneumatic tire which enables the tire to be made lighter in weight without impairing the air pressure retention of the pneumatic tire, is superior in the balance of the air permeation preventive property and the flexibility, is superior in adhesiveness with the rubber layer, and is superior in the resistance to heat deterioration during vulcanization, the resistance to heat deterioration during use, and the resistance to splitting upon flexing when dynamically bonded.

A still other object of the present invention is to provide an adhesive thermoplastic elastomer composition imparted with adhesiveness in addition to the inherent properties of various thermoplastic elastomer compositions. A still other object is to provide a pneumatic tire using a thermoplastic elastomer composition imparted with adhesiveness by further blending in a small amount of an adhesive thermoplastic resin component, while maintaining the performance of the above thermoplastic elastomer material.

A still further object of the present invention is to provide a pneumatic tire which prevents erroneous use or erroneous mounting and facilitates separation at the time of recycling by providing a colored layer at the innermost surface or outermost surface of the tire with a clear color, without increasing the thickness and incorporating various information in the coloring.

In accordance with a first aspect of the present invention, there is provided a pneumatic tire having an air permeation preventive layer comprising a thermoplastic elastomer composition containing (A) at least one thermoplastic resin component having an air permeation coefficient of not more than $25 \times 10^{-12}$ cc·cm/cm$^2$·sec·cmHg and a Young's modulus of more than 500 MPa and (B) at least one of elastomer component having an air permeation coefficient of more than $25 \times 10-10$ cc·cm/cm$^2$·sec·cmHg and a Young's modulus of not more than 500 MPa, wherein the melt viscosity ($\eta_m$) of the above thermoplastic resin component (A), the melt viscosity ($\eta_d$) of the above elastomer component (B), and the difference in solubility parameters of the elastomer component (A) and the thermoplastic resin component (B) at the mixing temperature satisfy the relationship of the following formula (1):

$$\frac{a|\Delta SP| + b}{\varphi_m} < \frac{\eta_d}{\eta_m} \quad (1)$$

wherein,

ΔSP: difference in solubility parameters of elastomer component (B) and thermoplastic resin component (A)

$\phi_m$: volume fraction of thermoplastic resin component (A)

a=−0.0518, b=0.90 and wherein the elastomer component (B) is the discontinuous phase and the thermoplastic resin component (A) is the continuous phase.

In accordance with a second aspect of the present invention, there is provided a pneumatic tire having an air permeation preventive layer comprising a low permeability thermoplastic elastomer composition comprising a thermoplastic elastomer having a thermoplastic resin composition as a continuous phase and a rubber composition as a dispersed phase in which a barrier resin composition is contained, the low permeability thermoplastic elastomer composition having a phase structure in which the barrier resin composition is dispersed in the form of a flat state in the thermoplastic elastomer.

In accordance with the present invention, there is further provided a pneumatic tire having an air permeation preventive layer comprising a low permeability thermoplastic elastomer composition wherein the volume fraction and melt viscosities of the thermoplastic elastomer having a thermoplastic resin composition as a continuous phase and a rubber composition as a dispersed phase and the barrier resin composition satisfy the following relation (2) and relation (3):

$$\eta_d/\eta_m > 3.0 \quad (2)$$

$$\alpha = \frac{\phi_d}{\phi_m} \times \frac{\eta_m}{\eta_d} < 1.0 \quad (3)$$

wherein, $\phi_d$: volume fraction of barrier resin composition $\eta_d$: melt viscosity of barrier resin composition $\phi_m$: volume fraction of thermoplastic elastomer with the thermoplastic resin composition as the continuous phase and the rubber composition as the dispersed phase $\eta_m$: melt viscosity of thermoplastic elastomer with the thermoplastic resin composition as the continuous phase and the rubber composition as the dispersed phase.

In accordance with a third aspect of the present invention, there is provided a pneumatic tire having an air permeation preventive layer comprising an adhesive thermoplastic elastomer composition comprising a thermoplastic elastomer composition (A) comprising a thermoplastic resin component constituting a continuous phase in which an elastomer component constituting a dispersed phase is dispersed at a blend ratio by weight to the elastomer component of 10/90 to 80/20 and an incompatible functional resin component (B), mixed therewith, having a difference in solubility parameter (SP value) to the thermoplastic resin component (A) of more than 1.0, where the following relation (4) is satisfied:

$$\alpha = \frac{\phi_A}{\phi_B} \times \frac{\eta_B}{\eta_A} < 1.0 \quad (4)$$

where, $\phi_A$: volume fraction of thermoplastic elastomer composition component $\phi_B$: volume fraction of adhesive thermoplastic resin component $\eta_A$: melt viscosity of thermoplastic elastomer composition component during melt mixing $\eta_B$: melt viscosity of adhesive thermoplastic resin component during melt mixing; and the volume fraction based upon the total amount of (A) and (B) is controlled to 1 to 40%.

Further, in accordance with the present invention, there is provided a pneumatic tire having an air permeation preventive layer comprising an adhesive thermoplastic elastomer composition where a compatibilizer component (C) is further included in an amount of 0.5 to 10% by weight, based upon the total weight of the component (A) and component (B) of the adhesive thermoplastic elastomer composition.

Further, in accordance with the present invention, there is provided a pneumatic tire having as an air permeation preventive layer an adhesive thermoplastic elastomer composition comprising a thermoplastic elastomer composition (A) comprising a thermoplastic resin component constituting a continuous phase in which an elastomer component constituting a dispersed phase is dispersed at a blend ratio by weight of 10/90 to 80/20 in which is melt mixed an incompatible adhesive thermoplastic resin component (B) having a difference in solubility parameter (ΔSP value) based upon the thermoplastic resin component (A) of more than 1.0 under conditions satisfying the above relation (4), the volume fraction of (B) based upon the total amount of (A) and (B) being controlled to 1 to 40%, and the adhesive thermoplastic resin component being positioned at a surface location by forming it into a sheet or tube while applying a shear stress.

In accordance with a fourth aspect of the present invention, there is provided a thermoplastic elastomer composition having an air permeation coefficient of not more than $25\times10^{-12}$ cc·cm/cm²·sec·cmHg and a Young's modulus of 1 to 500 MPa comprising:

(A) at least one thermoplastic resin component having an air permeation coefficient of not more than $25\times10^{-10}$ cc·cm/cm²·sec·cmHg and a Young's modulus of more than 500 MPa in an amount of at least 10% by weight, based upon the weight of the overall polymer component, (B) at least one elastomer component having an air permeation coefficient of more than $25\times10^{-12}$ cc·cm/cm²·sec·cmHg and a Young's modulus of not more than 500 MPa in an amount of at least 10% by weight, based upon with respect to the weight of the overall polymer component, the total weight (A)+(B) of the component (A) and the component (B) being at least 30% by weight, based upon the weight of the overall polymer component, the component (A) forming a continuous phase, and the component (B) forming a dispersed phase, and (C), in the thermoplastic resin of the component (A), an adhesive thermoplastic resin component having a volume fraction x viscosity ratio with the thermoplastic resin shown by the following relation:

$$\frac{\phi_A}{\phi_C} \times \frac{\eta_C}{\eta_A} < 1.0 \qquad (5)$$

where, $\phi_A$: volume fraction of thermoplastic resin component (A)

$\phi_C$: volume fraction of adhesive thermoplastic resin component (C)

$\eta_A$: melt viscosity of thermoplastic elastomer component (A) during melt mixing $\eta_C$: melt viscosity of adhesive thermoplastic resin component (C) during melt mixing, in 1 to 75% by weight, based on the total weight of the components (A), (B), and (C).

In accordance with a fifth aspect of the present invention, there is provided a rubber and thermoplastic elastomer laminate having as a gas permeation preventive layer a thermoplastic elastomer composition having an air permeation coefficient of not more than $25\times10^{-12}$ cc·cm/cm²·sec·cmHg and a Young's modulus of 1 to 500 MPa and having a rubber composition layer laminated over that layer, comprising:

(A) at least one thermoplastic resin having an air permeation coefficient of not more than $25\times10^{-12}$ cc·cm/cm²·sec·cmHg and a Young's modulus of more than 500 MPa in an amount of at least 10% by weight, based upon the weight of the overall polymer component, (B) at least one elastomer component having an air permeation coefficient of more than $25\times10^{-12}$ cc·cm/cm²·sec·cmHg and a Young's modulus of not more than 500 MPa in an amount of at least 10% by weight with respect to the weight of the overall polymer component, the total weight (A)+(B) of the component (A) and the component (B) being at least 30% by weight, based upon the weight of the overall polymer component, and (C), in the thermoplastic resin of the component (A), an epoxide of a block copolymer comprising a vinyl aromatic compound and a conjugated diene compound and/or its partial hydrogenate in an amount of 3 to 50% by weight.

In accordance with a sixth aspect of the present invention, there is provided a rubber and thermoplastic elastomer laminate comprising a layer composed of a thermoplastic elastomer composition (A) containing a polyamide thermoplastic resin composition containing an elastomer composition and at least one compound selected from (i) copper halide, a hindered phenol, a hindered amine, and an aromatic amine and a layer comprised of a rubber composition (B) laminated together.

In accordance with a seventh aspect of the present invention, there is provided a pneumatic tire provided with at least at part of the innermost surface or outermost surface of the tire through at least one layer of a black-concealing layer having a light reflectance of at least 15% a resin film layer composed of a thermoplastic resin as a main ingredient and colored white or another color.

BRIEF DESCRIPTION OF DRAWINGS

FIGS. 3(a), 3(b), and 3(c) are graphs of the relationship between the viscosity and temperature of the matrix resin of the thermoplastic elastomer composition of the present invention and the amount and adhesiveness of the component (C) and schematic views of the phase state when making that composition a thin layer.

FIGS. 9(a), 9(b), and 9(c) are micrographs showing the morphology at sectional views in the Z-axial surface (a) and X-axial (b) and Y-axial (c) directions of a film formed using the low permeability thermoplastic elastomer composition of the present invention.

FIGS. 10(a), 10(b), 10(c), and 10(d) are micrographs showing the changes in morphology at sectional views in the X-axial direction in the case of changing the takeup speed (1.80 m/min and 3.30 m/min) of film formed using the low permeability thermoplastic elastomer composition of the present invention.

LIST OF REFERENCE NUMERALS USED IN DRAWINGS

Figure 1:
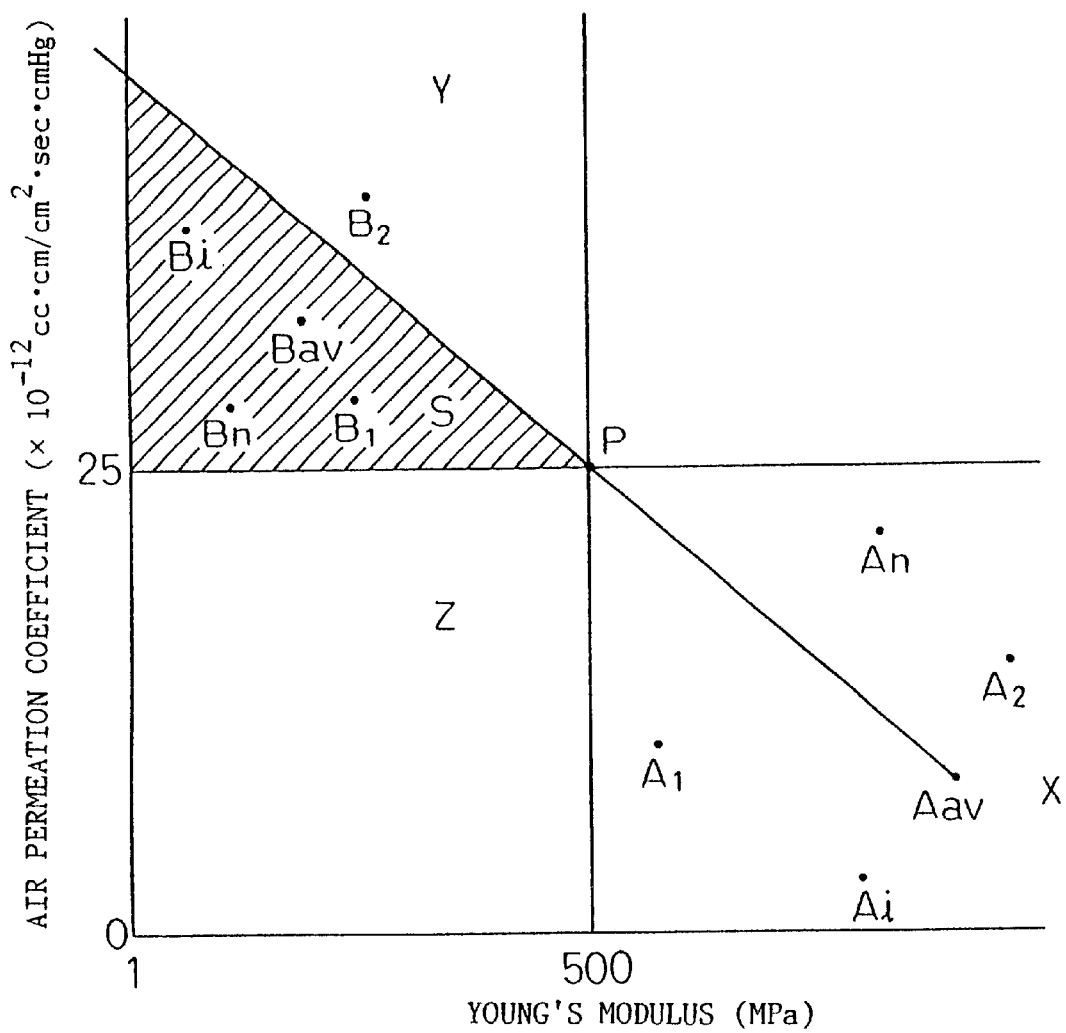
FIG. 1 is a graph of the relationship between the air permeation coefficient and Young's modulus of polymer components (A) and (B) according to the present invention and the thermoplastic elastomer composition of the present invention.

1 . . . Bead core;

2 . . . Carcass layer;

3 . . . Inner liner layer;
4 . . . Side wall;
5 . . . Tire;
6 . . . Black-concealing layer;
7 . . . Resin film layer;
8 . . . Side wall portion;
9 . . . Tread portion;
10 . . . Groove;
11 . . . Outermost surface;
12,13,14 . . . Light

BEST MODE FOR CARRYING OUT THE INVENTION

As a material superior in gas barrier property, a polyamide thermoplastic resin (hereinafter referred to as a polyamide resin) has been known. Also, as a material superior in a moisture barrier property and flexibility, a butyl rubber has been known. If it were possible to mix the two well, then there would be the possibility of being able to realize a composition having a gas barrier property, moisture barrier property, flexibility, and elongation at break in a good balance.

The thermoplastic resin mixed as the component (A) in the thermoplastic elastomer composition according to the first aspect of the present invention may be any thermoplastic resin having an air permeation coefficient of not more than $25\times10^{-12}$ cc·cm/cm$^2$·sec·cmHg, preferably $0.05\times10^{-12}$ to $10\times10^{-12}$ cc·cm/cm$^2$·sec·cmHg and a Young's modulus of more than 500 MPa, preferably 500–3000 MPa. The amount mixed, according to the present invention, is 15 to 80% by weight, based upon the total weight of the entire polymer component including the thermoplastic resin component (A) and elastomer component (B) and is preferably 15 to 60% by weight in terms of the flexibility.

If the amount of the above thermoplastic resin is more than 80% by weight, based upon the total weight of the entire polymer component including the elastomer component, then mixing is possible, but the thermoplastic elastomer composition obtained will lack flexibility, which is undesirable, while if less than 15% by weight, it will not be sufficient for formation of the continuous phase including the elastomer component and the thermoplastic elastomer composition will not be able to be formed.

As the thermoplastic resin, for example, the following thermoplastic resins and any thermoplastic resin mixtures of the same or including the same may be mentioned.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), polyester resins (for example, polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalkylene diimidate/polybutyrate terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), polymethacrylate resins (for example, polymethyl methacrylate (PMMA) and polyethyl methacrylate), polyvinyl resins (for example, vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), cellulose resins (for example, cellulose acetate and cellulose acetate butyrate), fluororesins (for example, polyvinylidene fluoride (PVDF), polyvinyl fluoride (PVF), polychlorofluoroethylene (PCTFE), and tetrafluoroethylene/ethylene copolymer (ETFE)), imide family resins (for example, aromatic polyimide (PI)), etc. may be mentioned.

The elastomer component mixed as the component (B) in the thermoplastic elastomer composition according to the present invention is an elastomer having an air permeation coefficient of more than $25\times10^{-12}$ cc·cm/cm$^2$·sec·cmHg and a Young's modulus of not more than 500 MPa or an elastomer composition comprising these plus a reinforcing agent, filler, cross-linking agent, softener, antioxidant, processing aid, and other compounding agents in the necessary amounts which are generally mixed with an elastomer for the purpose of improving the dispersion of the elastomer, heat resistance, etc. The amount mixed, according to the present invention, is 20 to 85% by weight, based upon with respect to the total weight of the polymer component containing the thermoplastic resin (A) and elastomer component (B), preferably 40 to 85% by weight.

If the amount of the above elastomer component is less than 20% based upon total weight of the polymer component including the thermoplastic resin component, this is not sufficient to impart the flexibility required for the thermoplastic elastomer of the present invention. Further, if more than 85% by weight, the amount of the thermoplastic resin component forming the continuous phase is not sufficient and mixing and processing become impossible, so this is also not preferred.

As the elastomer material comprising the elastomer component, for example, the following may be mentioned:

A halide of a $C_4$ to $C_7$ isomonoolefin and p-alkylstyrene copolymer, particularly brominated isobutylene/p-methylstyrene copolymer (Br-IPMS), hydrogenated NBR, acrylonitrile butadiene rubber (NBR), chlorosulfonated polyethylene (CSM), chlorinated polyethylene (CM), epichlorohydrin rubber (CHC, CHR), chlorinated butyl rubber (Cl-IIR), or brominated butyl rubber (Br-IIR).

The elastomer composition according to the present invention may further have mixed thereto any components generally mixed into elastomers such as fillers (calcium carbonate, titanium oxide, alumina, etc.), carbon black, white carbon, and other reinforcing aids, softeners, plasticizers, processing aids, pigments, dyes, antioxidants, and the like so long as the requirements for the above air permeability or gas permeability are not impaired.

Further, when the above elastomer component is being mixed with the thermoplastic resin, the elastomer component may be dynamically vulcanized. The vulcanization agents, vulcanization aids, vulcanization conditions (temperature and time), etc. when dynamically vulcanizing the elastomer component may be suitably selected in accordance with the composition of the elastomer component added and are not particularly limited.

As the vulcanization agent, the above-mentioned general rubber vulcanization agent (cross-linking agent), for example, a sulfur vulcanization agent, organic peroxide vulcanization agent, phenol resin vulcanization agent, and in addition zinc oxide, magnesium oxide, litharge, p-quinonedioxime, p-dibenzoylquinonedioxime, tetrachloro-p-benzoquinone, poly-p-dinitrosobenzene, and methylene dianiline may be mentioned. Further, if necessary, the above general vulcanization accelerators may be added.

When the solubilities of the above specified thermoplastic resin component (A) and elastomer component (B) differ, it is preferable to use as a third component a suitable compatibilizer to make the two components soluble with each other. By mixing a compatibilizer into the system, the surface tension between the thermoplastic resin and the elastomer component falls and, as a result, the particle size of the elastomer forming the dispersed phase will become finer, and therefore, the properties of the two components will be more effectively expressed. As such a compatibilizer, it generally is possible to use a copolymer having the structure or both or one of the thermoplastic resin and elastomer component or a structure of a copolymer having an epoxy group, carbonyl group, halogen group, amine group, oxazoline group, hydroxy group, etc. reactable with the thermoplastic resin or elastomer component. These may be selected according to the type of the thermoplastic resin and elastomer component to be mixed, but as the ones which are normally-used, a styrene/ethylene/butylene block copolymer (SEBS) and its maleic acid modified form, EPDM, EPDM/styrene, or EPDM/acrylonitrile graft copolymer and their maleic acid modified forms, styrene/maleic acid copolymer, reactive phenoxy thermoplastic resin, etc. may be mentioned. The amount of the compatibilizer mixed is not particularly limited, but preferably is 0.5 to 20 parts by weight, based upon 100 parts by weight of the polymer component (total of the thermoplastic resin and elastomer component).

The production process of the thermoplastic elastomer composition constituting the gas permeation preventive layer in the present invention comprises melt-mixing a thermoplastic resin and elastomer component selected so as to satisfy the conditions of the above formula (1) by a twin-screw extruder etc. to cause the elastomer component to disperse into the thermoplastic resin forming the continuous phase. When vulcanizing the elastomer component, the vulcanization agent may be added while mixing to cause the elastomer component to dynamically vulcanize. Further, the various compounding agents (except the vulcanization agent) may be added to the thermoplastic resin or the elastomer component during the above mixing, but are preferably mixed before the mixing. The kneader used for kneading the thermoplastic resin and elastomer component is not particularly limited, but a screw extruder, kneader, Banbury mixer, twin-screw kneader/extruder, etc. may be mentioned. Among these, for mixing a thermoplastic resin and elastomer component and for the dynamic vulcanization of the elastomer component, a twin-screw kneader/extruder is preferably used. Further, it is possible to use two or more types of kneaders and successively perform mixing. As the conditions for the melt mixing, the temperature should be at least the temperature at which the thermoplastic resin melts. Further, the shear rate at the time of mixing is preferably 500 to 7500 sec$^{-1}$. The time for the overall mixing is from 30 sec to 10 minutes. Further, when adding a vulcanization agent, the vulcanization time after addition is preferably from 15 sec to 5 minutes.

To obtain such a thermoplastic elastomer composition with a thermoplastic resin component as a continuous phase and an elastomer component as a dispersed phase, even if the thermoplastic resin component and the elastomer component are mixed in a molten state, a thermoplastic elastomer of the desired dispersed structure will not necessarily be obtained. In addition to the above mixing conditions, it is further important to control the volume fraction of the two components used (in particular, for flexibility) to the desired elastomer volume fraction or to control the properties of the two components aiming at the maximum elastomer volume fraction.

For the control of the ratio of the two components, a predetermined relationship stands between the inherent melt viscosities of the thermoplastic resin component and the elastomer component used at the time of mixing and the solubilities of the two components (solubility parameters) (shown in formula (1)). By controlling the interrelationship between these properties, it is possible to maximize the kneadable elastomer component or to control the dispersed structure of the thermoplastic elastomer desired by a certain ratio of elastomer.

In the present invention, it was found that it wasp possible to control the melt viscosities and solubilities of the two components, thereby leading to the present invention.

Note that, here, the melt viscosity means the melt viscosity of any temperature or component at the time of melt mixing. The melt viscosity of each polymer material is dependent on the temperature, the shear rate (sec$^{-1}$), and the shear stress, so the stress and shear rate of the polymer material at any temperature in the molten state capable of flowing through a capillary, in particular, the temperature region at the time of mixing, are measured and the melt viscosity measured by the following formula:

$\eta = \sigma/\gamma$ (where, $\sigma$: shear stress, $\gamma$: shear rate)

Note that, the melt viscosity is measured by using a Capillary Rheometer Capillograph 1C made by Toyo Seiki Seisakusho Ltd.

Further, in the present invention, the thermoplastic resin component and the elastomer component, the melt viscosities of the components, and the solubility parameters need not be those of single components. When two or more types of polymers are used, the solubility parameter may be calculated using the weighted average values of each of the polymer components used, and, further, the melt viscosity may be calculated using the weighted average of the melt viscosities of the polymer components of the constituent-thermoplastic resin component or the elastomer component at the temperature of mixing of any polymer component.

The thermoplastic elastomer composition produced by the above method and the control of the physical and chemical properties of the thermoplastic resin component (A) and the elastomer component (B) is next extruded or calendared to form a film. The film-forming process may be any process for forming a film from a usual thermoplastic resin or thermoplastic elastomer.

The thin film thus obtained had the structure of the matrix of the thermoplastic resin.(A), in which the elastomer component (B) is dispersed as a discontinuous phase in a high elastomer ratio. By making this state of a dispersed structure, it is possible to impart a balance of flexibility and an air permeation preventive property and further to obtain the effects of improvement of the resistance to heat deformation and improvement of the water resistance and, further, to possible to process like a thermoplastic elastomer composition and therefore enable formation of a film by an ordinary resin use machine, that is, by extrusion or calendaring.

Explaining the process of producing a pneumatic tire having an air permeation preventive layer comprised of a thin film of a thermoplastic elastomer composition according to the present invention taking as an example the case where the inner liner layer is disposed at the inside of the carcass layer, the thermoplastic elastomer composition of the present invention is extruded into a thin film of a predetermined width and thickness and wrapped as a cylinder over a tire shaping drum. A carcass layer comprised of the unvulcanized rubber, a belt layer, a tread layer, and other members used for producing usual tires are successively superposed, then the drum is pulled out to obtain a green tire. Next, the green tire is heated and vulcanized by an ordinary method to produce the desired lighter weight pneumatic tire. Note that a similar procedure may be followed when providing the air barrier layer at the outer periphery of the carcass layer as well.

In accordance with the second aspect of the present invention, in the first step, it is necessary to form a thermoplastic elastomer composition composed of a rubber/matrix resin comprised of a rubber composition dispersed finely in a matrix resin. As this matrix resin component, a thermoplastic resin other than one used as the later mentioned barrier resin (low gas permeable thermoplastic resin) is used. For this, polyamide resins such as a nylon 6/66 copolymer (N6/66), nylon 11 (N11), nylon 12 (N12), nylon 610 (N610), nylon 612 (N612), nylon 6T, nylon 6/6T copolymer, nylon 66/PP copolymer, nylon 66/PPS copolymer, polyester resins such as polybutylene terephthalate (PBT), polybutylene terephthalate/tetramethylene glycol copolymer, polyacrylate (PAR), polybutylene naphthalate (PBN), liquid crystal polyester, polyoxyalkylene diimidate/polybutylene terephthalate copolymer; polynitrile resins such as polyacrylonitrile (PAN), polymethacrylonitrile (PMN), acrylonitrile/styrene copolymer (AS), methacrylonitrile/styrene copolymer, methacrylonitrile/styrene/butadiene copolymer; poly(metha)acrylate resins such as polymethyl methacrylate (PMMA), polyethyl methacrylate, ethylene ethylacrylate copolymer (EEA), ethylene acrylic acid copolymer (EAA), ethylene methylacrylate (EMA); vinyl resins such as vinyl acetate (EVA), polyvinyl chloride (PVC); cellulose resins such as cellulose acetate, cellulose acetate butyrate; fluorine resins such as polyvinylidene fluoride (PVDF), polyvinyl fluoride (PVF), polychlorofluoroethylene (PCTFE), tetrafluoroethylene/ethylene copolymer (ETFE); imide resins such as aromatic imides; etc. may be mentioned.

Further, as the rubber component forming the thermoplastic elastomer composition composed of the above rubber/matrix resin, diene rubbers and their hydrogenated compounds such as natural rubber, synthetic polyisoprene rubber (IR), epoxylated natural rubber, styrene-butadiene rubber (SBR), polybutadiene rubber (BR), nitrile-butadiene rubber (NBR), hydrogenated NBR, hydrogenated SBR; olefin rubbers such as ethylene propylene rubber (EPDM, EPM), maleic acid-modified ethylene propylene rubber (M-EPM), butyl rubber (IIR), isobutylene and aromatic vinyl or diene monomer copolymers, acryl rubbers (ACM), ionomers, halogon-containing rubbers (Br-IIR, Cl-IIR, a bromide of isobutylene p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)); silicone rubbers such as methylvinyl silicone rubber, dimethyl silicone rubber, methylphenylvinyl silicone rubber, sulfur-containing rubbers such as polysulfide rubber; fluorine-containing vinyl ether rubbers such as vinylidene fluoride rubbers, tetrafluoroethylene-propylene rubbers, fluorine-containing silicone rubbers, fluorine-containing phosphagen rubbers, and other fluoro rubbers; styrene elastomers, thermoplastic elastomers such as olefin elastomers, polyester elastomers, urethane elastomers, polyamide elastomers, etc. may be mentioned.

Further, the rubber composition forming the dispersed phase may have suitably mixed in it, in addition to these rubber components, other agents generally blended for improving the dispersion, heat resistance, etc. such as reinforcing agents, fillers, cross-linking agents, softeners, antioxidants, and processing aids depending upon need.

Further, the content of the rubber polymer component in the rubber composition is preferably 25 to 99% by weight, particularly preferably 33 to 98% by weight.

Further, the ratio of composition of the rubber composition forming the thermoplastic elastomer composition comprised of the above rubber/matrix resin and the thermoplastic resin composition forming the matrix is usually 10/90 to 90/10, preferably 20/80 to 85/15.

When the solubilities of the afore-mentioned thermoplastic resin composition and rubber composition differ, mixing in a compatibilizer is preferable to cause the two to be soluble in each other. By mixing in the compatibilizer, the surface tension between the thermoplastic resin composition and rubber composition is decreased and the size of the rubber particles forming the dispersed phase becomes smaller, and therefore, the properties of the two components can be expressed more effectively. As such a compatibilizer, in general one having the construction of a copolymer having one or both of the structures of the thermoplastic resin and rubber component or a structure of a copolymer having a group reactable with the thermoplastic resin or rubber component such as an epoxy group, carbonyl group, halogen group, amine group, oxazoline group, or hydroxy group can be used. These may be selected depending on the type of the thermoplastic resin and elastomer component to be mixed, but the generally used ones are anhydrous maleic acid-modified polypropylene, anhydrous maleic acid-modified ethylene-ethylacrylate copolymer, epoxy modified styrene.butadiene.styrene copolymer, styrene/ethylene.butylene block copolymer (SEBS) and its maleic acid-modified forms, EPDM, EPDM/styrene or EPDM/acrylonitrile graft copolymer and its maleic acid-modified form, styrene/maleic acid copolymer, reactive phenoxy thermoplastic resins, etc. may be mentioned. The amount of the compatibilizer mixed is not particularly limited, but preferably is 0.5 to 20 parts by weight based upon 100 parts by weight of the polymer component (total of thermoplastic resin and rubber component).

Further, using this compatibilizer, it is desirable to make the particle size of the rubber of the dispersed phase not more then 10 µm, further not more than 5 µm, in particular 0.1 to 2 µm.

Note that the vulcanization agent, vulcanization aids, vulcanization conditions (temperature and time), etc. when dynamically vulcanizing the rubber composition may be suitably selected depending upon the composition of the rubber composition added and is not particularly limited.

As the vulcanization agent, the above-mentioned general rubber vulcanization agents (cross-linking agents), that is, sulfur vulcanization agents, organic peroxide vulcanization agents, phenol resin vulcanization agents, zinc oxide, magnesium oxide, litharge, p-quinoneoxime, p-dibenzoylquinoneoxime, tetrachloro-p-benzoquinone, poly-p-dinitrosobenzene, and methylenedianiline may be used. Further, if necessary, the above general vulcanization accelerators may also be added.

Further, in the present invention, the above-mentioned first step batch (thermoplastic elastomer composition) has a barrier resin (low gas permeability thermoplastic resin) added and mixed. The barrier resin is controlled in morphology to a layer structure in the following sheeting, tubing, or other processing step. Effectively used as this barrier resin component are polyamide resins such as nylon 6 (N6), nylon 66 (N66), aromatic nylon (MXD6), polyester resins such as polyethylene terephthalate (PET); polyvinyl resins such as vinyl alcohol-ethylene copolymer (EVOH) and polyvinyl alcohol (PVA); polyvinylidene chloride resins such as polyvinylidene chloride (PVDC) etc.

Further, the amount of the barrier resin component blended in the above first step batch is determined by the above predetermined formula relating to the necessary volume fraction ratios of the two components and the ratio of viscosities at the time of melt mixing in the desired composition, but usually the ratio of weight of the first step batch and the barrier resin component is selected in the range of 90/10 to 50/50.

In the present invention, the process of production of a composition having a layered structure due to the morphology of the multi-component system blend of the rubber/matrix resin/barrier resin where the rubber disperses finely and the barrier resin is flat comprises, in the first step, melt mixing a rubber (unvulcanized) component and matrix resin component by a twin-screw kneader/extruder etc. to disperse the rubber component in the matrix resin forming the continuous phase. The various compounding agents for the rubber component or the matrix resin component including the vulcanization agent may be added during the above mixing, but preferably are premixed before the mixing. The kneader used for mixing the rubber component and the matrix resin component is not particularly limited, but a screw extruder, kneader, Banbury mixer, twin-screw kneader/extruder, etc. may be mentioned. In particular, for mixing the matrix thermoplastic resin component as the rubber component and for the dynamic vulcanization for vulcanization during the mixing of the rubber component, a twin-screw kneader/extruder is preferably used. As the melt mixing conditions, the temperature should be at least the temperature at which the matrix resin melts. Further, the shear rate at the time of mixing is preferably 500 to 7500 sec$^{-1}$. The mixing time in the first step is from 30 sec to 10 minutes. Further, when adding a vulcanization agent, the dynamic vulcanization time after addition is preferably from 15 sec to 5 minutes.

In the next second step, first, the first step batch (thermoplastic elastomer composition) is extruded into strands from the front end of the twin-screw kneader/extruder. These are cooled by water etc., then pelletized by a resin-use pelletizer. Into these are blended pellets of the barrier resin composition. The blend is supplied in fixed quantities as a normal blend of pellets of a blender etc. (dry blend) or from two types of feeders during the mixing in the second step.

The mix is processed at a low (10 sec$^{-1}$ or more, less than 1000 sec$^{-1}$) shear rate by, for example, an ordinary resin-use single-screw extruder to melt mix the first step batch and the barrier resin composition. This is then formed into a sheet, film, or tube by a T-sheeting die, straight or cross-head construction tubing die, inflation molding cylindrical die, etc. at the front end of the single-screw extruder for use for a pneumatic tire rubber/resin laminate.

Note that, in the second step, the mix may be shaped by the above resin-use single-screw extruder after being taken up in strands and pelletized by the above resin-use single-screw extruder.

By controlling the above α value, ratio of viscosities, and ratio of volume fractions to mix the first step batch and the barrier resin composition in the above process, the above barrier resin composition is added to the matrix resin composition in the first step batch with a relatively high shear so the structure is controlled to a dispersed one where it is finely dispersed to form a flat layer and a low gas permeable elastomer resin composition formed with a gas permeation preventive layer made of the barrier resin composition is obtained.

The sheet like or tube like thin film thus obtained is composed of the low permeability thermoplastic elastomer resin composition controlled in the morphology of the multiple-component system mix of the rubber/matrix resin/barrier resin of the present invention. As explained in more detail later, it is composed of a composition where the rubber is finely dispersed and the barrier resin has a flat layered structure. This thin film therefore has, in addition to flexibility, a remarkable-gas permeation preventive property. Therefore, it can be effectively used for the air permeation preventive layer of a pneumatic tire.

For the thermoplastic resin used for the thermoplastic resin component in the thermoplastic elastomer composition comprised of the adhesive thermoplastic elastomer composition according to the third aspect of the present invention in which an elastomer is mixed as the component (A), any thermoplastic resin component having an air permeation coefficient of not more than 25×10$^{-12}$ cc·cm/cm$^2$·sec·cmHg, preferably 0.1×10$^{-12}$ to 10×10$^{-12}$ cc·cm/cm$^2$·sec·cmHg, and a Young's modulus of not less than 500 MPa, preferably 500 to 3000 MPa may be used. The amount mixed is at least 15% by weight, preferably 20 to 85% by weight, based upon the total weight of the polymer component including the thermoplastic resin component and elastomer component.

As such a thermoplastic resin, for example, the following thermoplastic resins and any mixtures of the thermoplastic resins thereof or including these may be mentioned. Further, the thermoplastic resin component may contain an antioxidant, agent for preventing deterioration due to heat, stabilizer, processing aid, pigment, dye, etc.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP copolymer, nylon 66/PPS copolymer), polyester resins (for example, polybutylene terephthalate (PBT), polyethylene terephthalate (PET), polyethylene isophthalate (PEI), polybutylene terephthalate/tetramethylene glycol copolymer, PET/PEI copolymer, polyacrylate (PAR), polybutylenenaphthalate (PBN), liquid crystal polyester, polyoxyalkylene diimidodiacid/polybutylene terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(metha)acrylate resins (for example, polymethyl methacrylate (PMMA), polyethyl methacrylate), polyvinyl resins (for example, vinyl acetate, polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methylacrylate copolymer), cellulose resins (for example, cellulose acetate and cellulose acetate butyrate), fluoro resins (for example, polyvinylidene fluoride (PVDF), polyvinyl fluoride (PVF), polychlorofluoroethylene (PCTFE), tetrafluoroethylene/ethylene copolymer (ETFE)), imide resins (for example, aromatic polyimide (PI)), etc. may be mentioned.

As explained above, these thermoplastic resins must have the specific air (gas) permeation coefficient, Young's modulus, and amount of mixing. No material having a flexibility of a Young's modulus of not more than 500 MPa and an air permeation coefficient of not more than 25×10$^{-12}$ cc·cm/cm$^2$·sec·cmHg has yet been developed industrially. Further, if the air permeation coefficient is more than 25×10$^{-12}$ cc·cm/cm$^2$·sec·cmHg, the afore-mentioned air or gas permeation preventive property of a gas permeation preventive property composition for an air permeation preventive property for a bondable thermoplastic composition for a tire will be decreased and the function of the gas permeation preventive layer of the air permeation preventive layer of the tire will no longer be performed. Further, if the amount of the thermoplastic resin mixed is less than 10% by weight, similarly the gas permeation preventive property will fall and the composition will not be able to be used as the air (gas) permeation preventive layer of a tire.

The elastomer component in the thermoplastic elastomer composition comprised of the adhesive thermoplastic elastomer composition according to the present invention in which the elastomer component forming the dispersed phase is blended as the component (A) is any elastomer having an air permeation coefficient of more than $25 \times 10^{-12}$ cc·cm/cm$^2$·sec·cmHg and a Young's modulus of not more than 500 MPa or any mix of the same or an elastomer composition comprising these plus compounding agents generally mixed into elastomers for improving the dispersion, heat resistance, etc. of the elastomer such as reinforcing agents, fillers, cross-linking agents, softener, antioxidants, and processing aids added as necessary. The amount mixed is at least 10% by weight, preferably 10 to 85% by weight, based upon the total weight of the component (A) constituting the adhesive thermoplastic elastomer composition forming the air or gas permeation preventive layer.

The elastomer constituting the elastomer component is not particularly limited so long as it has the above air or gas permeation coefficient and Young's modulus, but, for example, the following may be mentioned.

Diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM, EPM), maleic acid-modified ethylene-propylene rubber (M-EPM)), butyl rubber (IIR), isobutylene and aromatic vinyl or diene monomer copolymers, acryl rubber (ACM), ionomers), halogen-containing rubbers (for example, Br-IIR, CI-IIR, a bromide of isobutylene-p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), silicone rubber (for example, methylvinyl silicone rubber, dimethyl silicone rubber, methylphenylvinyl silicone rubber), sulfur-containing rubbers (for example, polysulfide rubber), fluororubbers (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned.

The adhesive thermoplastic resin component mixed as the component (B) in the adhesive thermoplastic elastomer composition according to the present invention may be any which has an active substituent group contributing to the adhesiveness of the thermoplastic resin structure. However, this adhesive thermoplastic resin material must be an insoluble one with respect to the above thermoplastic elastomer composition (A) comprising the adhesive thermoplastic elastomer of the present invention in which the above elastomer component is dispersed and have a difference in solubility parameter (SP value) of more than 1.0 or else when the dispersed state is subjected to the later explained shear stress, it will not form an effective flat shape and be positioned at the periphery of the layer or enable its inherent function to be used. Further, satisfaction of the condition in the above formula (1) that $\alpha<1.0$ is necessary for causing the adhesive thermoplastic resin component to finely disperse as a dispersed phase in the above component (A). Further, the adhesive thermoplastic resin material (B) is mixed in so as to give a volume fraction of 1 to 40% based upon the above adhesive thermoplastic elastomer composition.

Here, the SP value is found by calculation from the chemical structures of the thermoplastic resin component, elastomer component, and adhesive thermoplastic resin component used. It is found from the formula of Small and the formula of Hoftyzer-Van Krevelen based on the known atomic group contributing method.

The adhesive thermoplastic elastomer composition of the present invention is a blend of chemically-insoluble polymers having basically compatible parameters of values (SP values) more than 1.0 as explained above, so with this alone, the strength of the interface between the two polymers is weak and when mechanical strength or a high durability and fatigue resistance are particularly required, the desired elongation and other mechanical properties cannot be exhibited, so addition of a compatibilizer is desirable. As such a compatibilizer, in general those having the construction of a copolymer having one or both of the structures of the thermoplastic resin component and adhesive thermoplastic resin component contained in the component (A) or a structure of a copolymer having a group reactable with the thermoplastic resin or rubber component such as an epoxy group, carbonyl group, halogen group, amine group, oxazoline group, or hydroxy group can be used. These may be selected depending on the type of the two thermoplastic resin components to be mixed, but the generally used ones are polyolefin or modified polyolefin thermoplastic resin components such as styrene/ethylene.butylene block copolymer (SEBS) and its maleic acid-modified form, EPDM, EPDM/styrene, or EPDM/acrylonitrile graft copolymer and their maleic-acid-modified forms, styrene/maleic acid copolymer, reactive phenoxy thermoplastic resins, etc. The amount of the compatibilizer mixed is not particularly limited, but preferably is 0.5 to 10% by weight, preferably 1.0 to 10% by weight, based upon the total weight of the component (A) and component (B) in the adhesive thermoplastic elastomer component.

The production process of the adhesive thermoplastic elastomer composition in the present invention comprises finely mixing a predetermined ratio of a thermoplastic resin component forming the continuous phase and an elastomer component forming the dispersed phase, preferably, an elastomer component which cross-links (vulcanizes) during mixing, that is, dynamically cross-links (vulcanizes), by for example a twin-screw kneader/extruder at a relatively high shear stress to produce a thermoplastic elastomer composition (A), then mixing this and a predetermined adhesive thermoplastic resin (B) in a single-screw extruder for a thermoplastic resin by a relatively low shear rate, then using a normal T-die or tubing die for forming a tube shape etc. to shape the mix from the end of the single-screw extruder in a range satisfying the conditions of the melt viscosity and volume fractions of the components (A) and (B) into a film, sheet, plate, rod, or tube so that the component (B) is concentrated at the outside.

Here, as the conditions of the relatively high shear stress of the twin-screw kneader/extruder, the shear rate should be 500 to 7500 sec$^{-1}$. The relatively low shear stress conditions of the single-screw extruder etc. is preferably a shear rate of from 1 to less than 1000 sec$^{-1}$.

The articles thus extruded will, if in a range satisfying the conditions of the above formula (1) and difference of SP values, have the above adhesive thermoplastic resin component located primarily at the surface portion due to the rheologic fluid behavior.

Note that, the compatibilizer component (C) can be simultaneously mixed under the above low shear stress conditions with the pre-prepared thermoplastic elastomer composition (A) and adhesive thermoplastic elastomer component (B) so as to improve the adhesiveness at the interface of the components (A) and (B). Further, a similar effect can be obtained even if simultaneously or separately inserting and dispersing the thermoplastic elastomer component when mixing the thermoplastic resin component and the elastomer component of the thermoplastic elastomer composition (A) at a relatively high shear stress by the twin-screw extruding etc. That is, in the present invention, by adding the component (C) in 0.5 to 10% by weight, based upon the total weight of the component (A) and component (B), the properties of the thermoplastic elastomer composition itself will not be impaired and the function of the adhesive thermoplastic resin component will be given integrally. Further, in the present invention, since the above adhesive thermoplastic resin component is concentrated in the dispersed structure, even with a small amount of the adhesive thermoplastic resin component, its function can be exhibited to the maximum effective extent.

Production of the adhesive thermoplastic elastomer composition using an adhesive thermoplastic resin as the adhesive thermoplastic resin component in the present invention requires the production first of the thermoplastic elastomer composition of the component (A). The process of production of this component comprises mixing the above thermoplastic resin component and elastomer component (unvulcanized component without vulcanizing (cross-linking) agent) by a twin-screw kneader/extruder etc. to cause the elastomer component to disperse as a dispersed phase (domain) in the thermoplastic resin forming the continuous phase (matrix). When cross-linking (vulcanizing) the elastomer component at this time, the vulcanization agent and, if necessary, the vulcanization accelerator, are added during the mixing so as to cause the elastomer component to dynamically vulcanize. Further, the various compounding agents (except vulcanization agent) for the thermoplastic resin or the elastomer component may be added during the mixing or be premixed before the mixing. As the conditions for the melt mixing at this time, the temperature may be any temperature above that where the thermoplastic resin component melts. Further, the shear rate at the time of mixing is preferably 500 to 7500 $sec^{-1}$. The mixing time is 30 sec to 10 minutes. Further, when adding a cross-linking (vulcanizing) agent, the vulcanization time after the addition is preferably from 15 sec to 5 minutes.

The elastomer composition according to the present invention may further have mixed into it components mixed into general elastomers such as fillers (calcium carbonate, titanium oxide, alumina, etc.), carbon black, white carbon, and other reinforcing agents, softener, plasticizers, processing aids, pigments, dyes, antioxidants, and the like so long as the requirements for the above air permeability or gas permeability are not impaired.

Further, when the above elastomer component is being mixed with the thermoplastic resin, the elastomer component may be dynamically vulcanized. The vulcanization agent, vulcanization accelerator, vulcanization conditions (temperature and time), etc. when dynamically vulcanizing the elastomer component may be suitable selected depending upon the composition of the elastomer component added and are not particularly limited.

As the vulcanization agent, the above-mentioned general rubber vulcanization agents (cross-linking agents), that is, sulfur vulcanization agents, organic peroxide vulcanization agents, phenol resin vulcanization agents, zinc oxide, magnesium oxide, litharge, p-quinoneoxime, p-dibenzoylquinoneoxime, tetrachloro-p-benzoquinone, poly-p-dinitrosobenzene, and methylenedianiline may be used. Further, if necessary, the above general vulcanization accelerators may also be added.

Further, as the vulcanization accelerator, general rubber aids may be used together.

The thermoplastic elastomer composition produced by the above method is charged into a single-screw extruder either as it is or after being extruded from the twin-screw kneader/extruder and pelletized once. At the same time, the adhesive thermoplastic resin component is mixed in either separately or in the mixed state. These are mixed under gentle mixing conditions, then a T-die for sheeting attached to the front end of the machine or a tubing die having a pin or die construction for forming a tube is used to extrude the mixture with a certain shear stress to form the desired shape (film, sheet, plate, rod, tube, etc.) Further, the mixing time in the above single-screw extruder is preferably from 30 sec to 10 minutes.

The shaped article thus obtained has the structure where at least a part of the elastomer component is dispersed as a dispersed phase (domain) in the continuous phase (matrix) of the thermoplastic resin component and where the adhesive thermoplastic resin component is concentrated at the surface portion. Further, the compatibilizer component (C) which is optionally added forms a structure reinforcing the interface between the thermoplastic resin component and adhesive thermoplastic resin component and therefore improves the mechanical strength of the functional thermoplastic elastomer composition and can be suitably used.

By adopting such a dispersed structure, it is possible to obtain a shaped article which has the basic properties and advantages of the thermoplastic elastomer composition itself in which the elastomer is dispersed and, further, which is superior in adhesiveness and mechanical properties. When forming the shaped article composed of this adhesive thermoplastic elastomer composition as a film, it is possible to use it effectively for a gas permeation preventive layer such as an inner liner etc. of a pneumatic tire.

Explaining the process of production of a pneumatic tire having an air permeation preventive layer comprised of the adhesive thermoplastic elastomer composition according to an embodiment of the present invention with reference to an example of arrangement of the inner liner layer at the inside of the carcass layer, the adhesive thermoplastic elastomer composition obtained by the process of the present invention in advance is extruded into a thin film form of a predetermined width and thickness from a single-screw extruder having at its front end of T sheeting die having a T-head construction. This is wrapped as a cylinder over a tire shaping drum. A carcass layer comprised of the unvulcanized rubber, a belt layer, a tread layer, and other members used for producing usual ties are successively superposed, then the drum is pulled out to obtain a green tire. Next, the green tire is heated and vulcanized by an ordinary method to produce the desired lighter weight pneumatic tire. Note that a similar procedure may be followed when providing the air permeation preventive layer at the outer periphery of the carcass layer as well.

In the production of the pneumatic tire, the adhesive thermoplastic resin is disposed concentrated at the surface, so there is adhesiveness. Accordingly, the complicated processing step of the past of using an adhesive, separately extruding an adhesiveness imparting layer for use with the air permeation preventive layer, or forming a laminate of the air permeation preventive layer and an adhesiveness imparting layer in advance and using the same is not required, which is extremely advantageous in terms of the production costs, work efficiency, etc.

According to a fourth aspect of the present invention, there is provided a thermoplastic elastomer composition having an air permeation coefficient of not more than $25 \times 10^{-12}$ cc·cm/cm$^2$·sec·cmHg and a Young's modulus of 1 to 500 MPa comprising:

(A) at least one thermoplastic resin component having an air permeation coefficient of not more than $25 \times 10^{-12}$ cc·cm/cm$^2$·sec·cmHg and a Young's modulus of more than 500 MPa in at least 10% by weight, based upon the weight of the overall polymer component, (B) at least on e elastomer component having an air permeation coefficient of more than $25 \times 10^{-12}$ cc·cm/cm$^2$·sec·cmHg and a Young's modulus of not more than 500 MPa in at least 10% by weight, based upon the weight of the overall polymer component, the total weight (A)+(B) of the component (A) and the component (B) being at least 30% by weight, based upon the weight of the overall polymer component, the component (A) forming a continuous phase, and the component (B) forming a dispersed phase, and (C), in the thermoplastic resin of the component (A), an adhesive thermoplastic resin component having a volume fraction×viscosity ratio with the thermoplastic resin shown by the following relation:

$$\frac{\phi_A}{\phi_C} \times \frac{\eta_C}{\eta_A} < 1.0$$

where, $\phi_A$: volume fraction of thermoplastic resin component (A)

$\phi_C$: volume fraction of adhesive thermoplastic resin component (C)

$\eta_A$: melt viscosity of thermoplastic elastomer component (A) during melt mixing $\eta_C$: melt viscosity of adhesive thermoplastic resin component (C) during melt mixing, in 1 to 75% by weight, based on the total weight of the components. (A), (B), and (C).

In accordance with the present invention, further, there is provided a pneumatic tire using the above thermoplastic elastomer composition for an air permeation preventive layer.

In accordance with the fourth aspect of the present invention, for the thermoplastic resin mixed as the component (A) in the thermoplastic elastomer composition, any thermoplastic resin having an air permeation coefficient of not more than $25 \times 10^{-12}$ cc·cm/cm$^2$·sec·cmHg, preferably $0.1 \times 10^{-12}$ to $10 \times 10^{-12}$ cc·cm/cm$^2$·sec·cmHg, and a Young's modulus of not less than 500 MPa, preferably 500 to 3000 MPa may be used. The amount mixed is at least 10% by weight, preferably 20 to 85% by weight, based upon the total weight of the polymer component including the thermoplastic resin component (A) and elastomer component (B).

As such a thermoplastic resin component (A), for example, the following thermoplastic resins and any mixtures of the thermoplastic resins thereof or including these may be mentioned. Further, the thermoplastic resin composition may contain a plasticizer, softener, reinforcement agent, processing aid, stabilizer, antioxidant, etc.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP copolymer, nylon 66/PPS copolymer), polyester resins (for example, polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polybutylene terephthalate/polytetramethylene glycol copolymer, polyoxyalkylene diimidodiacid/polybutylene terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(metha)acrylate resins (for example, polymethyl methacrylate (PMMA), polyethyl methacrylate), polyvinyl resins (for example, vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methylacrylate copolymer), cellulose resins (for example, cellulose acetate and cellulose acetate butyrate), fluoro resins (for example, polyvinylidene fluoride (PVDF), polyvinyl fluoride (PVF), polychlorofluoroethylene (PCTFE), tetrafluoroethylene/ethylene copolymer (ETFE)), imide resins (for example, aromatic polyimide (PI)), etc. may be mentioned.

As explained above, these thermoplastic resins must have the specific air permeation coefficient, Young's modulus, and amount of mixing. The material of the present invention which has a flexibility of a Young's modulus of not more than 500 MPa and an air permeation coefficient of not more than $25 \times 10^{-12}$ cc·cm/cm$^2$·sec·cmHg has not yet been developed industrially. Further, if the air permeation coefficient is more than $25 \times 10^{-12}$ cc·cm/cm$^2$·sec·cm·Hg, the aforementioned air permeation preventive property of the thermoplastic elastomer composition will be decreased and the function of the air permeation preventive layer of the tire will no longer be performed. In relation to this, even if the amount of the thermoplastic resin mixed is less than 10% by weight, the air permeation preventive property will similarly fall and the layer will not be able to be used as the air permeation preventive layer of a tire.

The elastomer component mixed in the thermoplastic elastomer composition according to the present invention as the component (B) is any elastomer having an air permeation coefficient of more than $25 \times 10^{-12}$ cc·cm/cm$^2$·sec·cmHg and a Young's modulus of not more than 500 MPa or any blend of the same or an elastomer composition comprising these plus compounding agents generally blended into elastomers for improving the dispersion, heat resistance, etc. of the elastomer such as reinforcing agents, fillers, cross-linking agents, softeners, antioxidants, and processing aids added as necessary. The amount mixed is at least 10% by weight, preferably 10 to 85% by weight, based upon with respect to the total weight of the resin and elastomer component constituting the air permeation preventive layer. Also, the total weight (A)+(B) of the component (A) and the component (B) is a weight of at least 30% by weight, based upon the weight of the polymer component as a whole.

The elastomer constituting this elastomer component is not particularly limited so long as it has the above air permeation coefficient and Young's modulus, but for example the following may be mentioned.

Diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM, EPM), maleic acid-modified ethylene-propylene rubber (M-EPM)), butyl rubber (IIR), isobutylene and aromatic vinyl or diene monomer copolymers, acryl rubber (ACM), ionomers), halogen-containing rubbers (for example, Br-IIR, Cl-IIR, a bromide of isobutylene-p-methylstyrene copolymer (Br-IPMS), chloroprene rubber (CR), hydrin rubbers (CHR, CHC), chlorosulfonated polyethylene (CSM), chlorinated polyethylene (CM), maleic acid-modified chlorinated polyethylene (M-CM)), silicone rubber (for example, methylvinyl silicone rubber, dimethyl silicone rubber, methylphenylvinyl silicone rubber), sulfur-containing rubbers (for example, polysulfide rubber), fluororubber (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned.

According to the present invention, as the third component bondability imparting component (C), an adhesive thermoplastic resin component (C) having adhesiveness with rubber and having a volume fraction×viscosity ratio with the thermoplastic resin of the component (A) satisfying the following relation:

$$\frac{\phi_A}{\phi_C} \times \frac{\eta_C}{\eta_A} < 1.0$$

where, $\phi_A$: volume fraction of thermoplastic resin component (A)

$\phi_C$: volume fraction of adhesive thermoplastic resin component (C)

$\eta_A$: melt viscosity of thermoplastic elastomer component (A) during melt mixing $\eta_C$: melt viscosity of adhesive thermoplastic resin component (C) during melt mixing, is mixed in an amount of 1 to 75% by weight, preferably 5 to 30% by weight, based on the total weight of the components (A), (B), and (C). If the amount mixed is smaller, the adhesion with the opposing rubber layer becomes insufficient, while conversely if too great, the air permeation coefficient becomes too large and the modulus of elasticity becomes too high making it impractical.

As specific examples of the thermoplastic resin of the third component (C) according to the present invention, a modified thermoplastic resin having a group superior in chemical reactivity with the opposing rubber layer such as a graft compound of a maleic acid anhydride modified with ethylene ethyl acrylate (EEA-g-MAH) and an ethylene ethylacrylate-glycidyl methacrylate copolymer (EEA-co-GMA) may be mentioned.

The ratio between the total amount of the specific thermoplastic resin components (A) and (C) and the elastomer component (B) may be suitably determined considering the balance between the thickness of the film, the air permeation preventive property, and the flexibility, but the preferable range is a ratio of (A)/(C) of 10/90 to 90/10, more preferably 15/85 to 85/15.

The thermoplastic elastomer composition of the present invention, as explained above, contains as essential components the polymer components (A), (B), and (C) having the specified air permeation coefficients and Young's modulii. If illustrated, the result is as shown in the graph of FIG. 1. In FIG. 1, the component (A) corresponds to the region X, the component (B) corresponds to the region Y, and the component (C) is determined by satisfaction of the condition of the volume fraction×viscosity ratio with the component (A) of the relation $[(\phi_A/\phi_C] \times [\eta_C/\eta_A] < 1.0$, but the thermoplastic elastomer component obtained corresponds to the region Z.

In the present invention, the thermoplastic resins $A_1$ to $A_n$ belonging to the component (A) are decided and the average value Aav of the same (=$\Sigma\phi_i A_i$ (i=1 to n), where $\phi_i$ is the percent weight of Ai) is found. The point Aav and the point P of the air permeation coefficient of $25 \times 10^{-12}$ cc·cm/cm$^2$·sec·cmHg and the Young's modulus of 500 MPa are connected by a straight line and the line AavP extrapolated. By selecting and mixing in a suitable ratio components (B) falling in the region Y, that is, elastomers with an average value Bav of $B_1$ to $B_n$ (=$\Sigma\phi_i B_i$ (i=1 to n), where $\phi_i$ is the percent weight of Bi) falling in the region S below this line and above the air permeation coefficient $25 \times 10^{-12}$ cc·cm/cm$^2$·sec·cmHg and further adding the component (C) in an amount satisfying the above conditions, it is possible to obtain the desired thermoplastic elastomer composition falling in the region Z.

By satisfying the region Z explained above, the adhesive thermoplastic resin (C) concentrates at the outside of the thermoplastic resin (A) in a manner surrounding the thermoplastic resin (A), that is, a large amount of the adhesive thermoplastic resin (C) concentrates at the interface with the rubber layer, so it is possible to achieve adhesiveness efficiently by mixing a small amount of the adhesive thermoplastic resin (C).

Below, a more detailed explanation will be given of a pneumatic tire having an air permeation preventive layer produced using the thermoplastic elastomer composition of the present invention.

The air permeation preventive layer of the pneumatic tire according to the present invention can be positioned at any position inside the tire, that is, at the inside or outside of the carcass layer or at other positions in contact with the rubber layer of various tire members. The point is that the object of the present invention be achieved by arrangement to enable prevention of the permeation and diffusion of air from the inside of the tire and enable the air pressure in the tire to be maintained over a long period.

Figure 2:
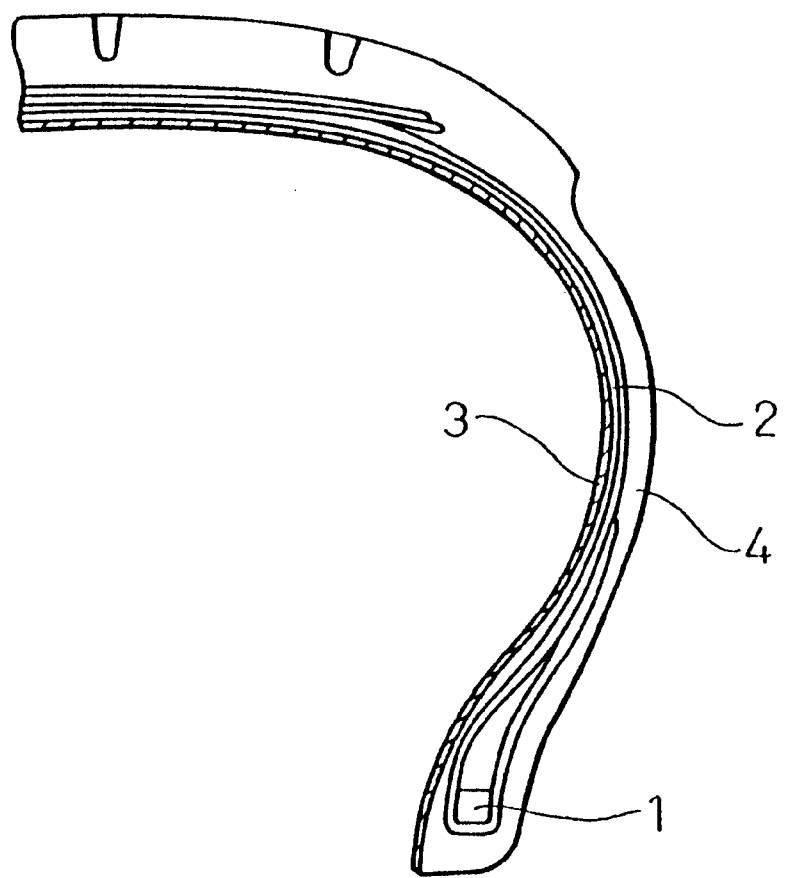
FIG. 2 is a plane sectional view in the meridial direction of the structure of a pneumatic tire using a thermoplastic elastomer of the present invention for an inner liner layer.

FIG. 2 is a partial sectional view along the meridial direction showing a typical example of the arrangement of an air permeation preventive layer of a pneumatic tire. In FIG. 2, a carcass layer 2 is arranged between a pair of left and right bead cores 1, 1. The inner liner layer 3 is provided at the inner surface of the tire at the inside of the carcass layer 2. In FIG. 2, 4 shows a side wall.

The production process of the thermoplastic elastomer composition constituting the air permeation preventive layer in the present invention comprises melt-mixing a thermoplastic resin component comprised of the components (A) and (C) and an elastomer (in the case of a rubber, unvulcanized) component (B) by a twin-screw kneader/extruder etc. to cause the elastomer component to disperse into the thermoplastic resin forming the continuous phase. When vulcanizing the elastomer component, the vulcanization agent may be added while mixing to cause the elastomer to dynamically vulcanize. Further, the various compounding agents (except the vulcanization agent) may be added to the thermoplastic resin component or the elastomer component during the above mixing, but are preferably mixed before the mixing. The kneader used for mixing the thermoplastic resin and elastomer is not particularly limited, but a screw extruder, kneader, Banbury mixer, twin-screw kneader/extruder, etc. may be mentioned. Among these, for mixing a resin component and rubber component and for the dynamic vulcanization of the rubber component, a twin-screw kneader/extruder is preferably used. Further, it is possible to use two or more types of kneaders and successively perform mixing. As the conditions for the melt mixing, the temperature should be at least the temperature at which the thermoplastic resin melts. Further, the shear rate at the time of mixing is preferably 500 to 7500 $sec^{-1}$. The time for the overall mixing is from 30 sec to 10 minutes. Further, when adding a vulcanization agent, the vulcanization time after addition is preferably from 15 sec to 5 minutes. The thermoplastic elastomer composition produced by the above process has a dispersed structure with the thermoplastic resin component forming a continuous phase and the cross-linked elastomer component forming the dispersed phase (domain), so has a stable dispersed structure and exhibits the properties of vulcanized rubber and can be formed into a film by extrusion using a resin-use extruder. At the time of extrusion, with the polymer composition of the present invention, the component (C) in the matrix concentrates at the surface portion of the film. The thin film obtained as a result is structured as a matrix of the thermoplastic resin (A) in which part of the elastomer component (B) is dispersed as a discontinuous phase (domain) and with surface layers comprised of the component (C) sandwiching the same from the two sides.

By adopting such a structure, the thin film obtained from the thermoplastic elastomer composition of the present invention maintains the function of imparting a balance of the flexibility, rubbery elasticity, and air permeation preventive property and remarkably improves the adhesiveness with the rubber layer at the time of vulcanization of the tire.

By selecting the matrix resin components (A) and (C), the way the strength of the bond between the thin film obtained by extrusion and the rubber layer is manifested at the time of extrusion differs. This point will be explained using FIGS. 3(a), 3(b), and 3(c).

FIG. 3(a) shows that when using as the matrix resin components (A) and (C) components (A) and (C) where $\eta_A > \eta_C$ over the entire specific temperature range, the adhesiveness increases remarkably in the range of a small amount of mixing of the component (C). FIG. 3(c) shows that when components (A) and (C) where $\eta_A < \eta_C$ over the entire specific temperature range, the adhesiveness increases remarkably in the range of a large amount of mixing of the component (C). Further, FIG. 3(b) shows that when using components (A) and (C) where $\eta_A < \eta_C$ below a specific temperature and where $\eta_A > \eta_C$ above the entire specific temperature, the adhesiveness exhibits the same behavior as with the case of FIG. 3(a) in the range of a small amount of mixing of the component (C) and exhibits the same behavior as the case of FIG. 3(c) in the range of a large amount of mixing of the component (C).

Note that, here, the melt viscosity means the melt viscosity of any temperature or component at the time of melt mixing. The melt viscosity of each polymer material is dependent on the temperature, the shear rate ($sec^{-1}$), and the shear stress, so the stress and shear rate of the polymer material at any temperature in the molten state capable of flowing through a capillary, in particular, the temperature region at the time of mixing, are measured and the melt viscosity measured by the following formula:

$\eta = \sigma/\dot{\gamma}$ (where, $\sigma$: shear stress, $\dot{\gamma}$: shear rate)

Note that, the melt viscosity is measured by using a Capillary Rheometer Capillograph 1C made by Toyo Seiki Seisakusho Ltd.

Further, FIG. 3 shows the phase state of the thin film obtained by extrusion in the case of selection and use of the matrix resin components (A) and (C) in FIG. 3(a) and FIG. 3(c).

Next, explaining the process of producing a pneumatic tire having an air permeation preventive layer comprised of a thin film of a thermoplastic elastomer composition according to the present invention taking as an example the case where the inner liner layer 3 is disposed at the inside of the carcass layer 2, the thermoplastic elastomer composition of the present invention is extruded into a thin film of a predetermined width and thickness and wrapped as a cylinder over a tire shaping drum. A carcass layer comprised of the unvulcanized rubber, a belt layer, a tread layer, and other members used for producing usual ties are successively superposed, then the drum is pulled out to obtain a green tire. Next, the green tire is heated and vulcanized by an ordinary method to produce the desired lighter weight pneumatic tire. Note that a similar procedure may be followed when providing the air permeation preventive layer at the outer periphery of the carcass layer as well.

The material of the rubber layer which to air permeation preventive layer of the present invention is bonded with is not particularly limited and may be made any rubber material generally used as a tire use rubber material in the past. Examples of such a rubber are a rubber composition comprising NR, IR, BR, SBR, and other diene rubbers, halogenated butyl rubbers, ethylene-propylene copolymer rubbers, styrene elastomers, and the like in which carbon black and other reinforcing agents, process oil and other softeners, plasticizers, vulcanization agents, and other compounding agents have been added.

The air permeation preventive layer according to the present invention has an air permeation coefficient of not more than $25 \times 10^{-12}$ cc·cm/cm$^2$·sec·cmHg, preferably not more than $5 \times 10^{-12}$ cc·cm/cm$^2$·sec·cmHg. By making the air permeation coefficient not more than $25 \times 10^{-12}$ cc·cm/cm$^2$·sec·cmHg, it is possible to reduce the thickness of the air permeation preventive layer to less than one-half the thickness of a conventional air permeation preventive layer.

On the other hand, the Young's modulus is 1 to 500 MPa, preferably 10 to 300 MPa, and the thickness 0.02 to 1.0 mm, preferably 0.05 to 0.5 mm. If the Young's modulus is less than 1 MPa, wrinkles occur during the shaping of the tire etc. and the handling becomes difficult, while conversely if more than 500 MPa, the layer is unable to follow deformation of the tire during tire use.

According to a fifth aspect of the present invention, there is provided a rubber and thermoplastic elastomer laminate having as a gas permeation preventive layer a thermoplastic elastomer composition having an air permeation coefficient of not more than $25 \times 10^{-12}$ cc·cm/cm$^2$·sec·cmHg and a Young's modulus of 1 to 500 MPa and having a rubber composition layer laminated over that layer, comprising:

(A) at least one thermoplastic resin having an air permeation coefficient of not more than $25 \times 10^{-12}$ cc·cm/cm$^2$·sec·cmHg and a Young's modulus of more than 500 MPa in an amount of at least 10% by weight, based upon the weight of the overall polymer component, (B) at least one elastomer component having an air permeation coefficient of more than $25 \times 10^{-12}$ cc·cm/cm$^2$·sec·cmHg and a Young's modulus of not more than 500 MPa in an amount of at least 10% by weight, based upon the weight of the overall polymer component, the total weight (A)+(B) of the component (A) and the component (B) being at least 30% by weight, based upon the weight of the overall polymer component, and (C), in the thermoplastic resin of the component (A), an epoxide of a block copolymer comprised of a vinyl aromatic compound and a conjugated diene compound and/or its partial hydrogenate in 3 to 50% by weight.

According to the present invention, further, there is provided a rubber and thermoplastic elastomer laminate wherein a thin film comprised mainly of an epoxide of a block copolymer comprised of a vinyl aromatic compound and conjugated diene compound contained in the component (C) and/or its partial hydrogenate is laminated interposed between the thermoplastic elastomer composition layer comprised of the components (A) and (B). and rubber composition layer.

For the thermoplastic resin mixed as the component (A) in the thermoplastic elastomer composition used for the air permeation preventive layer according to the present invention, any thermoplastic resin having an air permeation coefficient of not more than $25 \times 10^{-12}$ cc·cm/cm²·sec·cmHg, preferably $0.1 \times 10^{-12}$ to $10 \times 10^{-12}$ cc·cm/cm²·sec·cmHg, and a Young's modulus of more than 500 MPa, preferably 500–3000 MPa may be used. The amount mixed is at least 10% by weight, preferably 20 to 85% by weight, based upon the total weight of the polymer component including the thermoplastic resin and rubber.

As the thermoplastic resin, for example, the following thermoplastic resins and any thermoplastic resin mixtures of the same or including the same may be mentioned. Further, it may be a thermoplastic resin component containing an antioxidant, agent for prevention of heat deterioration, stabilizer, processing aid, pigment, dye, etc.

Polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP copolymer, and nylon 66/PPS copolymer), polyester resins (for example, polybutylene terephthalate (PBT), polyethylene terephthalate (PET), polyethylene isophthalate (PEI), polybutylene terephthalate/tetramethylene glycol copolymer, PET/PEI copolymer, polyacrylate (PAR), polybutylene naphthalate (PBN), liquid crystal polyester, polyoxyalkylene diimidate/polybutyrate terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), polymethacrylate resins (for example, polymethyl methacrylate (PMMA) and polyethyl methacrylate), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), cellulose resins (for example, cellulose acetate and cellulose acetate butyrate), fluororesins (for example, polyvinylidene fluoride (PVDF), polyvinyl fluoride (PVF), polychlorofluoroethylene (PCTFE), and tetrafluoroethylene/ethylene copolymer (ETFE)), imide resins (for example, aromatic polyimide (PI)), etc. may be mentioned.

As explained above, these thermoplastic resins must have the specific air permeation coefficient, Young's modulus, and amount of mixing. No material having a flexibility of a Young's modulus of not more than 500 MPa and an air permeation coefficient of not more than $25 \times 10^{-12}$ cc·cm/cm²·sec·cmHg has yet been developed industrially. Further, if the air permeation coefficient is more than $25 \times 10^{-12}$ cc·cm/cm²·sec·cmHg, the afore-mentioned air permeation preventive property of the polymer composition for a tire and gas permeation preventive property of a gas permeation preventive polymer composition for a hose will be decreased and the function of the air permeation preventive layer of a tire or gas permeation preventive layer of a hose will no longer be performed. Further, if the amount of the thermoplastic resin mixed is less than 10% by weight, similarly the gas permeation preventive property will fall and the composition will not be able to be used as the gas (air) permeation preventive layer of a tire.

The elastomer component mixed as the component (B) in the thermoplastic elastomer composition according to the present invention is any elastomer having an air permeation coefficient of larger than $25 \times 10^{-12}$ cc·cm/cm²·sec·cmHg and a Young's modulus of not more than 500 MPa or any mix of the same or an elastomer composition comprising these plus compounding agents generally mixed into elastomers for improving the dispersion, heat resistance, etc. of the elastomer such as reinforcing agents, fillers, cross-linking agents, softeners, antioxidants, and processing aids added as necessary. The amount mixed is at least 10% by weight, preferably 10 to 85% by -weight, based upon the total weight of the polymer component including the thermoplastic resin and elastomer component comprising the air permeation preventive layer.

The elastomer constituting this elastomer component is not particularly limited so long as it has the above air permeation coefficient and Young's modulus, but for example the following may be mentioned.

Diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM, EPM), maleic acid-modified ethylene-propylene rubber (M-EPM)), butyl rubber (IIR), isobutylene and aromatic vinyl or diene monomer copolymers, acryl rubber (ACM), ionomers, halogen-containing rubbers (for example, Br-IIR, Cl-IIR, a bromide of isobutylene-p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), silicone rubber (for example, methylvinyl silicone rubber, dimethylsilicone rubber, methylphenylvinyl silicone rubber), sulfur-containing rubbers (for example, polysulfide rubber), fluoro rubbers (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned.

According to the present invention, further, as the third component adhesive imparting component (C), an epoxide of a block copolymer comprised of a vinyl aromatic compound and a conjugated diene compound and/or its partial hydrogenate is mixed into the thermoplastic resin composition of the component (A) in an amount of 3 to 50% by weight, preferably 5 to 20% by weight. If the amount mixed is smaller, the adhesion with the opposing rubber component becomes insufficient, while conversely is too great, the air permeation coefficient becomes too large and the modulus of elasticity becomes too low making it impractical.

Further, according to the present invention, a thin film comprised mainly of the third component adhesiveness imparting component (C) is interposed between the thermoplastic elastomer composition layer comprised of the components (A) and (B) and rubber composition layer for use in bonding the rubber and thermoplastic elastomer laminate. The thickness of the thin film used as this bonding layer is 5 to 200 μm, preferably 10 μm to 100 μm.

As the vinyl aromatic compound comprising the polymer block comprised mainly of a vinyl aromatic compound used for the third component (C), for example, one or more may be selected from styrene, α-methylstyrene, vinyltoluene, P-t-butylstyrene, divinylbenzene, P-methylstyrene, 1,1-diphenylstyrene, and the like. Among these, styrene is preferable. Further, as the conjugated diene compound, one or more types may be selected from butadiene, isoprene, 1,3-pentadiene, 2,3-dimethyl-1,3-butadiene, piperidine, 3-butyl-1,3-octadiene, phenyl-1,3-butadiene, and the like. Among these, butadiene, isoprene, and combinations of the same are preferred.

The block copolymer referred to here means a block copolymer comprised of a polymer block consisting mainly of a vinyl aromatic compound and a polymer block consisting mainly of a conjugated diene compound. The ratio of copolymerization of the vinyl aromatic compound and the conjugated diene compound is 5/95 to 70/30, preferably 10/90 to 60/40. Further, the weight average molecular weight of the block copolymer used in the present invention is 10,000 to 400,000, preferably 50,000 to 250,000. Further, the molecular structure of the block copolymer may be a straight, branched, radial, or any combinations of the same. Further, the unsaturated bonds of the conjugated diene compound of the block copolymer may be partially hydrogenated. The hydrogenation of the conjugated diene compound gives an unsaturation of at least 5%, preferably at least 10%.

In the present invention, the epoxy modified block copolymer used in the present invention is obtained by epoxylating the block copolymer. The epoxy modified block copolymer in the present invention can be obtained by causing a reaction between the block copolymer and a hydroperoxide, peracid, or another epoxylating agent in an inert solvent. As the peracid, there are performic acid, peracetic acid, perbenzoic acid, trifluoroperacetic acid, etc. Among these, peracetic acid is a preferable epoxylating agent. At the time of epoxylation, a catalyst may be used in accordance with need. For example, in the case of a peracid, sodium carbonate or other alkalies and sulfuric acid and other acids may be used as a catalyst. Further, in the case of a hydroperoxide, a mixture of tungstenic acid and caustic soda may be used together with hydrogen peroxide, an organic acid with hydrogen peroxide, or molybdenum hexacarbonyl with tertiary butyl hydroperoxide to obtain a catalytic effect.

The material of the rubber layer to which the gas (air) permeation preventive layer in the rubber and thermoplastic elastomer laminate of the present invention is adhered is not particularly limited and may be made any rubber material generally used as a tire use or hose use rubber material in the past. Examples of such a rubber are a rubber composition comprising NR, IR, BR, SBR, NBR, and other diene rubbers, hydrogenated NBR (HNBR), butyl rubber, halogenated butyl rubbers, halides of isoprene-P-methylstyrene copolymers (X-IPMS), chloroprene rubber (CR), chlorinated polyethylene (CM), chlorosulfonated polyethylene (CSM), ethylene-propylene copolymer rubber (EPM), ethylene-propylene-diene three-way copolymer rubber (EPDM), ethylene-methylacrylate copolymer (EMA), styrene elastomers, etc. in which carbon black or other reinforcing agents, process oil and other softeners, plasticizers, vulcanization agents, vulcanization aids, antioxidants, processing aids, and other compounding agents are added.

The ratio of composition of the specific thermoplastic resin component (A) and elastomer component (B) constituting the thermoplastic elastomer composition may be suitably determined by the balance of the thickness of the film, air permeation preventive property, and flexibility, but preferably the range is, in terms of the ratio of (A)/(B), 10/90 to 90/10, more preferably 15/85 to 80/20.

The thermoplastic elastomer composition of the present invention, as explained above, contains as essential components the thermoplastic resin component (A) and the elastomer component (B) having the specified air permeation coefficients and Young's modulii. If illustrated, the result is as shown in the graph of FIG. 1. In FIG. 1, the component (A) corresponds to the region X, the component (B) corresponds to the region Y, and the thermoplastic elastomer composition obtained corresponds to the region Z.

Below, a more detailed explanation will be given of a pneumatic tire having an air permeation preventive layer produced using the rubber and thermoplastic elastomer laminate of the present invention.

The air permeation preventive layer of the pneumatic tire according to the present invention can be positioned at any position inside the tire, that is, at the inside or outside of the carcass layer or at other positions. The point is that the object of the present invention be achieved by arrangement to enable prevention of the permeation and diffusion of air from the inside of the tire and enable the air pressure in the tire to be maintained over a long period.

A typical example of the arrangement of an air permeation preventive layer of a pneumatic tire is shown in the partial sectional view along the meridial direction of FIG. 2.

The production process of the thermoplastic elastomer composition constituting the air (gas) permeation preventive layer in the present invention comprises melt-mixing a thermoplastic resin component comprised of the components (A) and (C) and an elastomer (in the case of a rubber, unvulcanized) component (B) by a twin-screw kneader/extruder etc. to cause the elastomer component (B) to disperse as a dispersed phase (domain) into the thermoplastic resin forming the continuous phase (matrix). When vulcanizing the elastomer, the vulcanization agent and if necessary vulcanization aid may be added while mixing to cause the elastomer component to dynamically vulcanize. Further, the various compounding agents (except the vulcanization agent) may be added to the thermoplastic resin or the elastomer component during the above mixing, but are preferably mixed before the mixing. The kneader used for mixing the thermoplastic resin component and the elastomer component is not particularly limited, but a screw extruder, kneader, Banbury mixer, twin-screw kneader/extruder, etc. may be mentioned. Among these, for mixing a thermoplastic resin component and elastomer component and for the dynamic vulcanization of the elastomer component, a twin-screw kneader/extruder is preferably used. Further, it is possible to use two or more types of kneaders and successively perform mixing. As the conditions for the melt mixing, the temperature should be at least the temperature at which the thermoplastic resin component melts. Further, the shear rate at the time of mixing is preferably 500 to 7500 $sec^{-1}$. The time for the overall mixing is from 30 sec to 10 minutes. Further, when adding a vulcanization agent, the vulcanization time after addition is preferably from 15 sec to 5 minutes. The thermoplastic elastomer composition produced by the above process is next formed into a film by extrusion or calendaring. The method of forming the film may be a usual method for forming a film from a thermoplastic resin or thermoplastic elastomer.

Note that the vulcanization agent, vulcanization aids, vulcanization conditions (temperature and time), etc. in the case of dynamic vulcanization may be suitably determined depending upon the composition of the elastomer component added and are not particularly limited.

As the vulcanization agent, a general rubber vulcanization agent (cross-linking agent) may be used. Specifically, as a sulfur vulcanization agent, powdered sulfur, precipitated sulfur, high dispersion sulfur, surface treated sulfur, insoluble sulfur, dimorpholine disulfide, alkylphenol disulfide, and others may be mentioned. For example, they may be used in amounts of about 0.5 to 4 phr (parts by weight per 100 parts by weight of rubber component (polymer)).

Further, as an organic peroxide vulcanization agent, benzoyl peroxide, t-butyl hydroperoxide, 2,4-bichlorobenzoyl peroxide, 2,5-dimethyl-2,5-di(t-butylperoxy)hexane, 2,5-dimethylhexane-2,5 -di(peroxylbenzoate), etc. may be mentioned and, for example, may be used in amounts of 1 to 20 phr.

Further, as a phenol resin vulcanization agent, a bromide of an alkylphenol resin or a mixed cross-linking system containing stannous chloride, chloroprene, or another halogen donor and an alkylphenol resin may be mentioned and used in for example an amount of 1 to 20 phr.

In addition, zinc white (about 5 phr), magnesium oxide (about 4 phr), litharge (about 10 to 20 phr), p-quinoneoxime, p-dibenzoylquinoneoxime, tetrachloro-p-benzoquinone, poly-p-dinitrosobenzene (about 2 to 10 phr), and methylenedianiline (about 0.2 to 10 phr) may be mentioned.

Further, optionally, a vulcanization accelerator may be added. As the vulcanization accelerator, an aldehyde-ammonia, guanidine, thiazole, sulfenamide, thiuram, dithio carbamate, thiourea, or other general vulcanization accelerator may be used in an amount, for example, of about 0.5 to 2 phr.

Specifically, as an aldehyde-ammonia vulcanization accelerator, hexamethylene tetramine etc., as a guanidine vulcanization accelerator, diphenyl guanidine etc., as a thiazole vulcanization accelerator, dibenzothiazyl disulfide (DM), 2-mercaptobenzothiazole and its Zn salt, cyclohexylamine salt, etc., as a sulfenamide vulcanization accelerator, cyclohexylbenzothiazyl sulfenamide (CBS), N-oxydiethylene benzothiazyl-2-sulfenamide, N-t-butyl-2-benzothiazolesulfenamide, 2-(thymolpolynyldithio) benzothiazole, etc., as a thiuram family vulcanization accelerator, tetramethylthiuram disulfide (TMTD), tetraethylthiuram disulfide, tetramethylthiuram monosulfide (TMTM), dipentamethylenethiuram tetrasulfide, etc., as a dithio acid salt vulcanization accelerator, Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, etc., and as a thiourea family vulcanization accelerator, ethylene thiourea, diethyl thiourea, etc. may be mentioned.

Further, as a vulcanization acceleration aid, any aid generally used for rubber, may be used together. For example, zinc white (about 5 phr), stearic acid or oleic acid and their Zn salts (about 2 to 4 phr) etc. may be used.

The thin film thus obtained has a structure of a continuous phase (matrix) of the thermoplastic resin components (A) and (C) in which at least part of an elastomer component (B) is dispersed as a discontinuous phase (domain).

By adopting such a dispersed structure, it is possible to impart a balance of flexibility and air permeation preventive property and obtain effects derived from rubbery elasticity such as an improvement of resistance to heat deformation and improvement of water resistance. Further, since processing like a thermoplastic resin becomes possible, it is possible to form a film by an ordinary resin-use shaping machine such as by extrusion or calendaring.

Further, as a separate process of the present invention, the production process of a thermoplastic elastomer composition constituting the gas (air) permeation preventive layer comprised of the thermoplastic resin component (A) and elastomer component (B) comprises following the same method and conditions as above to melt knead the thermoplastic component (A) and elastomer (in the case of a rubber, unvulcanized) component (B) by a twin-screw kneader/extruder etc. then forming it into a film.

The thin film thus obtained has a structure of a continuous phase (matrix) of the thermoplastic resin component (A) in which the elastomer component (B) is dispersed as a discontinuous phase (domain)

Further, the adhesiveness imparting composition of the component (C) may be mixed and formed alone in the same way as the above composition to form a film. In the case of a single composition, it may be formed into a film as it is by a resin-use extruder and provided between the air permeation preventive layer and the rubber composition layer facing at least one of the surfaces of the same to form a laminate structure.

Further, as another mode of the process for formation of a laminate of the gas (air) permeation preventive layer comprised of the components (A) and (B) and the adhesiveness imparting layer comprised of the component (C), it is possible to simultaneously extrude the gas (air) permeation preventive layer composition and the adhesiveness imparting layer composition separately using separate resin-use extruders and provide a common sheeting die at the-fronts of the two extruders to form a double layer film so as to obtain a double layer film joined in advance and use this as the laminate sheet for forming the tire.

Explaining the process of producing a pneumatic tire having an air permeation preventive layer comprised of a thin film of a thermoplastic elastomer composition according to the present invention taking as an example the case where the inner liner layer 3 is disposed at the inside of the carcass layer 2, in a first mode, the thermoplastic elastomer composition of the present invention ((A)+(B)+(C)) is extruded into a thin film of a predetermined width and thickness and wrapped as a cylinder over a tire shaping drum. Further, as a second mode, the thermoplastic elastomer composition ((A)+(B)) constituting the air permeation preventive layer of the present invention and the thermoplastic resin or thermoplastic resin composition (C) constituting the adhesiveness imparting layer are extruded into thin films of the predetermined widths and thicknesses and wrapped as cylinders over the tire shaping drum. In both modes, a carcass layer comprised of the unvulcanized rubber, a belt layer, a tread layer, and other members used for producing usual tires are successively superposed, then the drum is pulled out to obtain a green tire. Next, the green tire is heated and vulcanized by an ordinary method to produce the desired lighter weight pneumatic tire. Note that a similar procedure may be followed when providing the air permeation preventive layer at the outer periphery of the carcass layer as well.

While the thermoplastic elastomer composition and process of production and the tire of the present invention were explained above, the present invention is not limited to these examples. Various improvements and modifications may of course be made in the range not out of the gist of the invention.

The gas permeation preventive layer according to the present invention has an air permeation coefficient of not more than $25 \times 10^{-12}$ cc·cm/cm$^2$·sec·cmHg, preferably not more than $5 \times 10^{-12}$ cc·cm/cm$^2$·sec·cmHg. By making the air permeation coefficient not more than $25 \times 10^{-12}$ cc·cm/cm$^2$·sec·cmHg, it is possible to reduce the thickness of the gas (air) permeation preventive layer to less than one-half the thickness of a conventional air permeation preventive layer.

On the other hand, the Young's modulus is 1 to 500 MPa, preferably 10 to 300 MPA, and the thickness 0.02 to 1.0 mm, preferably 0.05 to 0.5 mm. If the Young's modulus is less than 1 MPa, wrinkles occur during the shaping of the tire etc. and the handling becomes difficult, while conversely if more than 500 MPa, the layer is unable to follow deformation of the tire during tire use.

According to a sixth aspect of the present invention, there is provided a rubber and thermoplastic elastomer laminate comprised of a layer comprised of a thermoplastic elastomer composition (A) containing a polyamide thermoplastic resin composition containing an elastomer composition and at least one compound selected from (i) copper halide, a hindered phenol, a hindered amine, and an aromatic amine and a layer comprised of a rubber composition (B) laminated together.

According to the present invention, further, there is provided a rubber and thermoplastic elastomer laminate wherein said thermoplastic elastomer composition (A) contains (ii) a crystalline nucleating agent or crystallization prevention agent.

According to the present invention, there is provided a pneumatic tire using a rubber and thermoplastic elastomer laminate structure comprised of a layer comprising the thermoplastic elastomer composition (A) or a layer comprising the thermoplastic elastomer composition (A) plus (ii) a crystalline nucleating agent or crystallization prevention agent and a layer comprising the rubber composition (B), and therefore, is superior in gas permeation preventive property and flexibility and has resistance to heat deterioration and resistance to splitting upon flexing in the face of dynamic fatigue during use which makes it free from heat deformation at the time of shaping and able to withstand stringent usage conditions.

The thermoplastic elastomer composition used for this rubber and thermoplastic elastomer laminate of the present invention is a composition comprised of a polyamide thermoplastic resin composition and elastomer composition wherein at least part of the polyamide thermoplastic resin composition forms a continuous phase (matrix) and at least part of the elastomer composition is uniformly mixed as a dispersed phase (domain) in this continuous phase. The blending ratio may be suitably determined by the balance of the film thickness, gas permeation preventive property, flexibility, etc., but a preferable range is a ratio of the polyamide family thermoplastic resin/elastomer composition, in parts by weight, of 10/90 to 90/10, more preferably 15/85 to 90/10.

For the polyamide thermoplastic resin, any polyamide resin having an air permeation coefficient of not more than $25 \times 10^{-12}$ cc·cm/cm$^2$·sec·cmHg, preferably $0.1 \times 10^{-12}$ to $10 \times 10$ cc·cm/cm$^2$·sec·cmHg, and a gas permeation coefficient for freon gas (HFC134a) of not more than 5.0 mg·mm/24 h·cm$^2$, preferably not more than 2.0 mg·mm/24 h·cm$^2$, and a Young's modulus of more than 500 MPa, preferably 500 to 3000 MPa can be used. As the polyamide resin, for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP. copolymer, and nylon 66/PPS copolymer may be mentioned.

Further, for the elastomer, any elastomer component having an air permeation coefficient of larger than $25 \times 10^{-12}$ cc·cm/cm$^2$·sec·cmHg and a Young's modulus of not more than 500 MPa or any blend of the same or an elastomer composition comprising these plus compounding agents generally blended into elastomers for improving the dispersion, heat resistance, etc. of the elastomer such as reinforcing agents, fillers, cross-linking agents, softeners, antioxidants, and processing aids added as necessary, can be used.

As the elastomer, for example, diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM, EPM), maleic acid-modified ethylene-propylene rubber (M-EPM)), butyl rubber (IIR), isobutylene and aromatic vinyl or diene monomer copolymers, acryl rubber (ACM), ionomers), halogen-containing rubbers (for example, Br-IIR, CI-IIR, a bromide of isobutylene-p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), silicone rubber (for example, methylvinyl silicone rubber, dimethyl silicone rubber, methylphenylvinyl silicone rubber), sulfur-containing rubbers (for example, polysulfide rubber), fluoro rubbers (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned.

According to the present invention, the thermoplastic elastomer composition comprised of the polyamide thermoplastic resin composition and elastomer composition has mixed therein, based upon 100 parts by weight of the polyamide thermoplastic resin composition, (i) at least one compound selected from a copper halide, hindered phenol, hindered amine, and aromatic amine in an amount of 0.001 to 1.0 part by weight, preferably 0.005 to 0.5 part by weight, or, in addition to the above compound of (i), (ii) a crystalline nucleating agent or crystallization prevention agent in an amount, in terms of the total amount of (i) and (ii), of 0.001 to 1.0 part by weight, preferably 0.01 to 0.5 part by weight. If the amount blended is smaller than this, the desired resistance to heat deterioration and resistance to splitting upon flexing of the rubber and thermoplastic elastomer laminate are not manifested, while conversely if too large, more than a certain extent of action and effect are not achieved, so there is waste economically.

As the copper halide in above additives (i), for example, cuprous iodide, cupric iodide, cuprous chloride, cupric chloride, cuprous bromide, cupric bromide, cuprous fluoride, cupric fluoride, and mixtures of these halogenated copper compounds and halogenated potassium etc.; and as the hindered phenols, n-octadecyl-3-(4'-hydroxyl-3',5'-di-t-butylphenyl)propionate, 1,1,3-tris(2-methyl-4-hydroxy-5-t-butylphenyl)butane, 1,3,5-trimethyl-2,4,6-tris(3,5-di-t- butyl-4-hydroxyphenyl)benzylbenzene, 1,3,5-tris(4-hydroxy-3,5-di-t-butylbenzyl)-S-triazine-2,4,6-(1H,3H, 5H)-trione, ethyleneglycol-bis-[3,3-bis(3'-t-butyl-4'-hydroxyphenyl)butyrate], tetrakis[methylene-3(3,5-di-t-butyl-4-hydroxyphenyl)propionate]methane, 3,9-bis[2-{3-(3-t-butyl-4-hydroxy-5-methylphenyl)propionyloxy}-1,1-dimethylethyl]2,4,8,10-tetraoxaspiro[5,5]undecane, 1,6-hexanediol-bis[3-(3,5-di-t-butyl-4-hydroxyphenyl) propionate], triethyleneglycol-bis[3-(3-t-butyl-5-methyl-4-hydroxyphenyl)propionate], N,N'-hexamethylenebis(3,5-di-t-butyl-4-hydroxycinnamamide), N,N'-bis[3-(3,5-di-t-butyl-4-hydroxylphenyl)propionyl]hydrazine, 2,2'-oxamide-bis-ethyl-3(3,5-di-t-butyl-4-hydroxyphenyl)propionate, 2,2'-methylene-bis(4-methyl-6-t-butylphenol)terephthalate, 1,3,5-tris[(3,5-di-t-butyl-4-hydroxyphenyl)propionyloxyethyl] isocyanulate, 2,2'-thio-diethylenebis[3-(3,5-di-t-butyl-4-hydroxyphenyl)propionate], and 2,2-bis[4-{2-(3,5-di-t-butyl-4-hydroxyhydrocinnamoyloxy)}ethoxyphenyl] propane may be mentioned.

Further, as the hindered amine, dimethyl succinate-1-(2-hydroxyethyl)-4-hydroxy-2,2,6,6-tetramethylpiperidine condensate, poly[{6-(1,1,3,3)-tetramethylbutyl)imino-1,3, 5-triazine-2,4-diyl}{2,2,6,6-tetramethyl-4-piperidyl) imino}hexamethylene{(2,2,6,6)-tetramethyl-4-piperidyl) imino}], 2-[3,5-di-t-butyl-4-hydroxybenzyl)-2-n-butylmalonate bis(1,2,2,6,6-pentamethyl-4-piperidyl), N,N'-bis(3-aminopropyl)ethylenediamino-2,4-bis [N-butyl-N-(1, 2,2,6,6-pentamethyl-4-piperidyl)amino]-6-chloro-1,3,5-triazine condensate, etc.; while as the aromatic amine, phenyl-β-naphthylamine, phenyl-α-napthylamine, 1,2-dihydro-2,2,4 -trimethylquinoline, β-ethoxy-1,2-dihydro-2, 2,4-trimethyl.quinoline, N-N'-diphenyl-p-phenylenediamine, N-isopropyl-N'-phenyl-p-phenylenediamine, diallyl-p-phenylenediamine, N-phenyl-N'-(1,3dimethylbutyl)-p-phenylenediamine, etc. may be mentioned.

As the crystalline nucleating agent in the additives (ii), inorganic particulate matter (for example, talc, silica, and graphite), metal oxides (for example, magnesium oxide and aluminum oxide), oligomers (for example, caprolactam dimers), high melting point nylon (having melting points of more than 200° C., for example, nylon 6, nylon 66, nylon 6/66, nylon 6T, nylon 22, and nylon 46), carboxylic acids (for example, adipic acid and benzoic acid), carboxylic acid amides (for example, succinamide, malonamide, and phthalamide), carboxylic acid metal salts (for example, sodium adipate and sodium benzoate), higher alcohol waxes (for example, cetyl alcohol, stearyl alcohol, and oleyl alcohol), etc. may be used.

Further, as the crystallization prevention agent, lithium chloride, lithium bromide, lithium fluoride, etc. may be effectively used.

When the solubilities of the above specified polyamide family thermoplastic resin and elastomer component in the thermoplastic elastomer composition used for the present invention differ, it is preferable to use as a suitable compatibilizer to make the two components soluble with each other. By mixing a compatibilizer, the surface tension between the polyamide thermoplastic resin and the elastomer component falls and, as a result, the particle size of the elastomer forming the dispersed phase will become finer, and therefore the properties of the two components will be more effectively expressed. As such a compatibilizer, generally it is possible to use a copolymer having the structure or both or one of the polyamide thermoplastic resin and elastomer component or a structure of a copolymer having an epoxy group, carbonyl group, halogen group, amine group, oxazoline group, hydroxy group, etc. reactable with the polyamide thermoplastic resin or elastomer component. These may be selected according to the type of the polyamide thermoplastic resin and elastomer component to be mixed, but as the ones which are normally used, a styrene/ethylene/butylene block copolymer (SEBS) and its maleic acid modified form, EPDM, EPDM/styrene, or EPDM/acrylonitrile graft copolymer and their maleic acid modified forms, styrene/maleic acid copolymer, reactive phenoxy thermoplastic resin, etc. may be mentioned. The amount of the compatibilizer blended is not particularly limited, but preferably is 0.5 to 10 parts by weight, based upon 100 parts by weight of the polymer component (total of the polyamide thermoplastic resin and elastomer component).

The material of the rubber layer in the rubber and thermoplastic elastomer laminate of the present invention is not particularly limited and may be made any rubber material generally used as a tire use rubber material in the past. Examples of such a rubber, are a rubber composition comprising NR, IR, BR, SBR, NBR, and other diene rubbers, butyl rubbers, halogenated butyl rubbers, halides of isoprene-P-methylstyrene copolymers, ethylene-propylene copolymer rubber (EPM), ethylene-propylene-diene trimer rubber (EPDM), CR, CHR, CHC, CM, CSM, and other chlorine rubbers, styrene elastomers, etc. in which carbon black or other reinforcing agents, process oil and other softeners, plasticizers, vulcanization agents, vulcanization aids, antioxidants, processing aids, and other compounding agents are added.

The production process of the thermoplastic elastomer composition (A) in the present invention comprises melt-mixing a polyamide thermoplastic resin and elastomer component (in the case of a rubber, unvulcanized) in advance by a twin-screw kneader/extruder etc. to cause the elastomer component and, during the mixing or before the kneading, adding at least one compound selected from (i) a copper halide, hindered phenol, hindered amine, and aromatic amine. Further, when necessary, a (ii) crystalline nucleating agent or crystallization prevention agent is added simultaneously with or successively after the (i). In this way, the elastomer component and the component (i) alone or the component (i) and the component (ii) are dispersed in the polyamide resin forming the continuous phase (matrix). When vulcanizing the elastomer component, the vulcanization agent and, if necessary, the vulcanization aid, may be added while mixing to cause the elastomer component to dynamically vulcanize. Further, the various compounding agents (except the vulcanization agent and vulcanization aid) may be added to the polyamide thermoplastic resin or the elastomer component during the above mixing, but are preferably mixed before the mixing. The kneader used for mixing the polyamide thermoplastic resin component and elastomer component and the additive component (i) or components (i) and (ii) is not particularly limited, but a screw extruder, kneader, Banbury mixer, twin-screw kneader/extruder, etc. may be mentioned. Among these, for mixing the polyamide thermoplastic resin component and elastomer composition component and additive component (i) or components (i) and (ii) and for the dynamic vulcanization of the elastomer component, a twin-screw kneader/extruder is preferably used. Further, it is possible to use two or more types of kneaders and successively perform mixing. As the conditions for the melt mixing, the temperature should be at least the temperature at which the polyamide thermoplastic resin melts. Further, the shear rate at the time of mixing is preferably 500 to 7500 sec$^{-1}$. The time for the overall mixing is from 30 sec to 10 minutes. Further, when adding a vulcanization agent, the vulcanization time after addition is preferably from 15 sec to 5 minutes.

The thermoplastic elastomer composition according to the present invention may further have mixed therein any agent generally mixed into a polymer formulation such as a filler (calcium carbonate, titanium oxide, alumina, clay, etc.), carbon black, white carbon, and other reinforcing agents, softeners, plasticizers, processing aids, pigments, dyes, and antioxidants to an extent not impairing the requirements of the air (gas) permeation coefficient and Young's modulus.

Further, when the above elastomer component is being mixed with the thermoplastic resin, the elastomer component may be dynamically vulcanized. The vulcanization agents, vulcanization aids, vulcanization conditions (temperature and time), etc. when dynamically vulcanizing the elastomer component may be suitably selected depending upon the composition of the elastomer component added and are not particularly limited.

As the vulcanization agent, a general rubber vulcanization agent (cross-linking agent) may be used. Specifically, as a sulfur vulcanization agent, powdered sulfur, precipitated sulfur, high dispersion sulfur, surface treated sulfur, insoluble sulfur, dimorpholine disulfide, alkylphenamide (CBS), N-oxydiethylenebenzothiazyl-2-sulfenamide, N-t-butyl-2-benzothiazolsulfenamide, 2-(thymolpolynyldithio) benzothiazole, etc. may be mentioned and may be used in amounts of about 0.5 to 4 phr (parts by weight per 100 parts by weight of rubber component (polymer)).

Further, as an organic peroxide vulcanization agent, benzoyl peroxide, t-butyl hydroperoxide, 2,4-bichlorobenzoyl peroxide, 2,5-dimethyl-2,5-di(t-butylperoxy)hexane, 2,5-dimethylhexane-2,5-di(peroxylbenzoate), etc. may be mentioned and for example may be used in amounts of 1 to 20 phr.

Further, as a phenol resin vulcanization agent, a bromide of an alkylphenol resin or a mixed cross-linking system containing stannous chloride, chloroprene, or another halogen donor and an alkylphenol resin may be mentioned and used in, for example, an amount of 1 to 20 phr.

In addition, zinc white (about 5 phr), magnesium oxide (about 4 phr), litharge (about 10 to 20 phr), p-quinoneoxime, p-dibenzoylquinoneoxime, tetrachloro-p-benzoquinone, poly-p-dinitrosobenzene (about 2 to 10 phr), and methylenedianiline (about 0.2 to 10 phr) may be mentioned.

Further, a vulcanization accelerator may be optionally added. As the vulcanization accelerator, an aldehyde-ammonia, guanidine, thiazole, sulfenamide, thiuram, dithio acid salt, thiourea, or other general vulcanization accelerator may be used in an amount, for example, of about 0.5 to 2 phr.

Specifically, as an aldehyde-ammonia vulcanization accelerator, hexamethylene tetramine etc., as a guanidine vulcanization accelerator, diphenyl guanidine etc., as a thiazole vulcanization accelerator, dibenzothiazyl disulfide (DM), 2-mercaptobenzothiazole and its Zn salt, cyclohexylamine salt, etc., as a sulfenamide vulcanization accelerator, cyclohexylbenzothiazyl sulfenamide (CBS), N-oxydiethylene benzothiazyl-2-sulfenamide, N-t-butyl-2-benzothizolesulfenamide, 2-(thymolpolynyldithio) benzothiazole, etc., as a thiuram vulcanization accelerator, tetramethylthiuram disulfide (TMTD), tetraethylthiuram disulfide, tetramethylthiuram monosulfide (TMTM), dipentamethylenethiuram tetrasulfide, etc., as a dithio acid salt vulcanization accelerator, Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, etc., and as a thiourea vulcanization accelerator, ethylene thiourea, diethyl thiourea, etc. may be mentioned.

Further, as a vulcanization acceleration aid, a general rubber use aid may be used together. For example, zinc white (about 5 phr), stearic acid or oleic acid and their Zn salts (about 2 to 4 phr) etc. may be used.

The thermoplastic elastomer composition (A) prepared by the above process is next extruded or calendared to form a film. The process of forming the film may be a process for forming a film from a usual thermoplastic resin or thermoplastic elastomer.

The thin film thus obtained has a structure of a continuous phase (matrix) of the polyamide thermoplastic resin component in which at least part of an elastomer component is dispersed as a discontinuous phase (domain). Further, the additive component (i) or components (i) and (ii) are dispersed uniformly in the continuous phase and the discontinuous phase. By adopting such a dispersed structure, it is possible to impart a balance of flexibility and gas permeation preventive property to the film. Since the elastomer component is dispersed and cross-linked, it is possible to obtain effects such as an improvement of resistance to heat deformation and improvement of solvent resistance and water resistance and, also, through blending of the additive component (i) and the crystalline nucleating agent and crystallization prevention agent (ii), improvement of the resistance to heat deterioration and a good chemical stability, so improvement of the resistance to splitting upon flexing due to vibration fatigue. Further, since the polyamide family thermoplastic resin serves as a continuous phase which covers the dispersed phase of the elastomer component, processing like a polyamide thermoplastic resin becomes possible, so it is possible to form a film by an ordinary resin-use shaping machine such as by extrusion or calendaring.

Explaining the process of producing a pneumatic tire having an air permeation preventive layer comprised of a thin film of the thermoplastic elastomer composition (A) according to the present invention, the thermoplastic elastomer composition (A) mixed as explained above is extruded into a thin film of a predetermined width and thickness and wrapped as a cylinder over a tire shaping drum. A carcass layer comprised of the unvulcanized rubber, a belt layer, a tread layer, and other members used for producing usual tires are successively superposed, then the drum is pulled out to obtain a green tire. Next, the green tire is heated and vulcanized by an ordinary method to produce the desired lighter weight pneumatic tire with the resistance to heat deterioration and resistance to splitting upon flexing. Note that a similar procedure may be followed when providing the air permeation preventive layer at the outer periphery of the carcass layer as well. The material of the rubber layer which to air permeation preventive layer of the present invention is bonded with is not particularly limited and may be made any rubber material generally used as a tire use rubber material in the past (for example, a rubber composition comprising NR, IR, BR, SBR, and other diene rubbers, halogenated butyl rubbers, ethylene-propylene copolymer rubbers, styrene elastomers, and the like in which carbon black, process oil, vulcanization agents, and other compounding agents have been added).

According to a seventh aspect of the present invention, there is provided a pneumatic tire provided with at least at part of the innermost surface or outermost surface of the tire, through at least one layer of a black-concealing layer having a light reflectance of at least 15%, a resin film layer comprised of a thermoplastic resin as a main ingredient and colored white or another color.

Since a resin film layer colored white or another color is provided as a colored layer at the innermost surface or outermost surface of the tire in this way, it becomes possible to easily obtain various information since it is possible to simply and easily recognize meaning from the coloring by just viewing the coloring.

Further, since the resin film layer is provided through a black-concealing layer with a light reflectance of at least 15%, the black of the rubber layer constituting the tire is kept from standing out through the resin film layer and it is possible to keep the coloring clear, without having to make the thickness of the resin film layer greater.

Further, it becomes possible to lighten the tire since the resin film layer does not have to be made greater in thickness.

Figure 4:
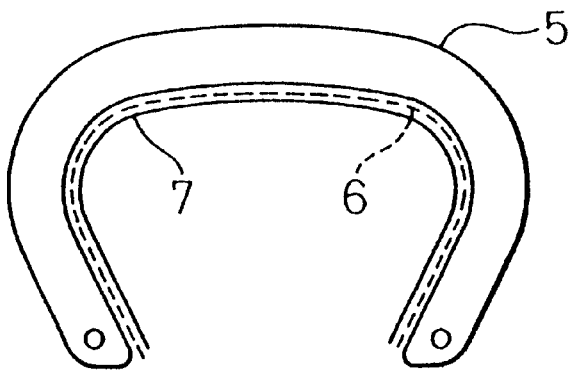
FIG. 4 is an explanatory view illustrating the section along the tire meridial direction of a pneumatic tire of the present invention.

In the pneumatic tire of the present invention shown in FIG. 4, a white or other colored resin film layer 7 comprised mainly of a thermoplastic resin is provided over the entire innermost surface of the tire 5 through a black-concealing layer 6 of a light reflectance of at least 15% and constitutes the inner liner (air permeation preventive layer). This resin film layer 7 may be also provided partially at suitable locations of the innermost surface of the tire (for example, coloring the inner surface crown portion in a ribbon manner). Further, it is possible to provide the resin film layer 7 and add wording or patterns to the surface of the same according to need.

Figure 5:
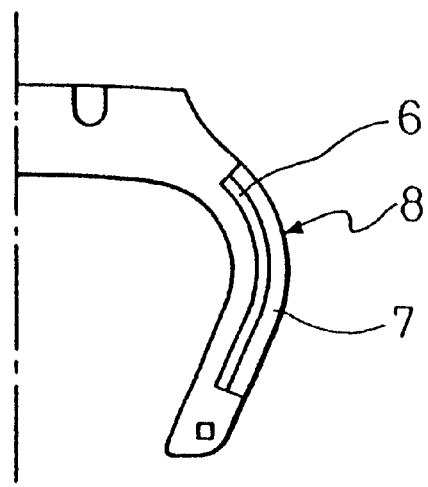
FIG. 5 is an explanatory view illustrating a half section along the tire meridial direction of a pneumatic tire of the present invention.
Figure 6:
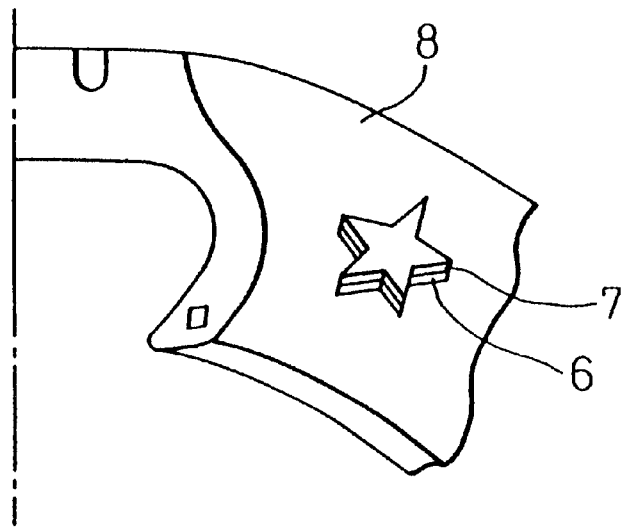
FIG. 6 is a perspective view of an example of a side wall of a pneumatic tire of the present invention.
Figure 7:
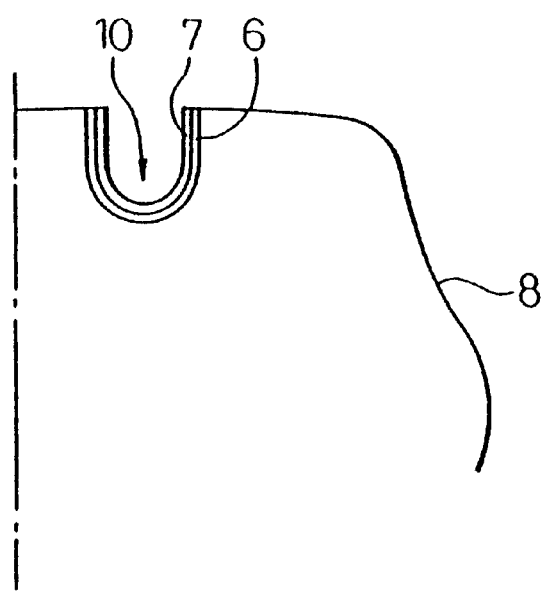
FIG. 7 is an explanatory view of a half section along the tire meridial direction showing the section of a groove of a tread portion of the pneumatic tire of the present invention.

On the other hand, the resin film layer 7 may be provided over the entire outermost surface of the tire, for example, the entire surface of the side wall portion 8 as shown in FIG. 5, through a black-concealing layer 6. Further, as shown in FIG. 6, it is possible to provide a resin film layer 7 forming patterns, words, etc. through a black-concealing layer 6 on part of the surface of the side wall portion 8. When providing a resin film layer 7 in this way, it is preferable that the patterns, words, etc. project out from the surface of the rest of the side wall portion. Further, as shown in FIG. 7, it is possible to provide the resin film layer 7 through a black-concealing layer 6 at part or all of a groove surface (groove side walls and groove bottom) of grooves 10 formed in the tread portion 9. To provide it at the groove surface in this way, the tread surface of the green tire may be covered by the resin film layer 7 through a black-concealing layer 6 and then the tread surface polished. Note that when providing it at the groove surface in this way, it is also possible to provide the resin film layer 7 at just the slip sign portion showing the degree of wear or the 50% limit indicator portion of snow tires.

Figure 8:
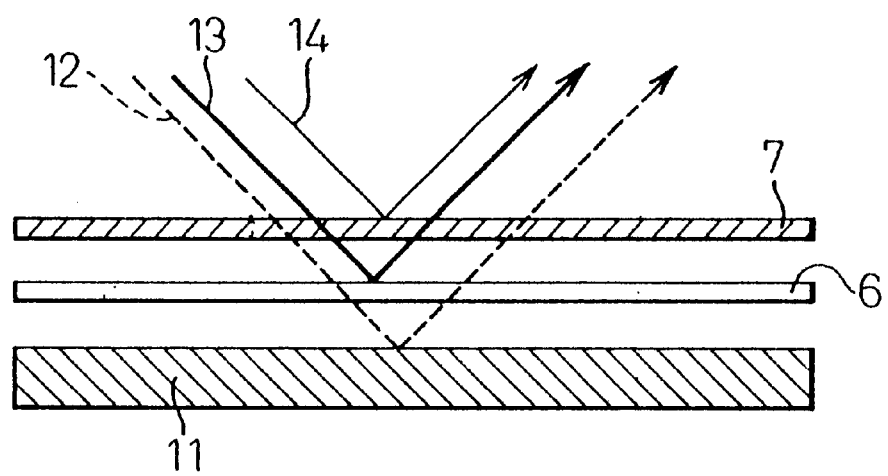
FIG. 8 is a sectional view showing the state of reflection of light in the case of providing the resin film layer on the innermost surface or outermost surface of the tire through a black-concealing layer.

As shown in FIG. 8, however, when providing the resin film layer 7 through a black-concealing layer 6 over the innermost surface or outermost surface 11 of a tire, the incident light will partially reflect back at the innermost surface or outermost surface 11 of the tire (light 12), partially reflect back at the black-concealing layer 6 (light 13), and partially reflect back at the resin film layer 7 (light 14). In the present invention, the light reflectance of the black-concealing layer 6 is made at least 15%. If the light reflectance is made at least 15%, the black-concealing layer 6 will cover and conceal the black of the underlying portion (innermost surface or outermost surface 11 of tire) and keep that black from standing out through the resin film layer 7. Making the light reflectance at least 15% is easily achieved by including a pigment and/or dye in the black-concealing layer 6. To making the black-concealing layer 6 white, a white filler or a white pigment, particularly titanium oxide, zinc white, lead white, or zinc oxide are good, more preferably titanium dioxide ($TiO_2$) with its strong concealing power and coloring power, may be mentioned. For example, it is sufficient to include titanium dioxide in an amount of at least 0.5% by weight, more preferably 0.5 to 10% by weight.

Further, there is also the method of making the black-concealing layer 6 colored for concealing purposes. This may be done by adding an organic or inorganic pigment, for example, copper phthalocyanine blue, disazo yellow, quinacridone red, yellow lead, Prussian blue, etc. The color of the colored black-concealing layer 6 however is more preferably the same color system as the resin film layer 7.

At least one layer of the black-concealing layer 6 is interposed. That is, several layers may be optionally provided in consideration of the ability to conceal the black of the underlayer. The black-concealing layer 6 may also serve as the adhesive and tacky layer between the under-layer and resin layer film 7. The black-concealing layer 6 may be formed by double layer extrusion and lamination with the resin film layer 7 or by coating the material in advance on the surface of the resin film layer 7 or the surface of the carcass layer (when forming it on the inner surface of the tire).

The resin film layer 7 may be colored white or a red, blue, green, or other color, for example, red, yellowish red, yellow, yellowish green, green, blue green, blue, bluish purple, purple, reddish purple, etc. These colors may be suitably combined and the brightness and degree of the colors may be suitably adjusted. The coloring may be not only single coloring but also combinations of a number of colors.

As the identifying information included in the coloring, the (a) rim diameter, (b) tire front and rear, (c) direction of tire rotation, (d) allowable rim width), (e) durability (for races etc.), (f) air retention (temper tires etc.), (g) material used (type of cord of belt layer, carcass layer, etc.), (h) interchangeable tire sizes, (i) associated car names, and other usage information, specification information, and recycling information may be mentioned.

For example, it is possible to change the color for each rim diameter to prevent erroneous mounting; to show durability by using red for racing tires, blue for high performance tires for general roads, green for general use tires, and white for temporary use tires so as to enable the consumer to easily select the tires of the desired performance at stores and prevent mistaken use; show air retention by using white for spare tires to prevent mistaken use; show the material used by using red for steel cords and white for none; and make tires with recyclable treads yellow to save labor at the time of separating the tires for recycling. Builder marks, bar codes, etc. may be provided at the tire inner surface as in the past and that information shown as in the past.

The thermoplastic resin constituting the resin film layer 3 used in the present invention has an air permeation coefficient of not more than $25 \times 10^{-12}$ cc·cm/cm²·sec·cmHg, preferably not more than $5 \times 10^{-12}$ cc·cm/cm²·sec·cmHg, and a Young's modulus of 1 to 500 MPa, preferably 10 to 300 MPa. If the air permeation coefficient is more than $25 \times 10^{-12}$ cc·cm/cm²·sec·cmHg, it is necessary to make the thickness of the air permeation preventive layer greater in order to retain the tire air pressure—which runs counter to the objective of reducing the weight of the tire. Further, if the Young's modulus is less than 1 MPa, wrinkles etc. will occur at the time of shaping the tire and the shapeability will drop, while if over 500 MPa, problems will occur in the durability.

As the thermoplastic resin, for example, polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, nylon 66/PPS copolymer) and their N-alkoxyalkylates, for example, a methoxymethylate of 6-nylon, a methoxymethylate of 6-610-nylon, and a methoxymethylate of 612-nylon, polyester resins (for example, polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxyalkylene diimidodiacid/polybutylene terephthalate copolymer, and other aromatic polyesters), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(metha)acrylate resins (for example, polymethyl methacrylate (PMMA), polyethyl methacrylate), polyvinyl family resins (for example, vinyl acetate, polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methylacrylate copolymer), cellulose resins (for example, cellulose acetate and cellulose acetate butyrate), fluorine resins (for example, polyvinylidene fluoride (PVDF), polyvinyl fluoride (PVF), polychlorofluoroethylene (PCTFE), tetrafluoroethylene/ethylene copolymer, imide resins (for example, aromatic polyimide (PI)), etc. may be mentioned. Two or more may also be used.

Further, as the resin film layer 7, a film obtained by mixing an elastomer with the above thermoplastic resin may also be used.

As the elastomer component which may be blended with the thermoplastic resin, any which forms a composition in a state blended with a thermoplastic resin component and, as a result, has the above air permeation coefficient and Young's modulus may be used. The type and amount are not particularly limited.

As the elastomer mixed with the thermoplastic resin, for example, diene rubbers and their hydrogenates (for example, NR, IR, epoxylated natural rubber, SBR, BR (high cis BR and low cis BR), NBR, hydrogenated NBR, hydrogenated SBR), olefin rubbers (for example, ethylene-propylene rubber (EPDM and EPM), maleic acid-modified ethylene-propylene rubber (M-EPM)), IIR, isobutylene and aromatic vinyl or diene monomer copolymers), acryl rubber (ACM), ionomers, halogen-containing rubbers (for example, Br-IIR, Cl-IIR, a bromide of isobutylene-p-methylstyrene copolymer (Br-IPMS), CR, hydrin rubbers (CHR and CHC), chlorosulfonated polyethylene (CSM), chlorinated polyethylene (CM), maleic acid-modified chlorinated polyethylene (M-CM)), silicone rubber (for example, methylvinyl silicone rubber, dimethyl silicone rubber, methylphenylvinyl silicone rubber), sulfur-containing rubbers (for example, polysulfide rubber), fluororubber (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, ester elastomers, urethane elastomers, and polyamide elastomers), etc. may be mentioned. Two or more types may be used.

When the solubilities of the above specified thermoplastic resin and elastomer component differ, it is preferable to add as a third component a suitable compatibilizer. By mixing a compatibilizer into the system, the surface tension between the thermoplastic resin and the elastomer component falls and, as a result, the particle size of the rubber forming the dispersed phase will become finer, and therefore, the properties of the two components will be more effectively expressed. As such a compatibilizer, generally it is possible to use a copolymer having the structure or both or one of the thermoplastic resin and elastomer component or a structure of a copolymer having an epoxy group, carbonyl group, halogen group, amine group, oxazoline group, hydroxy group, etc. reactable with the thermoplastic resin or elastomer component. These may be selected according to the type of the thermoplastic resin and elastomer component to be mixed, but as the ones which are normally used, a styrene/ethylene/butylene block copolymer (SEBS) and its maleic acid modified form, EPDM: EPDM/styrene, or EPDM/acrylonitrile graft copolymer and their maleic acid modified forms, styrene/maleic acid copolymer, reactive phenoxy thermoplastic resin, etc. may be mentioned. The amount of the compatibilizer blended is not particularly limited, but preferably is 0.5 to 10 parts by weight, based upon 100 parts by weight of the polymer component (total of the thermoplastic resin and elastomer component).

The ratio of composition of the specific thermoplastic resin (A) and elastomer component (B) when blending a thermoplastic resin and elastomer is not particularly limited and may be suitably determined by the balance of the thickness of the film, air permeation preventive property, and flexibility, but preferably the range is, in terms of the ratio of (A)/(B), 10/90 to 90/10, more preferably 15/85 to 90/10.

The polymer composition of the present invention (resin film layer 30) may have mixed therein, in addition to the above essential polymer component, the above compatibilizer polymer and other polymers to an extent not impairing the properties required by the tire use polymer composition of the present invention. The objects of mixing in the other polymers are to improve the compatibility of the thermoplastic resin and elastomer component, to improve the film forming ability of the material, to improve the heat resistance, and to reduce costs. As the materials used for these, for example, polyethylene (PE), polypropylene (PP), polystyrene (PS), ABS, SBS, polycarbonate (PC), etc. may be mentioned. Further, polyethylene, polypropylene, and other olefin copolymers, their maleic acid modified forms, and glycidyl group introduced forms may be mentioned. The polymer composition according to the present invention may also have mixed in it agents generally mixed into polymer formulations such as fillers, carbon black, quartz powder, calcium carbonate, alumina, and titanium oxide to an extent not impairing the requirements of the air permeation coefficient and Young's modulus.

Further, the elastomer component may be dynamically vulcanized when being mixed with the thermoplastic resin. The vulcanization agent, vulcanization aids, vulcanization conditions (temperature and time), etc. at the dynamic vulcanization may be suitably determined depending upon the composition of the elastomer component added and are not particularly limited.

As the vulcanization agent, a general rubber vulcanization agent (cross-linking agent) may be used. Specifically, as a sulfur vulcanization agent, powdered sulfur, precipitated sulfur, high dispersion sulfur, surface treated sulfur, insoluble sulfur, dimorpholine disulfide, alkylphenol disulfide, and others may be mentioned. For example, they may be used in amounts of about 0.5 to 4 phr (parts by weight per 100 parts by weight of rubber component (polymer)).

Further, as an organic peroxide vulcanization agent, benzoyl peroxide, t-butyl hydroperoxide, 2,4-bichlorobenzoyl peroxide, 2,Te-diethyl dithiocarbamate, Cu-dimethyl dithiocarbamate, Fe-dimethyl dithiocarbamate, pipecolinepipecoryl dithiocarbamate, and as a thiourea family vulcanization agent, ethylene thiourea, diethyl thiourea, etc. may be mentioned.

Further, as a vulcanization accelerator, a conventionally used rubber aid may be used together. For example, zinc white (about 5 phr), Zn salts of stearic acid and other fatty acids (about 2 to 4 phr) etc. may be used.

The production process of the thermoplastic elastomer composition comprises melt-kneading a thermoplastic resin component and elastomer component (in the case of a rubber, unvulcanized) by a twin-screw kneader/extruder etc. to cause the elastomer component to disperse as a dispersed phase (domain) into the thermoplastic resin forming the continuous phase (matrix phase). When vulcanizing the elastomer component, the vulcanization agent may be added while mixing to cause the elastomer component to dynamically vulcanize. Further, the various compounding agents (except the vulcanization agent) may be added to the thermoplastic resin or the elastomer component during the above mixing, but are preferably mixed before the mixing. The kneader used for mixing the thermoplastic resin and the elastomer component is not particularly limited, but a screw extruder, kneader, Banbury mixer, twin-screw kneader/extruder, etc. may be mentioned. Among these, for mixing a thermoplastic resin and elastomer component and for the dynamic vulcanization of the elastomer component, a twin-screw kneader/extruder is preferably used. Further, it is possible to use two or more types of kneaders and successively perform mixing. As the conditions for the melt mixing, the temperature should be at least the temperature at which the thermoplastic resin melts. Further, the shear rate at the time of mixing is preferably 500 to 7500 $\sec^{-1}$. The time for the overall mixing is from 30 sec to 10 minutes. Further, when adding a vulcanization agent, the vulcanization time after addition is preferably from 15 sec to 5 minutes. The polymer composition produced by the above process is next formed into a sheet-like film by extrusion or calendaring. The method of forming the film may be a method for forming a film from a usual thermoplastic resin or thermoplastic elastomer.

The film thus obtained is structured comprised of a matrix of the thermoplastic resin (A) in which the elastomer component (B) is dispersed as a dispersed phase (domain). By adopting such a dispersed structure, thermoplastic processing becomes possible and it is possible to give sufficient flexibility to the film serving as the belt reinforcement layer and give sufficient rigidity by the effect of the resin layer serving as the continuous phase. In addition, regardless of the amount of the elastomer component, at the time of shaping, it is possible to obtain shapeability equal to that of a thermoplastic resin, so formation of a film by an ordinary resin use machine such as through extrusion or calendaring becomes possible.

The adhesion between the film and the opposing rubber layer may be performed by the method of coating the film with an adhesive comprised of a general rubber, phenol resin, acryl copolymer, isocyanate, or other polymer and cross-linking agent dissolved in a solvent and causing bonding by the heat and pressure at the time of vulcanization and shaping or by the method of coextruding with the thermoplastic film a styrene-butadiene-styrene copolymer (SBS), ethylene-ethyl acrylate (EEA), styrene-ethylene-butylene block copolymer (SEBS), or other bonding use resin or laminating the same to prepare a multilayer film and causing bonding with the rubber layer at the time of vulcanization. As the solvent adhesive, for example, a phenol resin (Chemlock 220, made by Lord), chlorinated rubber (Chemlock 205 and Chemlock 234B), isocyanate (Chemlock 402), etc. may be mentioned.

INDUSTRIAL APPLICABILITY

As explained in detail above, the thermoplastic elastomer composition according to the present invention has a superior gas permeation preventive property and moisture permeation preventive property and an excellent flexibility in a good balance and further is superior in adhesiveness with rubber, so if used for the air permeation preventive layer of a pneumatic tire, enables the air permeation preventive layer to be made thinner without impairing the retention of the air pressure in the tire, and therefore, can contribute to the reduction of weight of a pneumatic tire.

EXAMPLES

The present invention will now be further illustrated by, but is by no means limited to, the following Examples.

Examples I

Examples I-1 to I-3 and Comparative Examples I-1 to I-5

The elastomers and cross-linking agent shown in the following Table I-1 were previously mixed in a Banbury mixer, sheeted by rubber use rolls to 2 mm, then pelletized by a rubber use pelletizer and then used as the elastomer components, not including the cross-linking agent, for twin-screw mixing with the next thermoplastic resin component.

TABLE I-1

Formulation of Elastomer Component

|  | Polymer blending agent | Ex. I-1, 2, and 4 and Comp. Ex. I-1 to 3, 6, and 7 | Ex. I-3 | Ex. I-5 and 6 |
|---|---|---|---|---|
| Polymer of elastomer component | Brominated IPMS | 100 | 50 | 50 |
|  | H-NBR | — | 40 | 40 |
|  | CSM | — | 10 | 10 |
| Filler | Carbon black GPF* | — | — | 40 |
| Softener | Paraffin family** | — | — | 20 |
| Plasticizer | Ester family*** | — | — | 10 |
| Cross-linking coagent | Zinc White JIS No. 3 | 2 | 5 | 2 |
| Cross-linking agent | Stearic acid | 1 | 2 | 2 |
|  | Zinc stearate | 3 | 2 | 2 |
|  | Powdered sulfur | — | 0.5 | 0.5 |
|  | Accelerator IT | — | 15 | 1.5 |
|  | Accelerator M | — | 0.5 | 0.5 |

Notes
*S Seast V, Tokai Carbon.
**Sanpar 2280, Esso Chemical.
***Adecasizer C9N, Asahi Denka Kogyo.

The pellets of the thermoplastic resin component shown in Table I-2 and the above obtained pellets of the elastomer component were dispersed and mixed with each other by a twin-screw kneader/extruder with the thermoplastic resin component added from the first charging port and the elastomer component added from the second charging port. The temperature at the time of mixing was controlled to a temperature from the melting temperature of the thermoplastic resin +40° C. and the shear rate was controlled to 1150 sec$^{-1}$. The cross-linking agent of the elastomer component was adjusted and charged from the third charging port depending upon the mixing ratio with the thermoplastic resin component to give a mix shown in the above Table I-1 per 100 parts by weight of elastomer so as to cause the elastomer component dispersed in the thermoplastic resin component to cross-link (vulcanize) during mixing, that is, dynamically.

The thermoplastic elastomer composition obtained was extruded in strands from the discharge port of the twin-screw kneader/extruder. The strands were water cooled, then pelletized by resin use pelletizer.

These pellets were used for press-forming by a thermoplastic resin-use press forming machine at a temperature 40° C. higher than the melting temperature of the thermoplastic resin used so as to prepare a sheet for observation of the state of dispersion by a transmission electron microscope (TEM) and measurement of the physical properties. Using the sheet, the matrix phase was confirmed and the Young's modulus was measured.

Further, the air permeation coefficient was measured by forming the pellets of the thermoplastic elastomer composition into film of a thickness of 150 μm using a thermoplastic resin-use single-screw extruder equipped with a T-die head then using the sheet to perform the predetermined air permeation test.

Further, the 150 μm thick film of the thermoplastic elastomer composition obtained above was wrapped around a tire shaping drum, a carcass coated with the rubber of the following formulation (I), side belts, treads, and other tire members were superposed on this, then the assembly was inflated to form a green tire. The green tire was vulcanized by a vulcanizer at 180° C. for 10 minutes to complete the tire of the tire size 165SR13 shown in FIG. 2.

| Formulation (I) of Rubber Composition | Parts by weight | |
| --- | --- | --- |
| Natural rubber, RSS #3 | 80 | |
| SBR | 20 | Nipol 1502 made by Nihon Zeon |
| FEF carbon black | 50 | HTC #100 made by Chubu Carbon |
| Stearic acid | 2 | Beads Stearic Acid NY, made by Nihon Yushi |
| ZnO | 3 | Zinc White JIS No. 3 |
| Sulfur | 3 | Powdered sulfur Karuizawa Refinery |
| Vulcanization accelerator (BBS) | 1 | N-t-butyl-2-benzothiazyl sulfenamide |
| Aroma oil | 2 | Desolex No. 3 made by Showa Shell Oil |

On the other hand, as Comparative Example I-4, a tire of the above tire structure but without the layer of 150 μm thickness of the thermoplastic elastomer composition of the present invention at the carcass inner layer was produced at the same dimensions as the above.

These tires were used for long term durability tests and air leakage performance tests.

Note that the measurement methods and evaluation methods used in the above examples were as follows:

Melt Viscosity

Here, the melt viscosity means the melt viscosity of any temperature or component at the time of mixing. The melt viscosity of each polymer material is dependent on the temperature, the shear rate (sec$^{-1}$), and the shear stress, so the stress and shear rate of the polymer material at any temperature in the molten state capable of flowing through a capillary, in particular, the temperature region at the time of mixing, are measured and the melt viscosity is measured by the following formula (6):

$$\eta = \sigma/\dot{\gamma} \text{ (where, } \sigma\text{: shear stress, } \dot{\gamma}\text{: shear rate)} \tag{6}$$

Note that, the melt viscosity is measured by using a Capillary Rheometer Capillograph 1C made by Toyo Seiki. Further, as the orifice, one of a diameter of 1 mm and length of 10 mm was used.

Method of Confirmation of Matrix Phase

A sample prepared by the cryo method was used and confirmed by observation through a transmission electron microscope.

Method of Measurement of Young's Modulus of Film

This was performed based on JIS K6251 "Test Method for Tensile Properties of Vulcanized Rubber".

Test piece: Samples of the film prepared by extrusion in the examples were used and punched into JIS No. 3 dumbbell shapes in the direction of flow of the thermoplastic resin at the time of extrusion. A tangent was drawn against the curve of the initial strain region of the obtained stress-strain curve and the Young's modulus was found from the inclination of the tangent.

Method of Measurement of Air Permeation Coefficient of Film

This was performed based on JIS K7126 "Test Method of Gas Permeation Degree of Plastic Films and Sheets (Method A)".

Test piece: Film samples prepared in example were used.

Test gas: Air (N$_2$:O$_2$=8:2)

Test temperature: 30° C.

Method of Durability Test of Inner Liner Layer

A 165SR13 steel radial tire was produced, assembled over a rim of 13×4½-J size, filled to an air pressure of 200 kPa, mounted on a 1500 cc class passenger car, then run on an actual road for 20,000 km with a load corresponding to four passengers (65 kg/passenger).

After this operation, the tire was detached from the rim and the liner layer at the inside surface of the tire was visually inspected. Tires with cracks in the liner layer, visible wrinkles, or peeling or rising of the liner layer were judged as defective and those without them as passing.

Method of Testing Air Leakage (Pressure Drop)

The tire was allowed to stand for three months under conditions of an initial pressure of 200 kPa, room temperature of 21° C., and no load. The inner pressure was measured at intervals of four days and the a value found by recurrence to the formula:

$$Pt/Po = \exp(-\alpha t)$$

where Pt is the measured pressure, Po is the initial pressure, and t is the days elapsed. Using the α obtained and a t of 30 days, the drop in air pressure β per month (%/month) was found:

$$\beta = [1 - \exp(-\alpha t)] \times 100$$

Here, in Comparative Examples I-1 to I-3 of Table I-2, since it was not possible to obtain the desired thermoplastic elastomer structure comprised of the thermoplastic resin as the continuous phase and the elastomer component as the dispersed phase no matter what the conditions above the melting temperature of the thermoplastic resin component, thermoplastic properties were not shown. Therefore, the flowability was insufficient and the sheets and films for measurement of the physical properties could not be obtained.

TABLE I-2

| | | Ex. I-1 | Ex. I-2 | Ex. I-3 |
|---|---|---|---|---|
| Elastomer Component/Thermoplastic Resin component = 60/40 | | | | |
| Elastomer component* | | Modified IPMS[1] | Modified IPMS[1] | Modified IPMS[1] = 50 HNBR[2] = 40 CSM[3] = 10 |
| Thermoplastic resin component | | N11[4] = 70 EVOH[5] = 30 | N612[6] | N6.66[7] |
| Physical constants of formulation | $\phi_m$ | 0.398 | 0.394 | 0.376 |
| | $\eta_d/\eta_m$ | 2.53 | 2.13 | 1.80 |
| | $\Delta$SP | 4.00 | 4.21 | 4.60 |
| | Value of left side of equation (1) | 1.74 | 1.73 | 1.76 |
| Original physical properties of thermoplastic elastomer composition (properties) | Matrix phase | Thermoplastic resin | Thermoplastic resin | Thermoplastic resin |
| | Young's modulus (MPa) | 36 | 32 | 43 |
| | Air permeation coefficient (cc · cm/cm$^2$ · sec · cmHg) | 6.5 | 6.7 | 5 |
| Properties of tire | Long term durability test of tire (cracks, wrinkles, etc.) | Pass | Pass | Pass |
| | Air leakage performance of tire (%/month) | 2.1 | 2.1 | 1.90 |

| | | Comp. Ex. I-1 | Comp. Ex. I-2 | Comp. Ex. I-I-3 | Comp. Ex. I-4 | Comp. Ex. I-5 |
|---|---|---|---|---|---|---|
| Elastomer component* | | Modified IPMS[1] | Modified IPMS[1] | Modified IPMS[1] | — | — |
| Thermoplastic resin component | | N6[8] | N6/N11/PO[9] | N6.66[7] | — | — |
| Physical constants of formulation | $\phi_m$ | 0.385 | 0.397 | 0.385 | — | — |
| | $\eta_d/\eta_m$ | 1.49 | 0.70 | 0.78 | — | — |
| | $\Delta$SP | 5.91 | 5.55 | 5.91 | — | — |
| | Value of left side of equation (1) | 1.54 | 1.54 | 1.54 | — | — |
| Original physical properties of thermoplastic elastomer composition (properties) | Matrix phase | Elastomer | Elastomer | Elastomer | — | — |
| | Young's modulus (MPa) | ** | ** | ** | — | — |
| | Air permeation coefficient (cc · cm/cm$^2$ · sec · cmHg) | ** | ** | ** | — | — |
| Properties of tire | Long term durability test of tire (cracks, wrinkles, etc.) | — | — | — | Pass | — |
| | Air leakage performance of tire (%/month) | — | — | — | 3.0 | — |

*: Ingredients excluding cross-linking agent treated as elastomer component. Cross-linking agent added in accordance with Table I-1 based on 100 parts by weight of polymer in elastomer component.
**: Hot pressing and film extrusion not possible.
Notes:
[1] Modified IPMS: Brominated isobutylene para-methyl styrene copolymer, PMS = 5 wt %, Br = 1.2 wt % (EXXON CHEMICAL).
[2] H-NBR: Hydrogenated NBR (ZETPOL 1020, made by Nippon Zeon).
[3] CMS: Chlorosulfonated PE (HYPALON 40, made by DUPONT).
[4] N11: Nylon 11 (Rilsan BMN 0, Toray);
[5] EVOH: Ethylene vinyl alcohol (EVAL XEP1718, Kurarey);
[6] N612: Nylon 612 (D-18, Daicel Huls);
[7] N6/66: Nylon 6/66 (Amilan CM6001, Toray);
[8] N6: Nylon 6 (Amilan CM1017, Toray); and
[9] N6/N11/PO: Nylon 6/Nylon 11/propylene oxide).

From Examples I-1 to I-3 (elastomer component/ thermoplastic resin component ratio of 60/40) of Table I-2, it was learned that even with a thermoplastic elastomer composition with a high ratio of the elastomer component, when the condition of the above relation (1) was satisfied, a structure with the thermoplastic resin component forming the continuous phase and the elastomer component forming the dispersed phase could be obtained and the desired properties of flexibility (Young's modulus) and air permeability could be obtained.

Compared with this, as shown by Comparative Examples I-1 to I-3, it was learned that when the above relation (1) showing the relationship between the ratio of melt viscosities of the thermoplastic resin component and elastomer component mixed and the difference ($\Delta$SP) in compatibilities of the two is not satisfied, the desired thermoplastic elastomer with the thermoplastic resin forming the continuous phase cannot be obtained.

Further, from the comparison with Comparative Example I-4, it is learned that the thermoplastic elastomer compositions obtained from the present invention (Examples I-1 to I-3) retain their performance even after heating and shaping as a film or tire, improve the properties of those products, and achieve the desired goals.

Examples I-4 to I-6 and Comparative Example I-6

The thermoplastic elastomer compositions shown in Table I-3 were formed into pellets by a twin-screw kneader/ extruder by the same procedure was the case of the above Table I-2 and were similarly formed by a T-die sheet forming machine into presheets for measurement of physical properties and films of 150 $\mu$m thickness for measurement of the permeation coefficient. The films were further used for preparing ties under the same conditions. These tires were then used for the same measurement and testing as in the case-of Table I-2.

Note that the measurement methods and evaluation methods used in these Examples were also the same as in the above Examples.

The results are shown in Table I-3.

TABLE I-3

Elastomer Component/Thermoplastic Resin Component = 70/30, 80/20

|  |  | Ex. I-4 (70/30) | Ex. I-5 (70/30) | Ex. I-6 (80/20) |
|---|---|---|---|---|
| Elastomer component* |  | Modified IPMS[1] | Formulation 3 | Formulation 3 |
| Thermoplastic resin component |  | N11[4] | N11[4] | N11[4] |
| Physical constants of formulation | $\phi_m$ | 0.299 | 0.299 | 0.201 |
|  | $\eta_d/\eta_m$ | 3.17 | 3.04 | 3.04 |
|  | $\Delta$SP | 3.71 | 2.01 | 2.01 |
|  | Value of left side of equation (1) | 2.37 | 2.66 | 2.95 |
| Original physical properties of thermoplastic elastomer composition (properties) | Matrix phase | Thermoplastic resin | Thermoplastic resin | Thermoplastic resin |
|  | Young's modulus (MPa) | 27 | 31 | 51 |
|  | Air permeation coefficient (cc · cm/cm$^2$ · sec · cmHg) | 7.8 | 5.3 | 2.6 |
| Properties of tire | Long term durability test of tire (cracks, wrinkles, etc.) | Pass | Pass | Pass |
|  | Air leakage performance of tire (%/month) | 2.2 | 2.1 | 1.7 |

|  |  | Comp. Ex. I-6 (70/30) | Comp. Ex. I-7 (70/30) |
|---|---|---|---|
| Elastomer component* |  | Modified IPMS[1] |  |
| Thermoplastic resin component |  | N6[8] |  |
| Physical constants of formulation | $\phi_m$ | 0.287 |  |
|  | $\eta_d/\eta_m$ | 1.88 |  |
|  | $\Delta$SP | 5.91 |  |
|  | Value of left side of equation (1) | 2.07 |  |
| Original physical properties of thermoplastic elastomer composition (properties) | Matrix phase | Elastomer component |  |
|  | Young's modulus (MPa) | — |  |
|  | Air permeation coefficient (cc · cm/cm$^2$ · sec · cmHg) | — |  |
| Properties of tire | Long term durability test of tire (cracks, wrinkles, etc.) | — |  |
|  | Air leakage performance of tire (%/month) | — |  |

Notes:
[1])See notes to Table I-2.
[4])See notes to Table I-2.
[8])See notes to Table I-2.
Ingredients excluding cross-linking agent treated as elastomer component. Cross-linking agent added in accordance with Table I-1 based on 100 parts by weight of polymer in elastomer component.

From the results of Examples I-4 to I-6 of Table I-3, it is learned that even if the ratio of the elastomer component and the thermoplastic resin component is made greater than 60/40, that is, 70/30 or 80/20, to make the amount of the elastomer component greater, in so far as the relationship of the melt viscosities and solubilities (ΔSP) of the two components satisfies the above relation (1), a thermoplastic elastomer composition having the desired structure can be obtained, control of the flexibility and permeability (air) is possible, and, further, a tire using the thermoplastic elastomer composition can be obtained which achieves new objectives.

Further, as shown in Comparative Examples I-6 and I-7, it is learned that even if the ratio of the elastomer component and the thermoplastic resin component is 70/30, when the relation of the melt viscosities and solubilities (ΔSP) of the components does not satisfy the above relation (1), a thermoplastic elastomer be composition having the desired dispersed structure cannot be obtained.

Examples II

The methods of evaluation used in these Examples were as shown below:

Melt Viscosity

Here, the melt viscosity means the melt viscosity of any temperature or component at the time of mixing. The melt viscosity of each polymer material is dependent on the temperature, the shear rate ($sec^{-1}$), and the shear stress, so the stress and shear rate of the polymer material at any temperature in the molten state capable of flowing through a capillary, in particular, the temperature region at the time of mixing, are measured and the melt viscosity is measured by the following formula (6):

$$\eta = \sigma/\dot{\gamma} \text{ (where, } \sigma: \text{ shear stress, } \dot{\gamma}: \text{ shear ratio)} \tag{6}$$

Note that, the melt viscosity is measured by using a Capillary Rheometer Capillograph 1C made by Toyo Seiki. Further, as the orifice, one of a diameter of 1 mm and length of 10 mm was used.

Method of Measurement of Young's Modulus and Elongation of Film

This was performed based on JIS K6251 "Test Method for Tensile Properties of Vulcanized Rubber".

Test piece: Samples of the film prepared by extrusion in the examples were used and punched into JIS No. 3 dumbbell shapes in the direction of flow of the thermoplastic resin at the time of extrusion.

A tangent was drawn against the curve of the initial strain region of the stress-strain curve obtained and the Young's modulus was found from the inclination of the tangent.

Further, the length between standard lines at the time of breakage of a sample of the film prepared in each example was measured to calculate the elongation by the following formula.

$$E_B = (L_1 - L_0)/L_0 \times 100$$

where, $E_B$: elongation at break (%)

$L_0$: length between standard lines (mm)

$L_1$: length between standard lines at time of breakage (mm)

Method of Measurement of Gas Permeation Degree of Film (Air Permeation Coefficient)

This was performed based on JIS K7126 "Test Method of Gas Permeation Degree of Plastic Films and Sheets (Method A)".

Test piece: Film samples prepared in example were used.

Test gas: Air ($N_2:O_2=8:2$)

Test temperature: 30° C.

Method of Testing Tire Air Leakage Performance

A 165SR13 steel radial tire (rim of 13×4 ½-J) was allowed to stand for three months under conditions of an initial pressure of 200 kPa, no load, and a room temperature of 21° C. and measured for pressure at intervals of four days.

The α value was found by recurrence to the function:

$$Pt/Po = \exp(-\alpha t)$$

where Pt is the measured pressure, Po is the initial pressure, and t is the days elapsed. Using the α obtained and a t of 30 days, the value β was found:

$$\beta[1-\exp(-\alpha t)] \times 100$$

This value β was the drop in pressure per month (%/month).

Method of Testing Tire Durability

A 165SR13 steel radial tire (rim 13×4½-J) was filled to an air pressure of 140 kPa, given a load of 5.5 kN, and run on an actual road for 10,000 km.

After this operation, the tire was detached from the rim and the liner layer at the inside surface of the tire was visually inspected. Tires with cracks in the liner layer, visible wrinkles, or peeling or rising of the liner layer were judged as defective (Poor) and those without them as passing (Good).

Examples II-1 to II-12 and Comparative Examples II-1 to II-13

First, the mixed batch of the rubber/matrix thermoplastic resin of the first step was prepared using the rubber component and matrix resin component and the ratios of blending (parts by weight) shown in the following Table II-1 and Table II-3. Pellets of the predetermined thermoplastic resin composition serving as the matrix resin component were charged from a first charging port of a twin-screw kneader/extruder and mixed, then pellets of the rubber component were charged from a second charging port and mixed so as to finely disperse the rubber component in the matrix resin composition, then a predetermined amount of zinc stearate, stearic acid, or zinc oxide with respect to 100 parts by weight of rubber, shown in Table II-2, was charged from a third charging port integrally and continuously as a dynamic vulcanization system so as to cause the rubber component to dynamically cross-link and fix the dispersion of the rubber phase. Suitably thereafter, the first step batch obtained was extruded from the front end of a twin-screw kneader/extruder in the form of strands which were water cooled. After cooling, they were then pelletized by a resin use pelletizer. Next, the pellets were melted in a resin use single-screw extruder of 40 mm caliber having a T-die at a 40 rpm rotational speed to form a film with a width of 400 mm and a thickness of 0.20 mm which was then used to find the Young's modulus, elongation, and gas permeation degree. The results are shown in Table II-3.

TABLE II-1

Polymer Used in First Step Mixing

| | Viscosity [poise][a] | Young's modulus [MPa] | Air permeation coefficient [$cm^2 \cdot cm/cm^2 \cdot sec \cdot cmHg$] |
|---|---|---|---|
| X-IPMS[b] | 900 | 1 | $50.0 \times 10^{-12}$ |
| N11-(1)[c] | 300 | 280 | $5.4 \times 10^{-12}$ |
| N11-(2)[d] | 650 | 290 | $6.5 \times 10^{-12}$ |
| N12-(1)[e] | 350 | 360 | $1.2 \times 10^{-11}$ |
| NL2-(2)[f] | 700 | 460 | $7.7 \times 10^{-12}$ |

[a]Shear rate 2304 [$s^{-1}$] mixing temperture 270[° C.].
[b]EXXPRO 89-4 (Exxon Chemical).
[c]N11-(1) BESN 0 TI.
[d]N11-(2) AMN 0 (Toray).
[e]N12-(1) AMN 0 (Toray).
[f]N12-(2) AESN 0 TL (Toray).

TABLE II-2

Rubber Formulation (Parts by Weight)

| Polymer | X-IPMS[a] | 100 |
|---|---|---|
| Dynamic vulcanization system | Zinc stearate | 1 |
| | Stearic acid | 2 |
| | Zinc White No. 3 | 0.5 |

[a]EXXPRO 89-4 (Exxon Chemical).

TABLE II-3

Thermoplastic Elastomer Mixed Product[a]

| | Formulation | Mixture 1 | Mixture 2[b] | Mixture 3 | Mixture 4[b] | Mixture 5 | Mixture 6[b] | Mixture 7 | Mixture 8[b] | Mixture 9[c] |
|---|---|---|---|---|---|---|---|---|---|---|
| Rubber | X-IPMS | 70 | 80 | 50 | 70 | 70 | 80 | 50 | 70 | 70 |
| Matrix resin | N11-(1) | 30 | 20 | — | — | — | — | — | — | 30 |
| | N11-(2) | — | — | 50 | 30 | — | — | — | — | — |
| | N12-(1) | — | — | — | — | 30 | 20 | — | — | — |
| | N12-(2) | — | — | — | — | — | — | 50 | 30 | — |
| Compatibilizer | PP-g-MAH[d] | 7 | 8 | 5 | 7 | 7 | 8 | 5 | 7 | — |
| Dispersion property | α | 0.78 | 1.33 | 0.72 | 1.69 | 0.91 | 1.56 | 0.18 | 1.81 | 0.78 |
| Original physical properties | Young's modulus [MPa] | 40.0 | Unmixable | 120.0 | Unmixable | 65.0 | Unmixable | 150.0 | Unmixable | 40.0 |
| | Elongation [%] | 300 | Unmixable | 410 | Unmixable | 280 | Unmixable | 400 | Unmixable | 180 |
| | Air permeability × $10^{-12}$ [$cc \cdot cm/cm^2 \cdot sec \cdot cmHg$] | 40.0 | Unmixable | 25.0 | Unmixable | 45.0 | Unmixable | 28.0 | Unmixable | 40.0 |

[a]Twin-screw Mixing conditions: Mixing temperature 270[° C.], shear rate 2304 [$s^{-1}$]
[b]Phase inverts and scorching occurs.
[c]Tensile properties drop due to poor dispersion of dispersion phase in rubber.
[d]PP-g-MAH: Admer QB540 of Mitsui Petrochemical.

From the above results, the mixed batches 2, 4, 6, and 8, where the α value was 1 or more, all had the phases reversed during the twin-screw mixing and suffered from scorching, so mixing as the first step batch was not possible—making them undesirable. Further, the mixed batches 3 and 7 gave excellent dispersed states, but the matrix resin component was relatively large in amount and they were not preferable as first step batches in terms of flexibility, so as the first step batch used in the mixing by the low shear rate in the next second step, the above mixed batch 1 (hereinafter, referred to as, "the first step batch-(1)") and mixed batch 5 (hereinafter, referred to as, "the first step batch-(2)") were used. Further, the mixed batch 9 was an example not including a compatibilizer, but compared with this mixed batch 9, the above mixed batches are better in elongation due to the compatibilizer and therefore are found to be preferable.

Next, mixed batches comprised of the barrier resin of the second step and the rubber/matrix resin composition of the first step batch were prepared using the barrier resin components and the first step batches-(1) and (2) and their ratios of mixing (parts by weight) shown in the following Table II-4 and Table II-5 to Table II-8. Pellets of the first step batch-(1) or (2) obtained above as the rubber/matrix resin component were charged by a dry blend into a hopper of a 40 mm caliber single-screw extruder, then mixed at a shear rate of 400 sec$^{-1}$ This was then extruded from a T-die provided at the front end of the single-screw kneader and extruder to form a film of a width of 400 mm and a thickness of 0.20 mm. The Young's modulus and gas permeation degree were found. Further, the aspect ratio of the barrier resin present as a flat layer structure in the film obtained was found by observation by a optical microscope by the following measurement method and the following calculation formula. The results are shown in Tables II-5 to II-8.

Method of Measurement of Aspect Ratio

Just the barrier resin composition was dyed by $RuO_4$, iodine, etc. and directly observed by an optical microscope. The image obtained here was analyzed and the ratio was found by the formula A=a/b using the long axis of the layer of the barrier thermoplastic resin composition as "a" and the short axis as "b".

TABLE II-4

Polymer Used in Step Mixing

| Class | Grade name | Viscosity [poise][a] | Young's modulus [MPa] | Air permeation coefficient × $10^{-12}$ ($cm^3 \cdot cm/cm^2 \cdot sec \cdot cmHg$) |
|---|---|---|---|---|
| Thermoplastic elastomer composition | 1st step product (1) | 2400 | 40 | 40 |
| | 2nd step product (2) | 2600 | 65 | 45 |
| Barrier resin | MXD-(1)[b] | 9600 | 1500 | 0.15 |
| | MXD-(2)[c] | 5800 | 1500 | 0.15 |

TABLE II-4-continued

Polymer Used in Step Mixing

| Class | Grade name | Viscosity [poise][a] | Young's modulus [MPa] | Air permeation coefficient × $10^{-12}$ ($cm^3 \cdot cm/cm^2 \cdot sec \cdot cmHg$) |
|---|---|---|---|---|
| | N6,66-(1)[d] | 7800 | 240 | 1.8 |
| | N6,66-(2)[e] | 4900 | 170 | 0.3 |
| | N6-(1)[f] | 7700 | 400 | 0.78 |
| | N6-(2)[g] | 690 | 290 | 0.82 |
| | EVOH-(1)[h] | 8200 | 900 | 0.041 |
| | EVOH-(2)[i] | 2800 | 900 | 0.041 |

[a]Shear rate 250 [$s^{-1}$], mixing temperature 270[° C.].
[b]MXD6-(1): #6121 (Mitsubishi Gas Chemical).
[c]MXD6-(2): #6001 (Mitsubishi Gas Chemical).
[d]N6,66-(1): CM6041 (Toray).
[e]N6,66-(2): CM6001 (Toray).
[f]N6-(1): CM1041 (Toray).
[g]N6-(2): CM1017 (Toray).
[h]EVOH-(1): Prototype (Kuraray).
[i]EVOH-(2): EP-151B (Kuraray).

Further, a 150 μm film of the thermoplastic elastomer composition of the above second step mixed batch was wrapped around a tire shaping drum. A carcass coated with rubber of the following formulation (I), side belts, treads, and other tire members were superposed on this and the assembly inflated to obtain a green tire (see FIG. 2).

The green tire was vulcanized by a vulcanizer at 180° C. for 10 minutes to produce a tire of a tire size 165SR13.

On the other hand, as a tire comparative example, a green tire was formed having at the inner surface of the green tire and through tie rubber of a thickness of about 0.7 mm an inner liner layer of about 0.5 mm thickness comprised of unvulcanized butyl rubber. This was then vulcanized to form a tire (size 165SR13). The formulation and the Young's modulus and air permeation coefficient of the inner liner layer are shown in Table II-8 in the same way as the examples.

The obtained pneumatic tires were tested for air leakage and durability. The results are shown in Table II-5 to II-8.

| Formulation (I) of Rubber Composition | Parts by weight | |
|---|---|---|
| Natural rubber, RSS #3 | 80 | |
| SBR | 20 | Nipol 1502 made by Nihon Zeon |
| FEF carbon black | 50 | HTC 100 made by Chubu Carbon |
| Stearic acid | 2 | Beads Stearic Acid NY, made by Nihon Yushi |
| ZnO | 3 | Zinc White JIS No. 3 |
| Sulfur | 3 | Powdered sulfur Karuizawa Refinery |
| Vulcanization accelerator (BBS) | 1 | N-t-butyl-2-benzothiazyl sulfenamide |
| Aroma oil | 2 | Desolex No. 3 made by Showa Shell Oil |

TABLE II-5

Second Step Mixing

| | Formulation | EX. II-1 | Ex. II-2 | Comp. Ex. II-1[b] | Comp. Ex. II-2[c] | Ex. II-3 | Ex. II-4 | Comp. Ex. II-3[b] |
|---|---|---|---|---|---|---|---|---|
| Thermoplastic elastomer | 1st step-(1) | 80 | 50 | 10 | 80 | — | — | — |
| | 1st step-(2) | — | — | — | — | 80 | 50 | 20 |
| Barrier resin | MXD6-(1) | 20 | 50 | 90 | — | 20 | 50 | 80 |
| | MXD6-(2) | — | — | — | 20 | — | — | — |
| | N6,66-(1) | — | — | — | — | — | — | — |
| | N6,66-(2) | — | — | — | — | — | — | — |
| | N6-(1) | — | — | — | — | — | — | — |
| | N6-(2) | — | — | — | — | — | — | — |
| Dispersion properties | $\eta_d/\eta_m$ | 4.0 | 4.0 | 4.0 | 2.4 | 3.7 | 3.7 | 3.7 |
| | α | 0.06 | 0.25 | 2.25 | 0.10 | 0.07 | 0.27 | 1.08 |
| | Aspect ratio A | 100 | 150 | 3 | 5 | 80 | 130 | 4 |
| Original physical properties | Young's modulus [MPa] | 80 | 380 | 1450 | 90 | 85 | 410 | 1400 |
| | Air permeation coefficient × $10^{-12}$ [cc · cm/$cm^2$ · sec · cmHg] | 12.0 | 5.5 | 0.1 | 29.3 | 13.2 | 6.8 | 0.1 |
| Tire | Air leakage [%] | 2.7 | 1.7 | 0.1 | 4.6 | 2.8 | 1.8 | 0.1 |
| | Durability [no cracks: Good] | Good | Good | Cracks | Good | Good | Good | Cracks |

[a]Film forming conditions: Forming temperature 270[° C.], shear rate 250 [$s^{-1}$].
[b]Phase inverts and flexibility is impaired.
[c]Since viscosity ratio <3.0, aspect ratio is small and resistance to permeation impaired.

TABLE II-6

Second Step Mixing[a]

| | Formulation | Comp. Ex. II-4[c] | Comp. Ex. II-5[b] | Ex. II-5 | Ex. II-6 | Comp. Ex. II-6[b] | Comp. Ex. II-7[c] | Ex. II-7 |
|---|---|---|---|---|---|---|---|---|
| Thermo-plastic elastomer | 1st step-(1) | — | — | 80 | 50 | 10 | 80 | — |
| | 1st step-(2) | 80 | — | — | — | — | — | 80 |
| Barrier resin | MXD6-(1) | — | — | — | — | — | — | — |
| | MXD6-(2) | 20 | 50 | — | — | — | — | — |
| | N6,66-(1) | — | — | 20 | 50 | 90 | — | 20 |
| | N6,66-(2) | — | — | — | — | — | 20 | — |
| | N6-(1) | — | — | — | — | — | — | — |
| | N6-(2) | — | 50 | — | — | — | — | — |
| Dispersion properties | $\eta_d/\eta_m$ | 2.2 | 8.4 | 3.3 | 3.3 | 3.3 | 2.0 | 3.0 |
| | α | 0.07 | 0.11 | 0.08 | 0.31 | 2.77 | 0.10 | 0.07 |
| | Aspect ratio A | 3 | 200 | 60 | 100 | 3 | 4 | 50 |
| Original physical properties | Young's modulus [MPa] | 91 | 1130 | 65 | 115 | 630 | 70 | 85 |
| | Air permeation coefficient × $10^{-12}$ [cc · cm/ cm$^2$ · sec · cmHg] | 35.2 | 0.1 | 14.5 | 8.2 | 1.9 | 35.1 | 15.2 |
| Tire | Air leakage [%] | 4.9 | 0.1 | 2.9 | 1.9 | 0.5 | 4.9 | 2.9 |
| | Durability [no cracks: Good] | Good | Cracks | Good | Good | Cracks | Good | Good |

[a] Film forming conditions: Forming temperature 270[° C.], shear rate 250 [s$^{-1}$].
[b] Phase inverts and flexibility is impaired.
[c] Since viscosity ratio <3.0, aspect ratio is small and resistance to permeation impaired.

TABLE II-7

Second Step Mixing[a]

| | Formulation | Ex. II-8 | Comp. Ex. II-8[b] | Comp. Ex. II-9[c] | Ex. II-9 | Ex. II-10 | Comp. Ex. II-10[b] | Comp. Ex. II-11[c] |
|---|---|---|---|---|---|---|---|---|
| Thermo-plastic elastomer | 1st step-(1) | — | — | — | 50 | 50 | 10 | 80 |
| | 1st step-(2) | 50 | 20 | 80 | — | — | — | — |
| Barrier resin | MXD6-(1) | — | — | — | — | — | — | — |
| | MXD6-(2) | — | — | — | — | — | — | — |
| | N6,66-(1) | 50 | 80 | — | — | — | — | — |
| | N6,66-(2) | — | — | 20 | — | — | — | — |
| | N6-(1) | — | — | — | 20 | 50 | 90 | — |
| | N6-(2) | — | — | — | — | — | — | 20 |
| Dispersion properties | $\eta_d/\eta_m$ | 3.0 | 3.0 | 1.9 | 3.2 | 3.2 | 3.2 | 0.3 |
| | α | 0.27 | 1.08 | 0.07 | 0.08 | 0.31 | 2.81 | 0.87 |
| | Aspect ratio A | 80 | 3 | 5 | 70 | 110 | 3 | 5 |
| Original physical properties | Young's modulus [MPa] | 135 | 560 | 91 | 75 | 156 | 890 | 80 |
| | Air permeation coefficient × $10^{-12}$ [cc · cm/ cm$^2$ · sec · cmHg] | 10.2 | 0.4 | 38.2 | 13.1 | 7.4 | 0.9 | 38.1 |
| Tire | Air leakage [%] | 2.6 | 0.3 | 5.2 | 2.8 | 1.9 | 0.2 | 5.2 |
| | Durability [no cracks: Good] | Good | Cracks | Good | Good | Good | Cracks | Good |

[a] Film forming conditions: Forming temperature 270[° C.], shear rate 250 [s$^{-1}$].
[b] Phase inverts and flexibility is impaired.
[c] Since viscosity ratio <3.0, aspect ratio is small and resistance to permeation impaired.

TABLE II-8

Second Step Mixing[a]

| | Formulation | Ex. II-11 | Ex. II-12 | Comp. Ex. II-12[b] | Comp. Ex. II-13[c] | Tire comp. ex. |
|---|---|---|---|---|---|---|
| Thermo-plastic elastomer | 1st step-(1) | — | — | — | — | Butyl rubber |
| | 1st step-(2) | 80 | 50 | 20 | 80 | |

TABLE II-8-continued

Second Step Mixing[a]

|  | Formulation | Ex. II-11 | Ex. II-12 | Comp. Ex. II-12[b] | Comp. Ex. II-13[c] | Tire comp. ex. |
|---|---|---|---|---|---|---|
| Barrier resin | MXD6-(1) | — | — | — | — | |
| | MXD6-(2) | — | — | — | — | |
| | N6,66-(1) | — | — | — | — | |
| | N6,66-(2) | — | — | — | — | |
| | N6-(1) | 20 | 50 | 80 | — | |
| | N6-(2) | — | — | — | 20 | |
| Dispersion properties | $\eta_d/\eta_m$ | 3.0 | 3.0 | 3.0 | 0.3 | — |
| | $\alpha$ | 0.08 | 0.31 | 1.25 | 0.87 | — |
| | Aspect ratio A | 40 | 90 | 3 | 9 | — |
| Original physical properties | Young's modulus [MPa] | 85 | 162 | 680 | 92 | 5.0 |
| | Air permeation coefficient × $10^{-12}$ [cc · cm/ cm$^2$ · sec · cmHg] | 14.2 | 9.5 | 1.0 | 39.6 | 142.0 |
| Tire | Air leakage [%] | 2.9 | 2.0 | 0.2 | 5.3 | 3.0 |
| | Durability [no cracks: Good] | Good | Good | Cracks | Good | Good |

[a] Film forming conditions: Forming temperature 270[° C.], shear rate 250 [s$^{-1}$].
[b] Phase inverts and flexibility is impaired.
[c] Since viscosity ratio <3.0, aspect ratio is small and resistance to permeation impaired.

From the above results, it was confirmed that in Examples II-1 to II-12 simultaneously satisfying the conditions of the ratio of melt viscosities, the α value, and the aspect ratio set by the present invention, compared with Comparative Examples 11-1 to II-13, the desired Young's modulus and gas permeation degree were achieved. Further, when the compositions of Examples II-1 to II-12 were used for tires, the desired durability was obtained in all cases and extremely excellent results were shown compared with the prior art of Comparative Examples II-1 to II-13 in terms of the gas (air) permeability.

Examples II-13 to II-16 and Comparative Examples II-14 to II-17

Further, the results of second step mixing performed in exactly the same way as in the above Examples II-1 to II-12 and Comparative Examples II-1 to II-13 except that use was made of a predetermined EVOH (ethylene-vinyl alcohol copolymer resin) polymer as the barrier resin in the second step are shown in the following Table IX. Further, the results of tires used in exactly the same way as shown in the above Examples II-1 to II-12 and Comparative Examples II-1 to II-13 are shown in the following Table II-9.

TABLE II-9

Second Step Mixing[a]

|  | Formulation | Ex. II-13 | Ex. II-14 | Comp. Ex. II-14[b] | Comp. Ex. II-15[c] | Ex. II-15 | Ex. II-16 | Comp. Ex. II-16[b] | Comp. Ex. II-17[c] |
|---|---|---|---|---|---|---|---|---|---|
| Thermoplastic elastomer | 1st step-(1) | 80 | 50 | 10 | 80 | — | — | — | — |
| | 1st step-(2) | — | — | — | — | 80 | 50 | 20 | — |
| Barrier resin | EVOH-(1) | 20 | 50 | 90 | — | 20 | 50 | 80 | 80 |
| | EVOH-(2) | — | — | — | 20 | — | — | — | 20 |
| Dispersion properties | $\eta_d/\eta_m$ | 3.4 | 3.4 | 3.4 | 1.2 | 3.2 | 3.2 | 3.2 | 1.1 |
| | $\alpha$ | 0.07 | 0.29 | 2.65 | 0.21 | 0.08 | 0.31 | 1.25 | 0.22 |
| | Aspect ratio A | 110 | 140 | 4 | 4 | 80 | 110 | 3 | 6 |
| Original physical properties | Young's modulus [MPa] | 80 | 95 | 900 | 83 | 85 | 98 | 810 | 110 |
| | Air permeation coefficient × $10^{-12}$ [cc · cm/ cm$^2$ · sec · cmHg] | 3.2 | 0.8 | 0.05 | 25.1 | 4.8 | 1.3 | 0.70 | 31.3 |
| Tire | Air leakage [%] | 0.9 | 0.2 | 0.1 | 4.4 | 1.6 | 0.4 | 0.2 | 4.9 |
| | Durability [no cracks: Good] | Good | Good | Cracks | Good | Good | Good | Cracks | Good |

[a] Film forming conditions: Forming temperature 270[° C.]/shear rate 250 [s$^{-1}$].

TABLE II-9-continued

Second Step Mixing[a]

| Formulation | Ex. II-13 | Ex. II-14 | Comp. Ex. II-14[b] | Comp. Ex. II-15[c] | Ex. II-15 | Ex. II-16 | Comp. Ex. II-16[b] | Comp. Ex. II-17[c] |
|---|---|---|---|---|---|---|---|---|

[b] Phase inverts and flexibility is impaired.
[c] Since viscosity ratio <3.0, aspect ratio is small and resistance to permeation impaired.

From the above results, it was confirmed that even with Examples II-13 to II-16, satisfying simultaneously the conditions of the ratio of the melt viscosities, a value, and aspect ratio of the present invention, compared with Comparative Examples II-14 to II-17, the desired Young's modulus and gas permeation degree could all be achieved. Further, even in the case of use of Example II-13 to II-16 for tires, the required durability conditions could be satisfied and also a remarkable effect could be exhibited in terms of the gas (air) permeation.

Example II-18

In this Example, the explanation is made of the fact that, in the low permeability thermoplastic elastomer composition obtained in the present invention, due to the three-way morphology of the multiple-component system blend of the rubber/matrix resin/barrier resin, the rubber was finely dispersed and the barrier resin formed a flat layer structure.

For direct observation of the morphology, use was made of an optical microscope (Nikon MICRORHOT-FXA) and a transmission electron microscope (Hitachi Model H-800). Samples prepared in the following way were directly observed along the Z-axial section, X-axial section, and Y-axial section at ×200 magnifications. Further, the X-axial section was directly observed at ×6000 magnification. The results are shown in FIGS. 9(a), 9(b), and 9(c) and FIGS. 10(a), 10(b), 10(c), and 10(d).

Preparation of Samples: As the first step batch, modified butyl rubber/N11 was mixed by a twin-screw kneader/extruder, then pellets of the MXD6 of the barrier resin were mixed in and these were shaped by a single-screw extruder having a T-die into a film (thickness of 0.20 mm). The film samples were stained by iodine etc. and formed into 'super thin slices by a microtome etc. According to the micrographs of FIGS. 9(a) to 9(c) and FIGS. 10(a) to 10(d), the low permeability thermoplastic elastomer composition obtained according to the present invention is understood to form a morphology wherein the rubber component (modified butyl rubber) is finely dispersed in the matrix resin component (N11) and the barrier resin component (MXD6) is present in a flat layer structure.

Example II-19

In this Example, it is explained that an adjustment of the ratio of melt viscosities in the composition of the present invention and a fluctuation in the conditions of the processing by the T-die (take-up speed) cause a change in the flat shape of the barrier resin composition and a change in the gas permeable prevention property.

Figure 11:
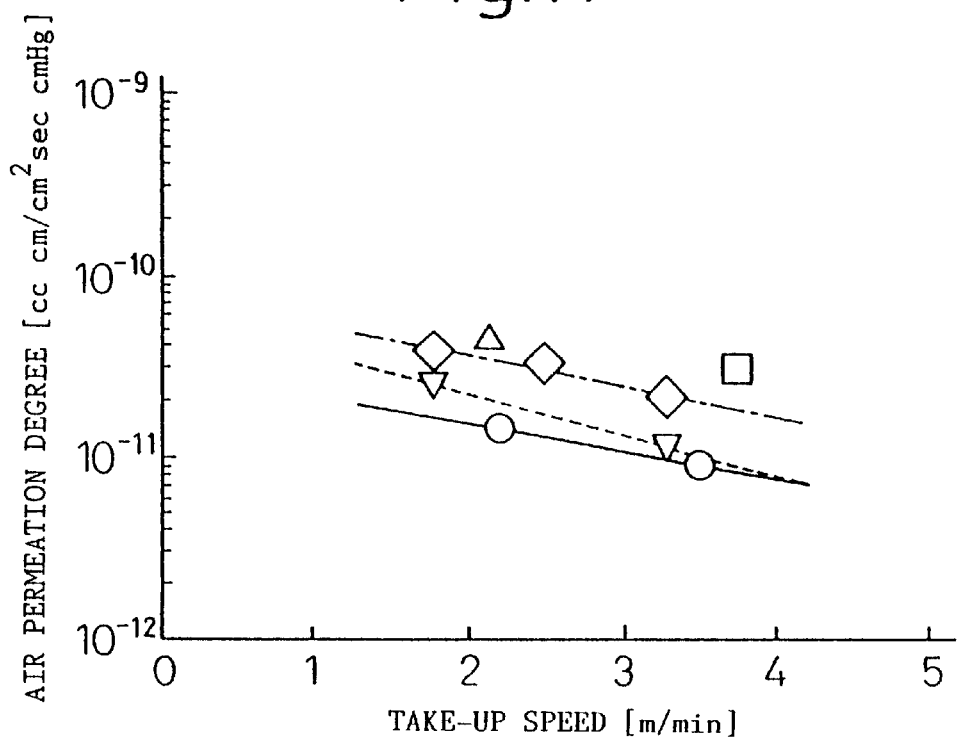
FIG. 11 is a view showing the addition of functions by control of the morphology in a low permeability thermoplastic elastomer composition of the present invention.

The relationship of the gas permeation degree in the case of a change of the type of the barrier resin composition in the composition of the present invention or in the case of a change in the processing (take-up speed) by the T-die is shown in FIG. 11. Further, the state of the change of shape of the barrier resin layer in the case of using the same type of barrier resin composition and changing only the take-up speed during the processing is shown in the above FIG. 10(a), 10(b), 10(c), and 10(d).

According to these figures, the gas permeation degree differs depending on the barrier resin composition which is used. Further, even if the same type of barrier resin composition is used, if the take-up speed at the time of processing is large, the shape (flatness) of the barrier resin layer will change (become flatter) and the gas permeation degree will fall.

Examples 111

Preparation of Thermoplastic Elastomer Composition (A)

The components shown in the following formulation (I), that is, the thermoplastic resin component, elastomer component, and vulcanization system were used to prepare the thermoplastic -elastomer composition (A).

First, a rubber use Banbury mixer was used to mix the elastomer component in the ratio of weight shown in formulation (I), then a rubber use roll was used to form it into a sheet of a thickness of 2 mm. Suitably thereafter, this was pelletized by a rubber pelletizer for use in the production of the thermoplastic elastomer composition shown next. Under a relatively high shear rate of 250 revolutions, the thermoplastic resin component, that is, the illustrated polypropylene resin, was charged into a 44 mm caliber twin-screw kneader/extruder from the first charging port and melted while mixing. Next the pellets of the afore-mentioned elastomer component were charged from the second charging port so as to give the ratio of composition shown in formulation (I) continuously and mixed so that the elastomer component finely dispersed in the polypropylene resin. Then a vulcanization system of the ratio shown was added from a third charging port, with mixing, so as to give the ratio of composition of the formulation (I) with respect to the thermoplastic resin component and elastomer component and cause vulcanization. Suitably thereafter, the mixture was extruded in strands from the front end of the twin-screw kneader/extruder. The strands were cooled in a water tank, then pelletized by a resin-use pelletizer and used for mixing with the functional resin material.

FORMULATION TABLE

(1) Thermoplastic Elastomer Composition Formulation (A)

| Component | Material | Name of product | Manufacturer | Percent composition | Thermoplastic elastomer formulation (A) |
|---|---|---|---|---|---|
| Thermoplastic resin component | Propylene (PP) | MA710 | Tokuyama | 100 | 45 |
| Elastomer component | EPDM | Mitsui EPT4045 | Mitsui Petrochemical | 100 | 55 |
| | HAF carbon black | Seast N | Tokai Carbon | 60 | |
| | Paraffinic softener | Sunpar 2280 | Nihon San-Sekiyu | 20 | |
| | ZnO | Zinc White No. 3 | | 5 | |
| | Stearic acid | | | 1 | |
| Vulcanization system | Powdered sulfur | | | 0.5 | 1.04 |
| | Accelerator BZ | Nocceler BZ | Ouchi Chem. Ind. | 1.0 | |
| | Accelerator TRA | Sanceler TRA-C | Sanshin Chemical | 0.5 | |
| | Accelerator TT | Nocceler TT-PO | Ouchi Chem. Ind. | 0.5 | |
| | Accelerator CZ | Nocceler CZ-G | Ouchi Chem. Ind. | 1.0 | |

Preparation of Functional Thermoplastic Elastomer Composition

Pellets of the thermoplastic elastomer composition obtained above and pellets of the modified polyester adhesive resin shown in Table III-1 were mixed as the functional thermoplastic resin component in advance in a ratio of weight shown in Table III-2. The mixed pellets were charged into a 40 mm caliber single-screw kneader/extruder from the charging port and mixed at a relatively low shear rate at 40 rpm. Suitably thereafter, they were extruded as strands from the die provided at the front end of the single-screw kneader/extruder. The strands were water-cooled, then pelletized by a resin-use pelletizer and used for measurement of the compression set.

Preparation of Thin Film Sheet

When preparing the thin film sheet, a T-die attached to the front end of the above single-screw kneader/extruder was used to prepare a film of a thickness of 150 $\mu$m and a width of 350 mm. The film obtained was measured as to its air permeation coefficient, elongation at break, and peeling strength with the rubber material or textile material to be laminated with.

Preparation of Tire

A 150 $\mu$m film of the thermoplastic elastomer composition above obtained was wrapped around a tire shaping drum. A carcass coated with rubber of the following formulation (II), side belts, treads, and other tire members were superposed on this and the assembly inflated to make a green tire (see FIG. 2).

The green tire was vulcanized by a vulcanizer at 180° C. for 10 minutes to produce a tire having a tire size 165SR13.

| Formulation (II) of Rubber Composition | Parts by weight | | |
|---|---|---|---|
| Natural rubber, RSS #3 | 80 | | |
| SBR | 20 | Nipol 1502 | made by Nihon Zeon |
| FEF carbon black | 50 | HTC 100 | made by Chubu Carbon |
| Stearic acid | 2 | Beads Stearic Acid NY, made by Nihon Yushi | |
| ZnO | 3 | Zinc White No. 3 | |
| Sulfur | 3 | Powdered sulfur Karuizawa Refinery | |
| Vulcanizatidn accelerator (BBS) | 1 | N-t-butyl-2-benzothiazyl sulfenamide | |
| Aroma oil | 2 | Desolex No. 3 made by Showa Shell Oil | |

On the other hand, as a Comparative Example, a green tire was formed having at the inner surface of the green tire and through tie rubber having a thickness of about 0.7 mm an inner liner layer having about 0.5 mm thickness comprised of unvulcanized butyl rubber. This was then vulcanized to form a tire (size 165SR13).

The formulation of the inner liner layer obtained and the results of the long term durability test are shown in the later mentioned Table III-5 and Table III-6.

Examples III-1 to III-5 and Comparative Examples III-1 to III-3

The viscosities and the physical properties of the thermoplastic elastomer composition (A) and the functional (adhesive) thermoplastic resin component used in Examples III-1 to III-5 and Comparative Examples III-1 to III-3 prepared above are shown in Table III-1. Further, test pieces for use in the tests were prepared as explained above from the functional (adhesive) thermoplastic elastomer compositions of the predetermined weight ratios of polymers of Table III-1. The test results are shown in Table III-2.

TABLE III-1

Polymer Used

| | Composition | Viscosity [poise][e] | $E_B$ [%] | C-set[f] |
|---|---|---|---|---|
| Thermoplastic elastomer composition (A) | EPDM/PP[a] | 6300 | 410 | 45 |
| Functional (adhesive) thermoplastic resin | Polyester family adhesive resin[b] | 1800 | 350 | 98 |
| | Polyester family adhesive resin[c] | 2600 | 650 | 98 |
| | Olefin family adhesive resin[d] | 1400 | 600 | 100 |

Notes:
[a]EPDM/PP = 55/45 (EPDM: ethylene-propylene-diene copolymer, PP: polypropylene resin).
[b]Vylon GM400 (Toyobo).
[c]Vylon GM990 (Toyobo).
[d]Admer QB540 (Mitsui Petrochemical) (anhydrous maleic acid modified propylene).
[e]Shearing rate 200 [sec$^{-1}$] at 200[° C.] (conditions at mixing temperature).

TABLE III-2

Adhesion of EPDM/PP Family Functional Thermoplastic Elastomer Composition With Reinforcing Yarn

| Component | Formulation | Ex. III-1 | Ex. III-2 | Comp. Ex. III-1 | Ex. III-3 | Ex. III-4 | Ex. III-5 | Comp. Ex. III-2 | Comp. Ex. III-3 |
|---|---|---|---|---|---|---|---|---|---|
| (A) Thermoplastic elastomer composition | EPDM/PP[a] | 67 | 70 | 78 | 67 | 70 | 56 | 80 | 60 |
| (B) Functional thermoplastic resin | Polyester family adhesive resin[b] | 30 | 30 | 20 | — | — | — | — | — |
| | Polyester family adhesive resin[c] | — | — | — | 30 | 30 | 40 | — | — |
| (C) Compatibilizer | Olefin family adhesive resin[d] | — | 2 | 3 | — | 4 | 20 | 40 | |
| ΔSP | | 2.50 | 2.50 | 2.50 | 2.46 | 2.46 | 2.46 | 0.72 | 0.72 |
| α value | | 0.66 | 0.67 | 1.11 | 0.96 | 0.96 | 0.60 | 0.88 | 0.33 |
| Adhesiveness | Peeling strength [N/mm] | 2.40 | 2.40 | 0.10 | 2.50 | 2.46 | 2.46 | 0.10 | 0.30 |
| Physical properties | $E_B$ (%) | 400 | 70 | 450 | 460 | 80 | 480 | 430 | 530 |
| | C-set 100° C. × 72 h | 50 | 50 | 48 | 52 | 51 | 85 | 48 | 90 |

(Notes)
[a]EPDM/PP = 55/45, specific gravity 0.96.
[b]Vylon GM400 (Toyobo), specific gravity 1.02.
[c]Vylon GM990 (Toyobo), specific gravity 1.04.
[d]Nisseki N Polymer A-1600 (Nihon Sekiyu Kagaku).

From the results of Table III-2, it is learned that, in Examples III-1 to III-5 of the present invention, satisfaction of the requirements of the difference of the values of the solubility parameters (ΔSP) and the volume fraction of the functional thermoplastic resin material (adhesive thermoplastic resin material) of the value of formula (1) prescribed in the present invention was due to the added adhesive thermoplastic resin component concentrated at the surface portion due to the processing, and therefore, an excellent adhesion was obtained with the reinforcing fibers despite no adhesive treatment being performed. On the other hand, even with a similar ΔSP formulation, when the a value is larger than 1.0, the adhesive thermoplastic resin component is not positioned at the surface (Comparative Example III-1). Further, even if the condition that the α value be smaller than 1.0 is satisfied, if the ΔSP is smaller than 1 and the solubility is too good, it similarly will not be positioned at the surface (Comparative Examples III-2 and III-3) and a sufficient adhesiveness cannot be imparted. Further, as a more preferable mode, when desiring to obtain an adhesive thermoplastic elastomer composition having excellent physical properties in addition to maintaining an excellent adhesiveness, it is clear that it is best to add an olefin thermoplastic resin, as a compatibilizer, after the above requirements are satisfied (clear from a comparison of Examples III-1 and III-2 and Examples II-3 and III-4).

Example III-6 and Comparative Example III-4

Using the same technique as with the thermoplastic elastomer compositions (A) and (B), a thermoplastic elastomer composition (C) used in these Examples was prepared from the composition shown in Table II-5. In this case, as the dynamic vulcanization system for the modified butyl elastomer, 0.5 part by weight of zinc oxide, 2.0 parts by weight of stearic acid, and 1.0 part by weight of zinc stearate were added with respect to 100 parts by weight of elastomer. Further, a polyolefin adhesive resin having the properties shown in Table III-3 was used as a functional thermoplastic resin material to prepare a functional (bondable) thermoplastic elastomer composition by the afore-mentioned method.

Next, the afore-mentioned method was used to form a film of 150 μm thickness. This was used as the air barrier layer in the inner liner layer to prepare a tire of 155SR13. The properties of the material and the results of the evaluation of the long term durability of the tire are shown in Table III-4.

TABLE III-3

| Component | Inner Liner Material Composition | Viscosity (poise) |
|---|---|---|
| Thermoplastic elastomer composition (C) | Modified IIR/NII = 70/30* | 5200 |
| Polyolefin adhesive resin | (b) | 1500 |
| | (c) | 3300 |

*Modified film: Bromide of p-methylstyrene-isobutylene copolymer EXXPRO 89-4 (Exxon Chemical)
N11: BMNO TL (Toray).
(b) Nisseki N Polymer A-1600 (Nihon Sekiyu Kagaku).
(c) Rexpearl RA3150 (Nihon Sekiyu Kagaku).

TABLE III-4

| | | | Tire Properties | |
|---|---|---|---|---|
| | | Composition | Ex. III-6 | Comp. Ex. III-4 |
| Inner liner material | | Thermoplastic elastomer composition (C) | 70 | 70 |
| | | Polyolefin adhesive resin (h) | 30 | — |
| | | Polyolefin adhesive resin (c) | — | 30 |
| Material properties | Peeling strength with rubber composition [N/mm] | Rubber composition (II) | 1.6 | 0.1 |
| | | Rubber composition (III) | 1.8 | 0.05 |
| | ΔSP | | 4.2 | 4.2 |
| | α | | 0.67 | 1.48 |
| Tire properties | Tire long term durability running test | Condition | Pass No fissures, wrinkles, or cracks | Pass Fissures, cracks |

As clear from the results of the above Table III-4, even in combinations different from the past, e.g., the modified IIR/N11/polyolefin adhesive resin, in so far as the predetermined conditions of the ΔSP value and the α value are both satisfied, an excellent adhesion with a rubber composition is obtained due to the concentration of the adhesive resin material at the surface of the film layer and further excellent results were obtained in durability tests of the tires.

The methods of evaluation used in the following Examples IV-1 to IV-5 and Comparative Examples IV-1 to IV-2 were as follows:

Method of Measurement of Air Permeation Coefficient of Film

This was performed based on JIS K7126 "Test Method of Gas Permeation Degree of Plastic Films and Sheets (Method A)".

Test piece: Film samples prepared in example were used.
Test gas: Air ($N_2:O_2=8:2$)
Test temperature: 30° C.

Method of Measurement of Young's Modulus of Film

This was performed based on JIS K6251 "Test Method for Tensile Properties of Vulcanized Rubber".

Test piece: Samples of the film prepared by extrusion in the Examples were used and punched into JIS No. 3 dumbbell shapes in the direction of flow of the thermoplastic resin at the time of extrusion. A tangent was drawn against the curve of the initial strain region of the obtained stress-strain curve and the Young's modulus was found from the inclination of the tangent.

Method of Measurement of Adhesiveness with Rubber

This was performed based on JIS K6301 "Test Method for Tensile Properties of Vulcanized Rubber".

Test piece: Sheet-like unvulcanized rubber compositions were superposed over samples of the film prepared by extrusion in the Examples and vulcanized using a press at 180° C.×10 min×23 MPa. The resultant rubber/film laminates were cut into short strips of 25 mm width.

Test method: The test pieces were then pulled apart by a peeling rate of 50 mm/minute at an angle of 180 degree for a peeling test.

Examples IV-1 to IV-5 and Comparative Examples IV-1 and IV-2

Various thermoplastic components (A) and (C) and elastomer components (B) in the ratios of compounding (parts by weight) shown in Table IV-1 and, further, as a vulcanization agent, Zinc White No. 3 and zinc stearate in amounts giving 5 parts by weight and 2 parts by weight with respect to 100 parts by weight of the polymer component of the rubber composition were measured and continuously charged during twin-screw mixing so as to dynamically vulcanize the rubber master batch component dispersed as a dispersed phase (domain) in the resin matrix during the mixing. Right after the mixing by the twin-screw extruder, the result was pelletized by a resin-use pelletizer, then the pellets were used to form a film of a width of 350 mm and a thickness of 0.1 mm by a resin-use extruder having a sheeting use T-die.

The air permeation coefficient and Young's modulus of the film obtained were then measured. The results are shown in Table IV-1.

Next, a sheet-like. (2 mm thick) rubber composition of the following formulation was superposed on the obtained film (0.1 mm thick) to make the test pieces.

| Composition | Parts by weight | |
|---|---|---|
| Natural rubber, RSS #3 | 80 | |
| SBR | 20 | Nipol 1502 made by Nihon Zeon |
| FEF carbon black | 50 | HTC 100 made by Chubu Carbon |
| Stearic acid | 2 | Lunax YA made by Kao |
| ZnO | 3 | Ginrei Zinc White made by Toho Zinc |
| Sulfur | 3 | Powdered sulfur Karuizawa Refinery |
| Vulcanization accelerator DM | 1 | Nocceler DM made by Ouchi Shinko Chemical Industrial |
| Aroma oil | 2 | |

The laminate test piece obtained was used to measure the adhesiveness N/25 mm with rubber. The results are shown in Table IV-1.

TABLE IV-1

| Component | | Ex. IV-1 | Ex. IV-2 | Ex. IV-3 | Ex. IV-4 | Ex. IV-5 | Comp. Ex. IV-1 | Comp. Ex. IV-2 |
|---|---|---|---|---|---|---|---|---|
| A | N11 BMN 0[1] | 26 | | | 26 | 34 | 35 | 35 |
| | N6/66 CM6001[2] | | 48 | 45 | | 14 | | 14 |
| | MXD-6[3] | 10 | | | 10 | | 7 | |
| B | Br-polyisoprene-p-methylstyrene[4] | 34 | 32 | 50 | 34 | 32 | 48 | 31 |
| C | EEA-g-MAH A-1600[5] | 30 | 20 | 5 | | 20 | | |
| | EEA-co-GMA RA3150[6] | | | | 30 | | | |
| | EPM-g-MAH[7] | | | | | | 10 | 10 |
| Total | | 100 | 100 | 100 | 100 | 100 | 100 | 100 |
| Measurement item | $\phi_A/\phi_C \cdot \eta_C/\eta_A$ | 0.61 | 0.52 | 0.88 | 0.48 | 0.60 | 1.22 | 1.34 |
| | Air permeation coefficient × $10^{-12}$ cc · cm/cm$^2$ · sec · cmHg | 24 | 14 | 12 | 21 | 19 | 27 | 29 |
| | Young's modulus (MPa) | 58 | 70 | 80 | 65 | 64 | 52 | 54 |
| | Adhesiveness with rubber (N/25 mm) | 37.6 | 27.1 | 40.0 | 28.0 | 32.2 | 11.6 | 10.0 |

Notes:
[1])BMN 0 (Atochem).
[2])CM6001 (Toray).
[3])MXD-6 (Mitsui Gas Chemical).
[4])EXXPRO XP-50 89-4 (Exxon Chemical).
[5])A-1600 (Shiraishi).
[6])RA3150 (Shiraishi).
[7])EPM-g-MAH Tuffmar MP0610 (Mitsui Sekiyu Kagaku).

From Table IV-1, it is learned that by making $[\phi_A/\phi_C] \cdot [\eta_C/\eta_A] < 1.0$, a thermoplastic elastomer composition superior in the balance of the air permeation preventive property and flexibility and further superior in the adhesiveness with rubber can be obtained. Further, $[\phi_A/\phi_C] \cdot [\eta_C/\eta_A] > 1.0$, while the flexibility is superior, the air permeation preventive property and the adhesiveness with rubber end up becoming inferior.

Examples of tires will be shown below. The methods of evaluation used in Examples IV-6 to IV-10 and Comparative Examples IV-3 to IV-4 were as follows:

Method of Testing Durability of Inner Liner Layer

A 165SR13 steel radial tire was produced, assembled over a rim of 13×4½-J size, filled to an air pressure of 200 kPa, mounted on a 1500 cc class passenger car, then run on an actual road for 20,000 km with a load corresponding to four passengers (65 kg/passenger).

After this operation, the tire was detached from the rim and the liner layer at the inside surface of the tire was visually inspected. Tires with cracks in the liner layer, visible wrinkles, or peeling or rising of the liner layer were judged as defective and those without them as passing.

Method of Testing Air Leakage (Pressure Drop)

The tire was allowed to stand for three months under conditions of an initial pressure of 200 kPa, room temperature of 21° C., and no load. The inner pressure was measured at intervals of four days and the α value found by recurrence to the formula:

$Pt/Pt = \exp(-\alpha t)$ where Pt is the measured pressure, Po is the initial pressure, and t is the days elapsed. Using the α obtained and a t of 30 days, the drop in air pressure α per month (%/month) was found as follows:

$\beta = [1 - \exp(-\alpha t)] \times 100$

Examples IV-6 to Example IV-10 and Comparative Examples IV-3 and IV-4

Steel radial tires of a tire size 165SR13 were produced by ordinary methods. The Examples were tested as to the tire durability and drop in pressure.

The results are shown in Table IV-2.

TABLE IV-2

| Tire | Ex. IV-6 | Ex. IV-7 | Ex. IV-8 | Ex. IV-9 | Ex. IV-10 | Comp. Ex. IV-3 | Comp. Ex. IV-4 |
|---|---|---|---|---|---|---|---|
| Material of air permeation preventive layer | Ex. IV-1 | Ex. IV-2 | Ex. IV-3 | Ex. IV-4 | Ex. IV-5 | Comp. Ex. IV-1 | Comp. Ex. IV-2 |
| Thickness of air permeation preventive layer (mm) | 0.2 | 0.2 | 0.2 | 0.2 | 0.2 | 0.2 | 0.2 |
| Pressure loss (%/month) | 2.7 | 2.0 | 1.9 | 2.6 | 2.6 | 3.2 | 3.3 |
| Tire durability | Pass | Pass | Pass | Pass | Pass | Fail | Fail |

From Table IV-2, it is learned that Examples IV-6 to IV-10 where the thermoplastic elastomer composition of the present invention is used for the air permeation preventive layer of the pneumatic tire gave excellent results in both the tire durability and pressure drop able to withstand actual use. As opposed to this, Comparative Examples IV-3 and IV-4 had large air permeation coefficients, and therefore, larger rates of pressure drop of the tires and further had low adhesiveness, and therefore, did not have a practical level of durability.

The methods of evaluation used in the following Examples V-1 to V-5 and Comparative Examples V-1 to V-2 were as follows:

Method of Measurement of Air Permeation Coefficient of Film

This was performed based on JIS K7126 "Test Method of Gas Permeation Degree of Plastic Films and Sheets (Method A)".

Test piece: Film samples prepared in Example were used.

Test gas: Air ($N_2:O_2=8:2$)

Test temperature: 30° C.

Method of Measurement of Young's Modulus of Film

This was performed based on JIS K6301 "Test Method for Tensile Properties of Vulcanized Rubber".

Test piece: Samples of the film prepared by extrusion in the Examples were used and punched into JIS No. 3 dumbbell shapes in the direction of flow of the thermoplastic resin at the time of extrusion. A tangent was drawn against the curve of the initial strain region of the obtained stress-strain curve and the Young's modulus was found from the inclination of the tangent.

Method of Measurement of Bonding Strength with Rubber

This was performed based on JIS K6301 "Test Method for Tensile Properties of Vulcanized Rubber".

Test piece: Sheet-like unvulcanized rubber compositions were superposed over samples of the film prepared by extrusion in the Examples and vulcanized using a press at 180° C.×10 min×2.3 MPa. The resultant rubber/film laminates were cut into short strips of 25 mm width.

Test method: The test pieces were then pulled apart by a peeling rate of 50 mm/minute at an angle of 180 degree for a peeling test.

Examples V-1 to V-4 and Comparative Examples V-1 to V-2

The following various compounding agents were mixed into a modified butyl rubber (Br-IPMS) of a Br-isoprene-p-methylstyrene copolymer. This was mixed in a sealed rubber use Banbury mixer, then was formed into a rubber sheet of a thickness of 2.5 mm using rubber-use rolls so as to prepare a master batch.

| Master Batch Formulation | (units: parts by weight) |
|---|---|
| Br-IPMS (EXXPRO 89-4)[1] | 100 |
| Carbon black (GPF)[2] | 60 |
| Stearic acid | 1 |
| Petroleum based hydrocarbon resin[3] | 10 |
| Paraffin process oil[4] | 10 |

Notes
[1] EXXPRO 89-4: Exxon Butyl (Exxon Chemical)
[2] GPF: Seast V (Tokai Carbon)
[3] Escolez 1102 (ESSO)
[4] Machine Oil 22 (Showa Shell Oil)

The master batch was pelletized by a rubber-use pelletizer. Using the pellets, the components (A) and (C) and the master batch component (B) were mixed by a twin-screw kneader in the ratios of compounding (parts by weight) shown in the Table. Further, as a vulcanization agent, Zinc White No. 3 and zinc stearate were measured and continuously charged to give amounts of 5 parts by weight and 2 parts by weight, based upon 100 parts by weight of the polymer component of the rubber composition. By this, the rubber master batch component dispersed as a dispersed phase (domain) in the resin matrix was made to dynamically vulcanize during the mixing. The thermoplastic elastomer composition mixed by the twin-screw extruder was extruded into strands, the thermoplastic elastomer composition was further pelletized by a resin-use pelletizer, and the pellets were used to form a film of a width of 350 mm and a thickness of 0.1 mm by a resin-use extruder having a sheeting use T-die. The air permeation coefficient and Young's modulus of the obtained film were then measured.

A sheet-like (2 mm thick) rubber composition of the following formulation (I) or (II) of rubber composition was superposed on the film obtained (0.1 mm thick) and then heat fused with the same by a press at 180° C.×10 minutes× 2.3 MPa. The resultant rubber/film laminate was cut into short strips of 25 mm width. The test pieces were then pulled apart by a peeling rate of 50 mm/minute at an angle of 180 degree for a peeling test.

| Formulation (I) of Rubber Composition | Parts by weight | |
|---|---|---|
| Natural rubber, RSS #3 | 80 | |
| SBR | 20 | Nipol 1502 made by Nihon Zeon |
| FEF carbon black | 50 | HTC 100 made by Chubu Carbon |
| Stearic acid | 2 | Beads Stearic Acid NY, made by Nihon Yushi |
| ZnO | 3 | Zinc White No. 3 |
| Sulfur | 3 | Powdered sulfur Karuizawa Refinery |
| Vulcanization accelerator (BBS) | 1 | N-t-butyl-2-benzothiazyl sulfenamide |
| Aroma oil | 2 | Desolex No. 3 made by Showa Shell |

| Formulation (II) of Rubber Composition | Parts by weight | |
|---|---|---|
| Brominated butyl rubber | 100 | Exxon Bromo Butyl 2244 made by Exxon Chemical |
| Carbon black HAF | 30 | Seast N made by Tokai Carbon |
| ZnO | 3 | Zinc White No. 3, Seido Chemical |
| Sulfur | 3 | Powdered sulfur Karuizawa Refinery |
| DM | 1 | Nocceler DM made by Ouchi Shinko Chemical Industrial |
| Stearic acid | 1 | Beads Stearic Acid NY made by Nihon Yushi |

The results are shown in Table V-1.

TABLE V-1

| Component | | Ex. V-1 | Ex. V-2 | Ex. V-3 | Ex. V-4 | Comp. Ex. V-1 | Comp. Ex. V-2 |
|---|---|---|---|---|---|---|---|
| A | N11 BMN 0[1] | 34 | 34 | 25 | | | |
| | N6/66 CM6001[2] | 14 | 14 | 30 | 45 | 45 | 25 |
| B | Br-IPMS EXXPRO 89-4[3] | 32 | 32 | 32 | 50 | 53 | 15 |
| C | ESBS 015[4] epoxy equivalent 1025 | 20 | | 20 | 5 | 2 | 60 |
| | ESBS 014[5] epoxy equivalent 1900 | | 20 | | | | |
| | Air permeation coefficient × $10^{-12}$ cc · cm/cm$^2$ · sec · cmHg | 20 | 20 | 18 | 11 | 11 | *150 |
| | Young's modulus (MPa) | 30 | 40 | 60 | 80 | 95 | 12 |
| | Adhesiveness with rubber formulation (I) (N/25 min) | 65 | 50 | 49 | 40 | *11 | 120 |
| | Bonding force with rubber formulation (II) (N/25 mm) | 45 | 43 | 39 | 35 | *8 | 70 |

Notes:
[1] BMN 0 (Atochem).
[2] CM6001 (Toray).
[3] Br-IPMS EXXPRO 89-4 (Exxon Chemical).
[4] ESBS 015 (Daicel Chemical).
[5] ESBS 014 (Daicel Chemical).

As clear from Examples V-1 to V-4 and Comparative Examples V-1 and V-2, systems comprised of a matrix of the thermoplastic resin (A) in which the rubber component (B) is included and an epoxylated SBS resin is included as a third component satisfy the target regions in both air permeation coefficient and flexibility and has sufficient adhesiveness with the rubber of the formulation (1) envisioned for use with a tire.

Example V-5

Pellets of a rubber master batch the same as that prepared in Examples V-1 to V-4 were mixed with the components (A) and (B) in the following ratios of compounding by a twin-screw extruder. Also, a similar vulcanization agent was added in a similar amount to cause the rubber master batch component dispersed as a dispersed phase in the resin matrix to dynamically vulcanize during the mixing. The thermoplastic elastomer composition mixed by the twin-screw extruder was extruded in strands. The thermoplastic composition was further pelletized by a resin-use pelletizer and the pellets used to form a film of a width of 350 mm and a thickness of 200 μm by a resin-use extruder with a T-die.

Formulation of Thermoplastic Elastomer Composition (unit: parts by weight)

| A | N11 (BMN 0[1]) | 10 |
|---|---|---|
| | N6/66 (CM6001[2]) | 30 |
| B | Br-IPMS (EXXPRO 89-4[3]) | 60 |

Notes:
[1] Made by Atochem.
[2] Made by Toray.
[3] Made by EXXON Chermical.

Next, the rubber composition of the following formulation was formed into a sheet of a thickness of 1 mm by a roll mixer.

| Formulation of Rubber Composition | (Unit: Parts by weight) | |
|---|---|---|
| SBR (Nipol 1502) | 40 | Nihon Zeon |
| NR (RSS No. 3) | 60 | |
| Carbon black GPF | 45 | Seast V, made by Tokai Carbon |
| ZnO | 4 | No. 3 Zinc White |
| Stearic acid | 2 | Beads Stearic Acid NY, made by Nihon Yushi |
| Aroma oil | 3 | Desolex No. 3 made by Showa Shell Oil |
| Sulfur | 2.5 | Powdered sulfur Karuizawa Refinery |

Further, pellets of ESBS 015 (epoxy equivalent 1025) were formed into a film of a thickness of 50 μm using a resin-use T-die extruder.

The film of ESBS 015 above prepared was sandwiched between a thermoplastic elastomer film and rubber sheet. These were vulcanized and adhered using a press at 180° C.×10 minutes×2.3 MPa. The rubber/ESBS 015 film/thermoplastic elastomer film laminate obtained was cut into a short strip of 25 mm width. The test piece was pulled apart by a peeling rate of 50 mm/minute at an angle of 180 degrees for a peeling test, whereupon the result was obtained of a peeling strength of 190 N/25 mm.

Examples of tires of the present invention will be shown below. The methods of evaluation used in Examples V-6 to V-10 and Comparative Examples V-3 to V-5 were as follows:

Method of Testing Durability of Inner Liner Layer

A 165SR13 steel radial tire was produced, assembled over a rim of 13×4½-J size, filled to an air pressure of 200 kPa, mounted on a 1500 cc class passenger car, then run on an actual road for 20,000 km with a load corresponding to four passengers (65 kg/passenger).

After this operation, the tire was detached from the rim and the liner layer at the inside surface of the tire was visually inspected. Tires with cracks in the liner layer, visible wrinkles, or peeling or rising of the liner layer were judged as defective and those without them as passing.

Method of Testing Air Leakage (Pressure Drop)

The tire was allowed to stand for three months under conditions of an initial pressure of 200 kPa, room temperature of 21° C., and no load. The inner pressure was measured at intervals of four days and the a value found by recurrence to the formula:

$$Pt/Po = \exp(-\alpha t)$$

where Pt is the measured pressure, Po is the initial pressure, and t is the days elapsed. Using the $\alpha$ obtained and a t of 30 days, the drop in air pressure $\beta$ per month (%/month) was found as follows:

$$\beta[1-\exp(-\alpha t)] \times 100$$

Examples V-6 to Example V-10 and Comparative Examples V-3 to V-5

Steel radial tires of a tire size 165SR13 were produced by ordinary methods. The Examples were tested as to the tire durability and drop in pressure.

The results are shown in Table v-2.

TABLE V-2

| Tire | Ex. V-6 | Ex. V-7 | Ex. V-8 | Ex. V-9 | Ex. V-10 | Comp. Ex. V-3 | Comp. Ex. V-4 | Comp. Ex. V-5 |
|---|---|---|---|---|---|---|---|---|
| Material of air permeation preventive layer | Ex. V-1 | Ex. V-2 | Ex. V-3 | Ex. V-4 | Ex. V-5 | Comp. Ex. V-1 | Comp. Ex. V-2 | Ordinary butyl rubber inner liner formulation (II) |
| Thickness of air permeation preventive layer (min). | 0.2 | 0.2 | 0.2 | 0.1 | 0.1 | 0.1 | 0.5 | 0.5 |
| Pressure loss (%/month) | 2.6 | 2.6 | 2.4 | 2.7 | 2.7 | 2.7 | 4.6 | 2.7 |
| Tire durability | Pass | Pass | Pass | Pass | Pass | Fail | Pass | Pass |
| Tire mass (kg) | 6.5 | 6.5 | 6.5 | 6.4 | 6.4 | 6.4 | 7.0 | 7.0 |

Comparative Example V-3 had insufficient adhesiveness, and therefore, a sufficient durability of the air permeation preventive layer could not be obtained. Further, Comparative Example V-4 had a large air permeation coefficient, and therefore, a large pressure drop even when the inner liner layer was made the same thickness as Comparative Example V-5. That is, the weight could not be reduced.

As opposed to this, it was learned that Examples V-6 to V-10 all had pressure drops of equal or better performances than Comparative Example 5 and had sufficiently practical levels of durability, so could give lighter weight tires.

As explained above, according to the present invention, it is possible to provide a rubber and thermoplastic elastomer laminate comprised of a gas permeation preventive layer consisting of a thermoplastic elastomer composition using a thermoplastic resin for the continuous phase and an elastomer composition for the dispersed phase and a rubber composition strongly adhered together, so it is possible to use this as an inner liner layer which maintains a good gas (air) retention in the tire and holds the flexibility and further which is superior in adhesiveness with a rubber layer used for bonding with the carcass layer and thereby obtain a pneumatic tire reduced in weight.

Examples VI-1 to VI-5 and Comparative Examples VI-1 and VI-2

(1) First, samples were prepared using the formulations shown by I to VII in the following Table VI-1. The nylon resin pellets and compatibilizers were charged from the first charging port of the twin-screw kneader/extruder for melt mixing, then the pellets of the rubber component were charged from the second charging port to cause the rubber component to be finely dispersed in the nylon resin. Next, 0.5 part by weight of zinc oxide, 2.0 parts by weight of stearic acid, and 1.0 part by weight of zinc stearate per 100 parts by weight of the elastomer were charged as a vulcanization system from the third charging port to cause the rubber component to dynamically vulcanize and fix the dispersion of the rubber phase. Next, copper iodide, Irganox 1010, Cinubin 144, a crystal nucleating agent A, crystal nucleating agent B, crystallization prevention agent C, etc. were charged from the fourth charging port. The obtained thermoplastic elastomer composition was extruded into strands which were then cooled by water and then pelletized by a resin-use pelletizer. Then, the resultant pellet was extruded from a 40 mmøresin use single screw type extruder having a T type die to form a film having a width of 400 mm and a thickness of 0.20 mm.

TABLE VI-1

Composition of Thermoplastic Elastomer Composition

| | Composition of examples | | | | | Composition of comparative examples | |
|---|---|---|---|---|---|---|---|
| Composition | I | II | III | IV | V | VI | VII |
| Nylon 6/66[1] | 60 | 60 | 10 | 60 | 10 | 60 | 10 |
| Nylon 11[2] | — | — | 30 | — | 30 | — | 30 |
| Elastomer[3] | 40 | 40 | 60 | 40 | 60 | 40 | 60 |
| Subtotal | 100 | 100 | 100 | 100 | 100 | 100 | 100 |
| Compatibilizer[4] | 25 | 25 | 6 | 5 | 6 | 25 | 6 |
| Copper iodide | 0.02 | — | — | 0.02 | 0.02 | — | — |
| Hindered phenol[5] | — | 0.5 | — | 0.7 | — | — | — |
| Hindered amine[6] | — | — | 0.4 | — | — | — | — |
| Crystal nucleating agent A[7] | — | — | — | — | 0.5 | — | — |
| Crystal nucleating agent B[8] | — | 0.2 | — | — | — | — | — |
| Crystallization prevention agent C[9] | — | — | — | — | 0.01 | — | — |

TABLE VI-1-continued

Composition of Thermoplastic Elastomer Composition

|  | Composition of examples | | | | | Composition of comparative examples | |
|---|---|---|---|---|---|---|---|
| Composition | I | II | III | IV | V | VI | VII |

[1])CM6001: made by Toray.
[2])BESNO TL: made by Atochem.
[3])Elastomer: EXXPRO 89-4
Bromide of isoprene-p-methylstyrene copolymer
[4])Compatibilizer: Admer QB540
Anhydrous maleic acid modified polyolefin
[5])Hindered phenol: Irgnox 1010 made by Ciba-Geigy
[6])Hindered amine: Cinubin 144, made by Ciba-Geigy
[7])Crystal nucleating agent A: Calcium stearate
[8])Crystal nucleating agent B: Styrene bis-stearyl amide
[9])Crystallization prevention agent C: Lithium chloride (2) On the other hand, the formulations shown in the following Table VI-2 were mixed by a rubber-use Banbury mixer. The rubber polymers were charged into the Banbury mixer and mixed for 1 minute, then the oil etc. was charged and the mixing continued for another minute. The ram was raised and the inside mixed batch was inverted, then the ram was again lowered and mixing continued for a further 2 minutes. The vulcanization system was added to the mixed rubber composition which was then further mixed to prepare unvulcanized rubber sheets of 2 mm thickness.

TABLE VI-2

Composition of Rubber Composition

| Rubber composition | A | B |
|---|---|---|
| SBR | 40 | — |
| NR | 60 | — |
| IIR | — | 90 |
| Cl-IIR | — | 10 |
| Carbon black HAF | 45 | 60 |
| ZnO | 4 | 3 |
| Stearic acid | 2 | — |
| Aroma oil | 3 | — |
| Naphthalenic oil | — | 10 |
| Sulfur | 2.5 | — |
| Phenol resin[1]) | — | 8 |

[1])Takirol 250-I, Taoka Chemical.

(3) A urethane adhesive was coated on the rubber sheet prepared by the above (2) (150 mm×150 mm×2mm) and the film prepared in the above (1) was superposed over it to obtain a laminate of the rubber composition and thermoplastic elastomer. The laminate was pressed by a small sized hand press at a press temperature of 180° C., a processing time of 10 minutes, and a press pressure of 2.3 MPa.

(4) Further, a 360 mm width was cut from the film prepared by the above (1) and was adhered to a tire shaping drum. The splice portion was joined by a usually used phenol resin adhesive. Next, a carcass, sides, belts, treads, and other tire members were superposed over the film and the assembly inflated to prepare a green tire. The green tire was vulcanized at 185° C. for 15 minutes at a pressure of 2.3 MPa to produce a tire of a tire size165SR131.

(5) The film prepared in the above (1) was used to measure the breaking strength and elongation at break of the thermoplastic elastomer composition. Next, the laminate prepared in the above (3) was used to evaluate and test the heat resistance after vulcanization. Further, the tire prepared in the above (4) was used to test the durability of the tire.

Note that the methods of testing and measurement and the methods of evaluation used for these tests were as follows:

Breaking Strength and Elongation at Break of Thermoplastic Elastomer Material

This was performed based on JIS K6251 "Test Method for Tensile Properties of Vulcanized Rubber". For the test pieces, film or sheet samples prepared in the examples of the above (1) were punched into JIS No. 3 dumbbell shapes in parallel to the direction of extrusion at the time of extrusion. The breaking strength and elongation at break were found from the obtained stress-strain curve.

Rate of Retention of Breaking Strength and Elongation after Vulcanization of Thermoplastic Elastomer Material The laminates prepared in the Examples of the above (3) were immersed in toluene for 24 hours, then the thermoplastic elastomer films were peeled off. The thermoplastic elastomer films peeled off were punched into No. 3 dumbbell shapes and used for testing the tensile strength by an autograph.

The rate of retention of the breaking strength and elongation was found by the following equation:

Rate of retention (%)=(Breaking strength and elongation after pressing)/(Original breaking strength and elongation)×100

Test of Durability of Tire

The 165SR13 steel radial tires (rim of 13×4½-J) prepared in the Examples of the above (4) were run on an actual road for 20,000 km at an air pressure of 200 kPa on a 1500 cc class passenger car with a load corresponding to four passengers (65 kg/passenger).

After this operation, the tires were detached from the rim and the liner layer at the inside surface of the tires was visually inspected. Tires with cracks in the liner layer, visible wrinkles, or peeling or rising of the liner layer were judged as defective and those without them as passing.

The test was designed to give an overall evaluation of the deterioration in strength, deterioration in bonding, etc. of the liner layer when used with an actual vehicle.

The results are shown in the following Table VI-3.

TABLE VI-3

|  |  | Ex. VI-1 | Ex. VI-2 | Ex. VI-3 | Ex. VI-4 | Ex. VI-5 | Comp. Ex. VI-1 | Comp. Ex. VI-2 |
|---|---|---|---|---|---|---|---|---|
| Combination of layers | Thermoplastic elastomer composition I | Good | — | — | — | — | — | — |
|  | Thermoplastic elastomer composition II | — | Good | — | — | — | — | — |
|  | Thermoplastic elastomer composition III | — | — | Good | — | — | — | — |
|  | Thermoplastic elastomer | — | — | — | Good | — | — | — |

TABLE VI-3-continued

|  |  | Ex. VI-1 | Ex. VI-2 | Ex. VI-3 | Ex. VI-4 | Ex. VI-5 | Comp. Ex. VI-1 | Comp. Ex. VI-2 |
|---|---|---|---|---|---|---|---|---|
|  | composition IV |  |  |  |  |  |  |  |
|  | Thermoplastic elastomer composition V | — | — | — | — | Good | — | — |
|  | Thermoplastic elastomer composition VI, comp. | — | — | — | — | — | Good | — |
|  | Thermoplastic elastomer composition VII, comp. | — | — | — | — | — | — | Good |
|  | Rubber composition A | Good | Good | Good | Good | Good | Good | — |
|  | Rubber composition B | — | — | — | — | — | — | Good |
| Physical properties | Thermoplastic elastomer composition Physical properties before vulcanization |  |  |  |  |  |  |  |
|  | Strength (MPa) | 180 | 180 | 160 | 260 | 110 | 180 | 160 |
|  | Elongation (%) | 310 | 330 | 300 | 340 | 310 | 30 | 30 |
|  | Evaluation of heat resistance after vulcanization |  |  |  |  |  |  |  |
|  | Maintenance of strength (%) | 91 | 90 | 90 | 93 | 93 | 65 | 65 |
|  | Maintenance of elongation (%) | 90 | 90 | 92 | 93 | 94 | 42 | 42 |
|  | Tire durability running test | No cracks | No cracks | No cracks | No cracks | No cracks | Cracks | Cracks |

According to the results of Table VI-3, it was learned that compositions I to V comprises of thermoplastic elastomer compositions using nylon 6/66 alone and nylon 6/66 and nylon 11 for the thermoplastic resin of the continuous phase and using modified butyl (bromide of isoprene-p-methylstyrene copolymer) as the elastomer component for the dispersed phase plus the agent for prevention of heat deterioration (i) alone and the crystal nucleating agents and crystallization prevention agent together and-these used for the inner surfaces of tires gave excellent rates of retention of physical properties after vulcanization and tire durability (prevented cracking at inner surface of tires) in the case of NR/SBR rubber compositions and tires using the same.

As explained above, according to the present invention, since it is possible to obtain a thermoplastic elastomer composition comprised of a polyamide thermoplastic resin as the continuous phase and the elastomer composition as the dispersed phase which maintains the superiority of the balance of the gas (air) permeation preventive property and flexibility of the thermoplastic elastomer composition itself and is excellent in resistance to heat deterioration at the time of shaping of the laminate and, further, which is superior in the long term resistance to cracking upon bending after the shaping, by using this for the laminate structure of a tire, it is possible to provide a tire having a gas (air) permeation preventive property and superior in resistance to heat deterioration and dynamic durability.

Colored resin film layers having a thickness of 100 μm and black-concealing layers having a thickness of 50 μm were prepared by the formulations (parts by weight) shown in Table VII-1.

Next, sheets of laminates of the same were wrapped around tire shaping drums, together with the black-concealing layers; carcass layers, belt layers, treads, and other tire parts were superposed, wherein the black-concealing layers are located on the other side of the sheets of laminates from the tire shaping drums, then the assemblies inflated to form green tires. The green tires were vulcanized by a vulcanizer at 180° C. for 10 minutes to prepare tires (Examples VII-1 to VII-5 and Comparative Examples VII-1 to VII-2).

These tires were evaluated as follows as to the light reflectance of their black-concealing layers, the clarity of the color of the colored resin film layer as seen through a sensory test, and the tire durability. The results are shown in Table VII-1.

Light Reflectance of Black-concealing Layer

This was according to JIS Z8722.

Sensory Test

Samples were prepared by superposing a black-concealing layer over a black rubber layer then superposing a colored resin film layer. Sensory tests were performed using a panel of five. The clarity of the color was judged by the number of persons judging that the underlying black did not show up and that a good color clarity was obtained. When the number was five or four, it was judged that the color was clear, when three or two, that the color was not that clear, and when one or zero that the color was not clear at all. In Table VII-1, "Good" means the color is clear, "Fair" that the color is not that clear, and "Poor" that the color is not clear at all.

Tire Durability

Steel radial tires (165SR13, rim 13×4.5J) were formed using the colored resin film layer and black-concealing layer as inner liner layers. The tires were subjected to indoor durability tests under the following conditions (a) to (c), then their inside surfaces were inspected. Tires found to have the following trouble (1) to (2) in the visual inspection of the inner liner layers were judged as defective.

Conditions (a) Air pressure of 140 kPa×load of 5.5 kN (b) Room temperature of 38° C.

(c) Run for 10,000 km on 1707 mm drum at speed of 80 km/h

Trouble (1) Splitting or cracking (2) Peeling or rising

TABLE VII-1

| | Name of material | Name of product | Manufacturer | Comp. Ex. VII-1 | Comp. Ex. VII-2 | Ex. VII-1 | Ex. VII-2 | Ex. VII-3 | Ex. VII-4 | Ex. VII-5 |
|---|---|---|---|---|---|---|---|---|---|---|
| Colored resin film formulation | Br-IPMS*1 | EXXPRO 89-4 | Exxon Chemical | 50 | 50 | 50 | 50 | 50 | 50 | 50 |
| | N11*2 | BMN 0 | Toray | 25 | 25 | 25 | 25 | 25 | 25 | 25 |
| | N6,66*3 | CM6041 | Atochem | 13 | 13 | 13 | 13 | 13 | 13 | 13 |
| | Color master | PAM(F)104(D) Yellow | Dainippon Seika | 12 | 12 | 12 | 12 | — | 12 | 12 |
| | Color master | PAM(F)167(D) Green | Dainippon Seika | — | — | — | — | 12 | — | — |
| | CuI | Reagent | Wako Seiyaku | 0.02 | 0.02 | 0.02 | 0.02 | 0.02 | 0.02 | 0.02 |
| | ZnO | Zinc White No. 3 | Seido Chemical | 0.3 | 0.3 | 0.3 | 0.3 | 0.3 | 0.3 | 0.3 |
| | Stearic acid | Beads Stearic Acid NY | Nihon Yushi | 1.2 | 1.2 | 1.2 | 1.2 | 1.2 | 1.2 | 1.2 |
| | Zinc stearate | Zinc stearate | Seido Chemical | 0.6 | 0.6 | 0.6 | 0.6 | 0.6 | 0.6 | 0.6 |
| Black concealing layer formulation | SBS*4 | Kraton D-KX65CS | Shell Chemical | 50 | 50 | 50 | 50 | 50 | 50 | 50 |
| | E-GMA-VA*5 | BONDFAST 20B | Sumitomo Chemical | 50 | 50 | 50 | 50 | 50 | 50 | 50 |
| | Rosin ester | Pencell AD | Arakawa Chemical | 50 | 50 | 50 | 50 | 50 | 50 | 50 |
| | Peroxide | Perkadox 14/40 | Kayaku Akzo | 5 | 5 | 5 | 5 | 5 | 5 | 5 |
| | $TiO_2$ | Taipake CR-60-2 | Ishihara Sangyo | 0 | 0.5 | 2 | 5 | 2 | — | — |
| | ZnO | Zinc White No. 3 | Seido Chemical | — | — | — | — | — | 10 | — |
| | Yellow pigment | Taipake TY-220 | Ishihara Sangyo | — | — | — | — | — | — | 2 |
| Amount of $TiO_2$, ZnO, and pigment in concealing layer (%) | | | | 0 | 0.3 | 1.3 | 3.1 | 1.3 | 6 | 1.3 |
| Reflectance when placing concealing layer over carcass layer (concealing layer 50 μm) (%) | | | | 7 | 12 | 32 | 54 | 24 | 47 | 29 |
| Sensory test when placing colored resin film over this (colored layer 100 μm). | | | | Poor | Fair | Good | Good | Good | Good | Good |
| Tire durability: Clearing 10,000 km or not | | | | Yes | Yes | Yes | Yes | Yes | Yes | Yes |

Notes:
*1: Bromide of isobutylene-p-methylstyrene;
*2: Nylon 11;
*3: Nylon 6,66;
*4: Styrene-butadiene-styrene copolymer;
*5: Ethylene-glycidyl methacrylate vinyl acetate copolymer.

In Table VII-1, Comparative Example VII-1 is the case where the content of titanium dioxide in the black-concealing layer is zero and the light reflectance of the black-concealing layer is 7%. The results in the sensory test were not good. Further, Comparative Example VII-2 is the case where the content of the titanium dioxide in the black-concealing layer is 0.3% and the light reflectance of the black-concealing layer is 12%. In this case as well, the results of the sensory test were not that good. As opposed to this, in Examples VII-1 to VII-5, the results of the sensory test were good.

As explained above, according to the present invention, since a white or other colored resin film layer comprised mainly of a thermoplastic resin is provided at least at part of the innermost surface or outermost surface of the tire through at least one black-concealing layer with a light reflectance of at least 15%, the coloring is clear even without having to made the thickness of the colored layer (resin film layer) thicker and further the following effects (i) to (iv) can be exhibited:

(i) The information necessary at the time of assembly on the rim can be identified simply and easily without misunderstanding.

(ii) It is possible to prevent mistaken assembly since it is sufficient to just combine the tire colored on its inner or outer surface with a rim colored by a color associated with that coloring.

(iii) It is possible to prevent mistaken use of tires by coloring the inner surface of the tire in accordance with its intended use such as racing use or emergency use.

(iv) Separation at the time of recycling becomes easy by separately coloring types of materials used inside the tire (belt layer, carcass layer, etc.)

The methods of evaluation used in these examples were as shown below:

Melt Viscosity

Here, the melt viscosity means the melt viscosity of any temperature or component at the time of mixing. The melt viscosity of each polymer material is dependent on the temperature, the shear rate ($sec^{-1}$), and the shear stress, so the stress and shear rate of the polymer material at any temperature in the molten state capable of flowing through a capillary, in particular, the temperature region at the time of mixing, are measured and the melt viscosity is measured by the following formula (5):

$$\eta = \sigma/\dot{\gamma} \text{ (where, } \sigma\text{: shear stress, } \dot{\gamma}\text{: shear rate} \quad (5)$$

Note that, the melt viscosity is measured by using a Capillary Rheometer Capillograph 1C made by Toyo Seiki.

Measurement of Young's Modulus and Elongation of Film

This was performed based on JIS K6251 "Test Method for Tensile Properties of Vulcanized Rubber".

Test piece: Samples of the film prepared by extrusion in the examples were used and punched into JIS No. 3 dumbbell shapes in the direction of flow of the thermoplastic resin at the time of extrusion.

A tangent was drawn against the curve of the initial strain region of the stress-strain curve obtained and the Young's modulus was found from the inclination of the tangent.

Further, the length between standard lines at the time of breakage of a sample of the film prepared in each example was measured to calculate the elongation by the following formula.

$$E_B = (L_1 - L_0)/L_0 \times 100$$

where, $E_B$: elongation at break (%)

$L_0$: length between standard lines (mm)

$L_i$: length between standard lines at time of breakage (mm)

Method of Measurement of Gas Permeation Degree of Film (Air Permeation Coefficient)

This was performed based on JIS K7126 "Test Method of Gas Permeation Degree of Plastic Films and Sheets (Method A)".

Test piece: Film samples prepared in example were used.

Test gas: Air ($N_2$:$O_2$=8:2)

Test temperature: 30° C.

Method of Testing Tire Air Leakage Performance

A 165SR13 steel radial tire (rim of 13×4½-J) was allowed to stand for three months under conditions of an initial pressure of 200 kPa, no load, and a room temperature of 21° C. and measured for pressure at intervals of four days.

The α value was found by recurrence to the function:

$$Pt/Po = \exp(-\alpha t)$$

where Pt is the measured pressure, Po is the initial pressure, and t is the days elapsed. Using the α obtained and a t of 30 days, the value β was found:

$$\beta = [1\exp(-\alpha t)] \times 100$$

This value β was the drop in pressure per month (%/month).

Method of Testing Tire Durability

A 165SR13 steel radial tire (rim 13×4½-J) was filled to an air pressure of 140 kPa, given a load of 5.5 kN, and run on an actual road for 10,000 km.

After this operation, the tire was detached from the rim and the liner layer at the inside surface of the tire was visually inspected. Tires with cracks in the liner layer, visible wrinkles, or peeling or rising of the liner layer were judged as defective (Poor) and those without them as passing (Good).

What is claimed is:

1. A pneumatic tire comprising (i) a resin film layer containing a thermoplastic resin and an elastomer, located at at least a part of the innermost surface or outermost surface of the tire, (ii) a black rubber layer and, located between the layer (i) and the layer (ii), at least one (iii) black-concealing layer having a light reflectance of at least 15% for concealing the black color of the black rubber layer (ii), said resin film layer (i) being colored for indicating various information.

2. A pneumatic tire as claimed in claim 1 wherein said black-concealing layer (iii) contains at least one additive selected from the group consisting of white fillers, pigments, and dyes.

3. A pneumatic tire as claimed in claim 1, wherein said black-concealing layer (iii) contains at least 0.5% by weight of titanium dioxide.

4. A pneumatic tire as claimed in any one of claims 1 to 3, wherein said black-concealing layer (iii) is used as a tacky layer and/or adhesive layer between said resin film layer and said rubber layer (ii).

5. A pneumatic tire as claimed in any one of claims 1 to 3, wherein the resin film layer is located on the innermost surface and has an air permeation coefficient of not more than $25 \times 10^{-12}$ cc·cm/cm$^2$·sec·cmHg and is used also as an air permeation preventive layer.

6. A pneumatic tire as claimed in any one of claims 1 to 3, wherein the thermoplastic resin is at least one resin selected from the group consisting of polyamide resins, polyester resins, polynitrile resins, polymethacrylate resins, polyvinyl resins, cellulose resins, and fluoro resins, and imide resins.

7. A pneumatic tire as claimed in claim 1, wherein the elastomer is at least one member selected from the group consisting of diene rubbers, olefin rubbers, sulfur-containing rubbers, fluoro rubbers, and thermoplastic elastomers.

* * * * *